United States Patent
Cannon

(10) Patent No.: US 8,358,286 B2
(45) Date of Patent: *Jan. 22, 2013

(54) ELECTRONIC DEVICE AND THE INPUT AND OUTPUT OF DATA

(75) Inventor: Bruce Cannon, El Segundo, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/251,281

(22) Filed: Oct. 2, 2011

(65) Prior Publication Data

US 2012/0019480 A1 Jan. 26, 2012

Related U.S. Application Data

(63) Continuation of application No. 13/053,550, filed on Mar. 22, 2011.

(60) Provisional application No. 61/316,017, filed on Mar. 22, 2010, provisional application No. 61/437,118, filed on Jan. 28, 2011, provisional application No. 61/442,084, filed on Feb. 11, 2011, provisional application No. 61/442,086, filed on Feb. 11, 2011.

(51) Int. Cl.
*G06F 3/045* (2006.01)

(52) U.S. Cl. ........................................ 345/174

(58) Field of Classification Search .................. 345/156, 345/157, 173–179

See application file for complete search history.

(56) References Cited

U.S. PATENT DOCUMENTS

| | | |
|---|---|---|
| 4,235,442 A | 11/1980 | Nelson |
| 4,331,333 A | 5/1982 | Willcocks |
| 4,398,720 A | 8/1983 | Jones et al. |
| 4,541,633 A | 9/1985 | Newbill |
| 4,729,564 A | 3/1988 | Kuna et al. |
| 4,815,733 A | 3/1989 | Yokoi |
| 4,846,693 A | 7/1989 | Baer |
| 4,861,031 A | 8/1989 | Simms |
| 5,013,047 A | 5/1991 | Schwab |
| 5,026,058 A | 6/1991 | Bromley |
| 5,082,286 A | 1/1992 | Ryan et al. |
| 5,129,654 A | 7/1992 | Bogner |
| 5,188,368 A | 2/1993 | Ryan |

(Continued)

FOREIGN PATENT DOCUMENTS

| | | |
|---|---|---|
| GB | 2053701 A | 2/1981 |
| GB | 2103943 A | 3/1983 |

(Continued)

OTHER PUBLICATIONS

"Flexible, Collaborative Organization on a Tabletop", Karen D. Grant and Terry Winograd, ACM CSCW 2002: Workshop on Co-located Tabletop Collaboration: Tachnologies and Directions, New Orleans, LA, USA, Nov. 2002, 4 pages.

(Continued)

*Primary Examiner* — Dennis Joseph

(74) *Attorney, Agent, or Firm* — Edell, Shapiro & Finnan, LLC

(57) ABSTRACT

The present invention relates to an electronic device, and in particular, to the input and output of data from the electronic device. The present invention also relates to an object that is identifiable by an electronic device having a touch screen. The object includes contact members that can engage or be positioned proximate to the touch screen. The contact members create contact points that are sensed or detected by the touch screen. The object is at least partly conductive and includes at least a first contact member and a second contact member spaced from the first contact member. The first and second contact members define the pattern of contact points. An output is generated and displayed by the touch screen when the object engages or is proximate to the touch screen and is identified.

16 Claims, 42 Drawing Sheets

U.S. PATENT DOCUMENTS

| | | | |
|---|---|---|---|
| 5,190,285 A | 3/1993 | Levy et al. |
| 5,212,368 A | 5/1993 | Hara |
| 5,313,055 A | 5/1994 | Shiratsuki et al. |
| 5,330,380 A | 7/1994 | McDarren et al. |
| 5,372,511 A | 12/1994 | Cheung |
| 5,411,259 A | 5/1995 | Pearson et al. |
| 5,457,289 A | 10/1995 | Huang et al. |
| 5,462,281 A | 10/1995 | Gaito et al. |
| 5,636,994 A | 6/1997 | Tong |
| 5,642,134 A | 6/1997 | Ikeda |
| 5,694,045 A | 12/1997 | Ikeda et al. |
| 5,853,327 A | 12/1998 | Gilboa |
| 5,855,483 A | 1/1999 | Collins et al. |
| 5,873,765 A | 2/1999 | Rifkin et al. |
| 5,959,281 A | 9/1999 | Domiteaux |
| 6,012,961 A | 1/2000 | Sharpe, III et al. |
| 6,083,104 A | 7/2000 | Choi |
| 6,102,397 A | 8/2000 | Lee et al. |
| 6,167,353 A | 12/2000 | Piernot et al. |
| 6,168,158 B1 | 1/2001 | Bulsink |
| 6,190,174 B1 | 2/2001 | Lam |
| 6,227,931 B1 | 5/2001 | Shackelford |
| 6,290,566 B1 | 9/2001 | Gabai et al. |
| 6,319,010 B1 | 11/2001 | Kikinis |
| 6,396,005 B2 | 5/2002 | Rodgers et al. |
| 6,443,796 B1 | 9/2002 | Shackelford |
| 6,460,851 B1 | 10/2002 | Lee et al. |
| 6,690,156 B1 | 2/2004 | Weiner et al. |
| 6,719,603 B2 | 4/2004 | Chan |
| 6,761,634 B1 | 7/2004 | Peterson et al. |
| 6,800,013 B2 | 10/2004 | Liu |
| 6,877,096 B1 | 4/2005 | Chung et al. |
| 6,937,152 B2 | 8/2005 | Small |
| 6,937,289 B1 | 8/2005 | Ranta et al. |
| 7,025,657 B2 | 4/2006 | Nishimoto |
| 7,033,243 B2 | 4/2006 | Hornsby et al. |
| 7,037,166 B2 | 5/2006 | Shrock et al. |
| 7,081,033 B1 | 7/2006 | Mawle et al. |
| 7,118,482 B2 | 10/2006 | Ishihara et al. |
| 7,147,561 B2 | 12/2006 | Takeuchi |
| 7,292,229 B2 | 11/2007 | Morag et al. |
| 7,384,340 B2 | 6/2008 | Eguchi et al. |
| 7,392,985 B1 | 7/2008 | Lam |
| 7,394,459 B2 | 7/2008 | Bathiche et al. |
| 7,397,464 B1 | 7/2008 | Robbins et al. |
| 7,450,086 B2 | 11/2008 | Thielman et al. |
| 7,474,318 B2 | 1/2009 | Zhou et al. |
| 7,474,983 B2 | 1/2009 | Mazalek et al. |
| 7,488,231 B2 | 2/2009 | Weston |
| 7,568,964 B2 | 8/2009 | Ganz |
| 7,571,855 B2 | 8/2009 | Thielman et al. |
| 7,621,415 B2 | 11/2009 | Han et al. |
| 7,692,630 B2 | 4/2010 | Natsume et al. |
| 7,699,693 B2 | 4/2010 | Schwartz |
| 7,808,385 B2 | 10/2010 | Zheng |
| 7,843,471 B2 | 11/2010 | Doan et al. |
| 7,863,909 B2 | 1/2011 | Keith |
| 7,883,420 B2 | 2/2011 | Bradbury et al. |
| 7,911,453 B2 | 3/2011 | Wilson et al. |
| 7,963,851 B2 | 6/2011 | Ueshima et al. |
| 7,978,185 B2 | 7/2011 | Wilson et al. |
| 7,993,201 B2 | 8/2011 | Matsumoto et al. |
| 2002/0090985 A1 | 7/2002 | Tochner et al. |
| 2002/0155893 A1 | 10/2002 | Swanberg et al. |
| 2002/0167550 A1 | 11/2002 | Eggen et al. |
| 2002/0193157 A1 | 12/2002 | Yamada et al. |
| 2003/0156100 A1 | 8/2003 | Gettemy |
| 2004/0002387 A1 | 1/2004 | Grady |
| 2004/0018878 A1 | 1/2004 | Silverman |
| 2004/0214642 A1 | 10/2004 | Beck |
| 2005/0009610 A1 | 1/2005 | Miyamoto et al. |
| 2005/0043076 A1 | 2/2005 | Lin |
| 2006/0003843 A1 | 1/2006 | Kobayashi et al. |
| 2006/0026536 A1 | 2/2006 | Hotelling et al. |
| 2006/0054679 A1 | 3/2006 | Ruping |
| 2006/0175753 A1 | 8/2006 | MacIver et al. |
| 2006/0246403 A1 | 11/2006 | Monpouet et al. |
| 2007/0143830 A1 | 6/2007 | Abraham et al. |
| 2008/0004110 A1 | 1/2008 | Cortenraad et al. |
| 2008/0058045 A1 | 3/2008 | Cortenraad et al. |
| 2008/0122805 A1 | 5/2008 | Smith et al. |
| 2008/0150715 A1* | 6/2008 | Tang et al. ............ 340/540 |
| 2008/0153594 A1 | 6/2008 | Zheng |
| 2008/0161086 A1 | 7/2008 | Decre et al. |
| 2008/0204426 A1 | 8/2008 | Hotelling et al. |
| 2008/0211785 A1* | 9/2008 | Hotelling et al. ......... 345/173 |
| 2008/0280682 A1 | 11/2008 | Brunner et al. |
| 2009/0118001 A1 | 5/2009 | Kelly et al. |
| 2009/0118006 A1 | 5/2009 | Kelly et al. |
| 2009/0135162 A1 | 5/2009 | Van De Wijdeven et al. |
| 2009/0160780 A1 | 6/2009 | Arnold et al. |
| 2009/0315258 A1 | 12/2009 | Wallace et al. |
| 2009/0318229 A1 | 12/2009 | Zielinski et al. |
| 2009/0322352 A1 | 12/2009 | Zachut et al. |
| 2009/0325686 A1 | 12/2009 | Davis et al. |
| 2010/0045530 A1 | 2/2010 | Van De Wijdeven |
| 2010/0066016 A1 | 3/2010 | Van De Wijdeven et al. |
| 2010/0077334 A1 | 3/2010 | Yang et al. |
| 2010/0177060 A1 | 7/2010 | Han |
| 2010/0261505 A1 | 10/2010 | Yeh et al. |
| 2011/0095992 A1 | 4/2011 | Yeh |
| 2011/0108625 A1 | 5/2011 | Lee |
| 2011/0169779 A1 | 7/2011 | Boer et al. |
| 2012/0007808 A1 | 1/2012 | Heatherly et al. |
| 2012/0007817 A1 | 1/2012 | Heatherly et al. |
| 2012/0062490 A1 | 3/2012 | Heatherly et al. |

FOREIGN PATENT DOCUMENTS

| | | |
|---|---|---|
| GB | 2147817 A | 5/1985 |
| JP | 61163426 A | 7/1986 |
| JP | 7248870 A | 9/1995 |
| JP | 9258878 A | 10/1997 |
| JP | 2005250631 A | 9/2005 |
| JP | 2007102749 A | 4/2007 |
| JP | 2008204375 A | 9/2008 |
| KR | 20010009972 A | 2/2001 |
| WO | WO9603188 A | 2/1996 |
| WO | 2006/033036 A2 | 3/2006 |

OTHER PUBLICATIONS http://www.cat.nyu.edu/PMD/, "Planar Manipulator Display", by Dan Rosenfeld, Michael Zawadzki, Jeremi Sudol, and Ken Perlin, NYU Media Research Lab, 3 pages.

http://www.billbuxton.com/bricks.html, "Bricks: Laying the Foundation for Graspable User Interfaces", by G. Fitzmaurice, H. Ishii, and W. Buxton, 1995, Proceedings of the ACM Conference on HUman Factors in Computing Systems (CHI'95), 99. 432-449, New York:: ACM, 15 pages.

http://gizmodo.com/#!025954/hitachis-tabletop-display, "Hitachi's Tabletop Display", 2 pages.

"Tangible Play—Research and Design for Tangible and Tabletop Games", Workshop at the 2007 Intelligent User Interfaces Conference, Jan. 28, 2007, Honolulu, Hawaii, USA, Workshop Proceedings, 56 pages.

International Search Report & Written Opinion for PCT/US2011/029346, dated Nov. 15, 2011, 11 pages.

* cited by examiner

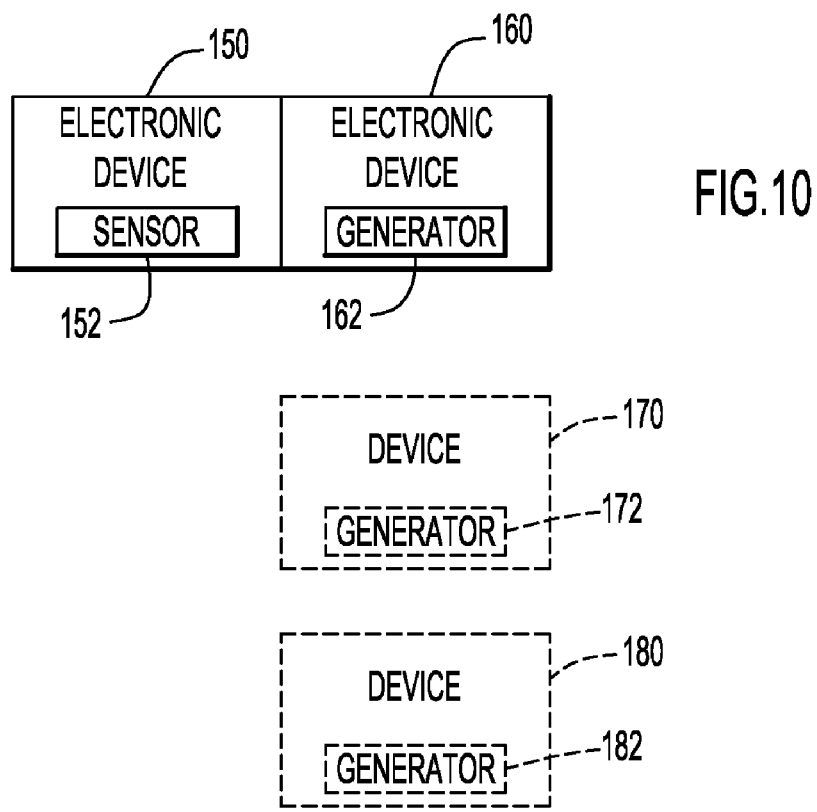

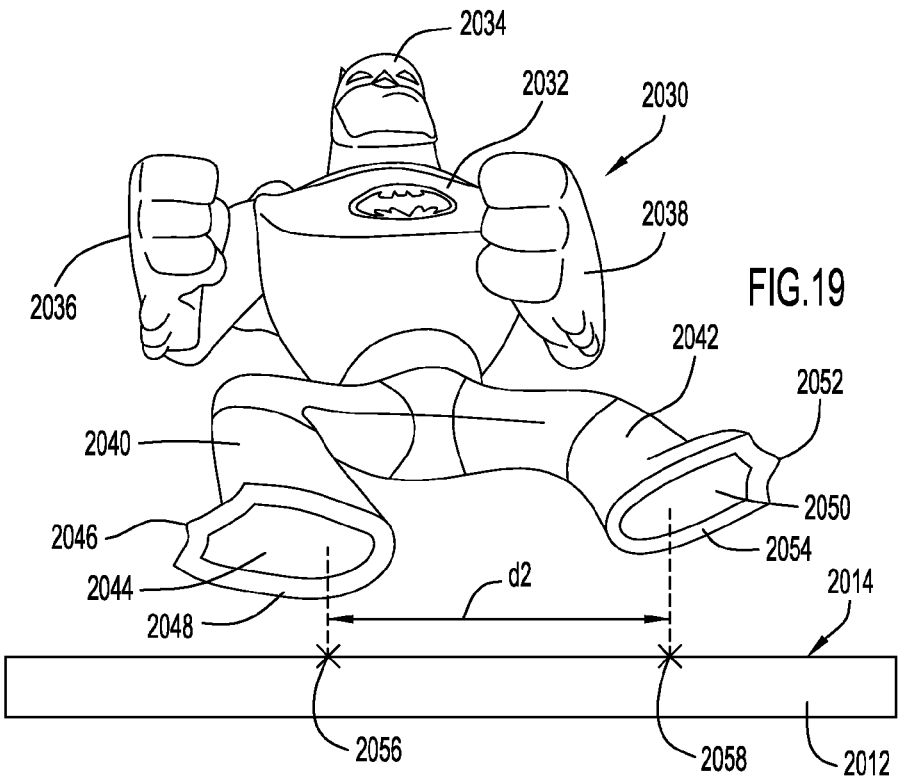
FIG. 19
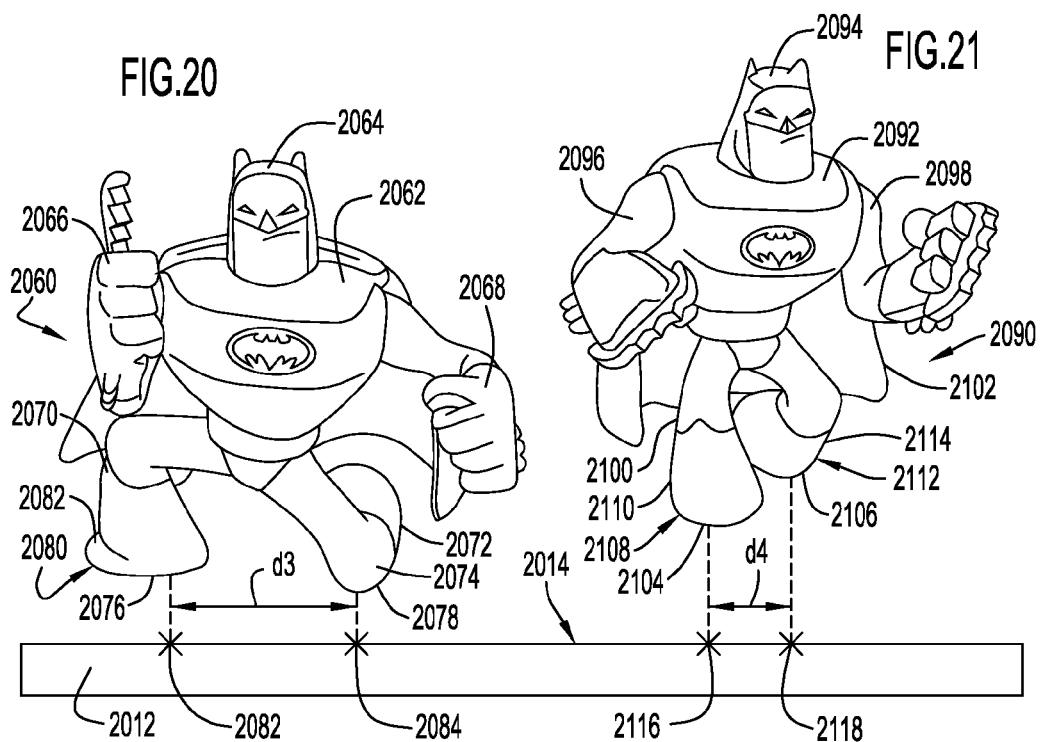
FIG. 20
FIG. 21

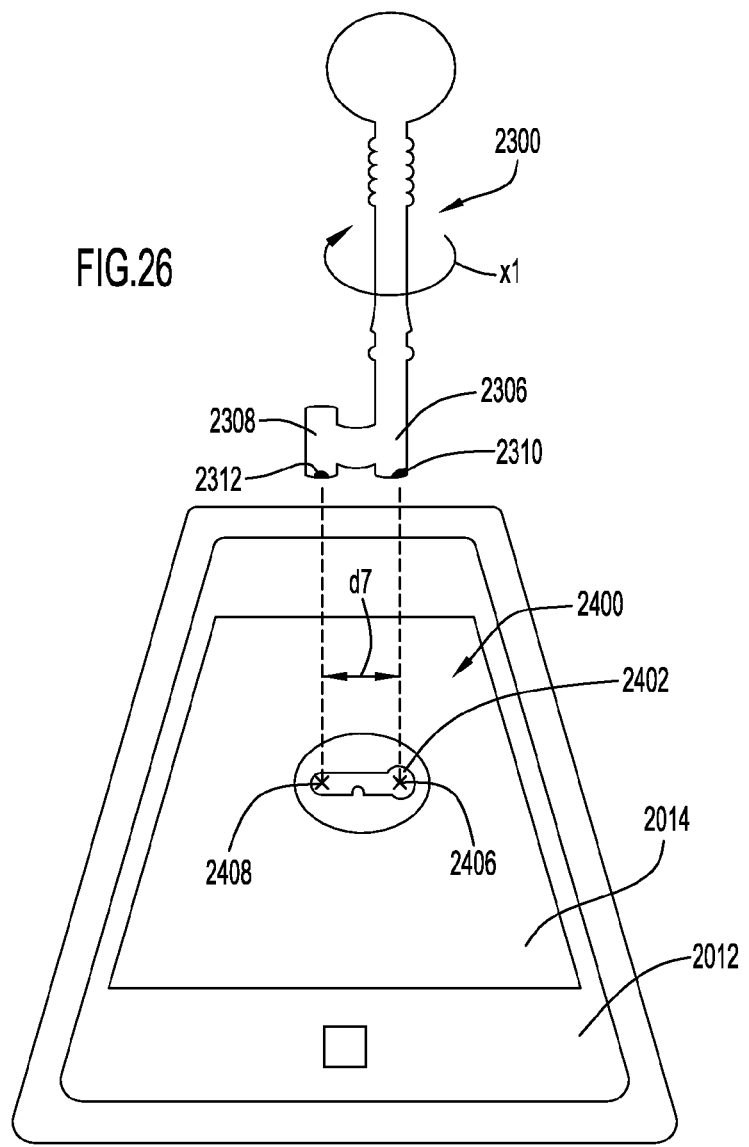
FIG.26
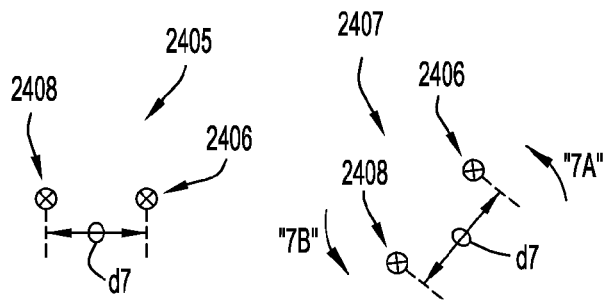
FIG.27
FIG.28
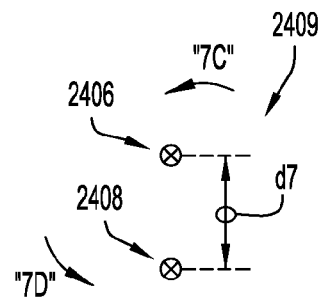
FIG.29

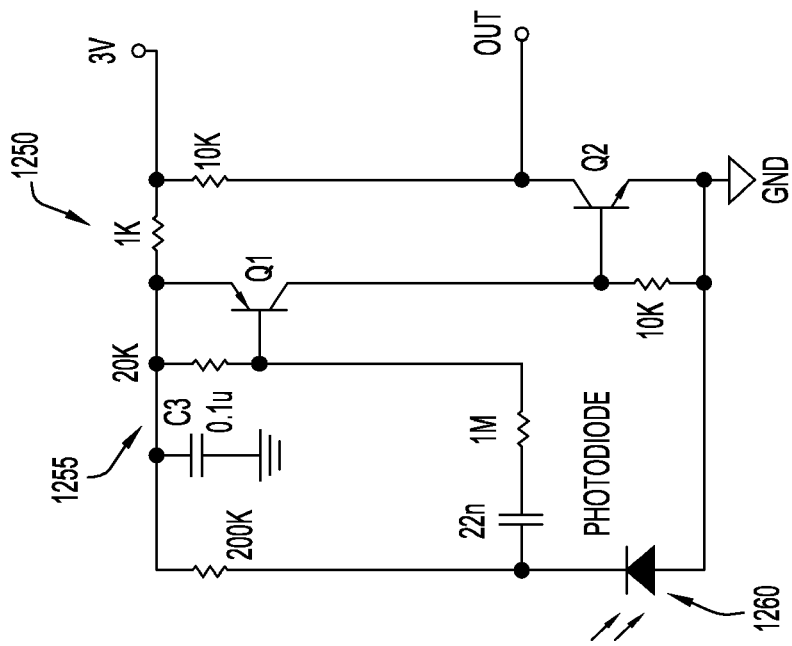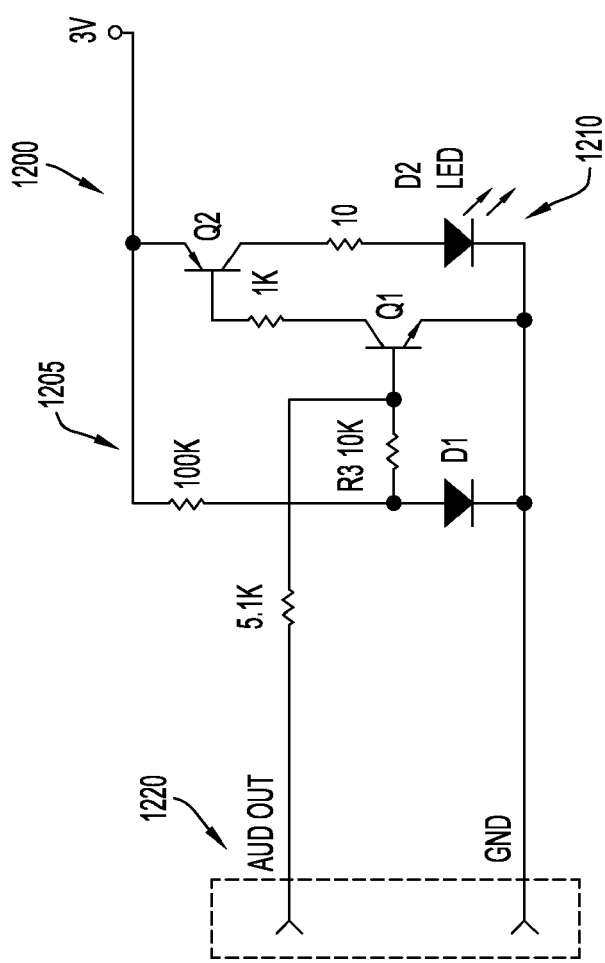
FIG. 84

ELECTRONIC DEVICE AND THE INPUT AND OUTPUT OF DATA

CROSS-REFERENCE TO RELATED APPLICATIONS

This application is a continuation of U.S. Non-Provisional patent application Ser. No. 13/053,550, filed Mar. 22, 2011, entitled "Electronic Device and the Input and Output of Data," which claims priority to and the benefit of U.S. Provisional Patent Application No. 61/316,017, filed Mar. 22, 2010, entitled "Electronic Device and the Input and Output of Data," and claims priority to and the benefit of U.S. Provisional Patent Application No. 61/437,118, filed Jan. 28, 2011, entitled "Identifiable Object and a System for Identifying an Object by an Electronic Device," and claims priority to and the benefit of U.S. Provisional Patent Application No. 61/442,084, filed Feb. 11, 2011, entitled "Electronic Device and the Input and Output of Data," and claims priority to and the benefit of U.S. Provisional Patent Application No. 61/442,086, filed Feb. 11, 2011, entitled "Identifiable Object and a System for Identifying an Object by an Electronic Device." The entire disclosure of each of the above-identified U.S. non-provisional patent application and four U.S. provisional patent applications is incorporated herein by reference in its entirety.

FIELD OF THE INVENTION

The present invention relates to an electronic device, and in particular, to the input and output of data from the electronic device. The present invention also relates to a system for identifying an object, such as a toy figure or toy vehicle, on a touch screen of an electronic device. The present invention further relates to an object that is identifiable by an electronic device.

BACKGROUND OF THE INVENTION

Various electronic devices including a touch screen configured to detect an object (e.g. a stylus) or a user's finger are known. Some electronic devices provide for a virtual environment presented on a display, on which physical objects may be placed on the display and optically detected using a camera. Other devices receive data transmitted from memory provided in an object. Such conventional devices are relatively complex and/or fail to recognize the identity, location and/or orientation of an object on a touch screen of an electronic device.

Children are becoming more familiar and comfortable with the use of electronic devices, such as mobile phones, tablets, etc. However, conventional children's toys lack the ability to be used with such electronic devices.

Thus, there is a need for a system that allows children's toys to interact with an electronic device to provide an enhanced play experience. In addition, there is a need for an object that can be easily identified by an electronic device. There is also a need for an object whose orientation on the electronic device can also be detected or determined.

SUMMARY OF THE INVENTION

In one embodiment, an electronic device can be configured to receive information or data. In addition, the electronic device can be configured to output information or data. The output from the electronic device may include an encoded or embedded signal. A module can be used with the electronic device to decode the embedded or encoded signal from the electronic device and transmit it to a remote object, such as a toy. The embedded or encoded signal can be used to drive functionality in the remote object.

In one embodiment, a case can be coupled to the electronic device. The case can include a module having circuitry that can be in communication with the electronic device. The module may be in direct contact with the electronic device, such as via a plug in a headphone jack of the electronic device. Alternatively, the module may be spaced apart from the electronic device.

In one embodiment, the present invention is directed to a system for identifying an object. The system includes an electronic device having a touch screen, and an object recognizable by the touch screen. The object may be a toy figure, a toy vehicle, a toy building, a playing card, a coin, poker chips, board game pieces, a geometric structure, etc. The object includes a first contact member engageable with the touch screen and a second contact member engageable with the touch screen. The first contact member is spaced from the second contact member by a first distance. The electronic device identifies the conductive object when the first and second contact members engage the touch screen. In addition, the system can be used to detect a gesture or movement of an object.

The first and second contact members define a pattern of contact points on the touch screen recognizable by the electronic device for identifying the object. The location and/or orientation of the object on the touch screen may also be determined based on the pattern of contact points on the touch screen.

In one embodiment, the object is a first conductive object. The system includes a second object having a third contact member engageable with the touch screen and a fourth contact member engageable with the touch screen. The third contact member is spaced from the fourth contact member by a second distance. The second distance differs from the first distance. The electronic device identifies the second object when the third and fourth contact members engage the touch screen.

In one embodiment, the object includes a conductive coating that conducts a user's capacitance to the touch screen for actuation thereof. The object may include a plastic core substantially coated by a conductive material. Alternatively, the object may be a metal object, a conductive rubber object, a plain rubber object with conductive rubber coating, or a co-molded object having some conductive regions. The object may be either hard or soft.

The present invention also relates to a toy including an electronic device having a touch screen and configured to generate some sort of state change in the device, such as an output on the touch screen, when a pattern of contact points is sensed by the touch screen. One type of state change can be internal (such as incrementing a count, or changing an internal system state). Another type of state change can be external (such as generating a visible output on the screen or other device, or generating a different output, including a signal transmission, an internet update, sounds, or lights). A conductive object includes at least a first contact member and a second contact member spaced from the first contact member. The first and second contact members define the pattern of contact points. The output is generated and displayed by the touch screen when the object engages the touch screen.

In one implementation, the conductive object includes a third contact member. The first, second and third contact members define the pattern of contact points.

The present invention is also directed to a method of identifying a conductive object on a touch screen of an electronic device. An electronic device including a touch screen is provided. A pattern of engagement points on the touch screen are recognized, such as by capacitive coupling between the object and the touch screen. The pattern of engagement points defines an identification. The identification is associated with an object, and output specific to the associated object is generated.

In one implementation, the pattern of engagement points is a first pattern of engagement points and the object is a first object. A second pattern of engagement points on the touch screen is recognized. The second pattern of engagement points defines a second identification. The second identification is associated with a second object, and a second output specific to the associated second object is generated.

BRIEF DESCRIPTION OF THE DRAWINGS

FIGS. 9 and 10 illustrate schematic block diagrams of two electronic devices in contact according to an embodiment of the invention.

FIG. 19 illustrates a perspective view of an object configured as a toy action figure having an identification recognizable by the disclosed systems.

FIG. 20 illustrates a perspective view of an object configured as another toy action figure having another identification recognizable by the disclosed systems.

FIG. 21 illustrates a perspective view of an object configured as another toy action figure having a third identification recognizable by the disclosed systems.

FIG. 26 illustrates a perspective view of the electronic device of FIG. 25 and the key of FIG. 24.

FIG. 27 illustrates a plan view of the contact points 2406 and 2408 in a first orientation.

FIGS. 28 and 29 illustrate plan views of the contact points 2406 and 2408 illustrated in FIG. 27 in different orientations in which the contact points have been moved.

FIG. 84 illustrates a schematic diagram for a system according to an embodiment of the invention.

Like reference numerals have been used to identify like elements throughout this disclosure.

DETAILED DESCRIPTION OF THE INVENTION

Figure 1:
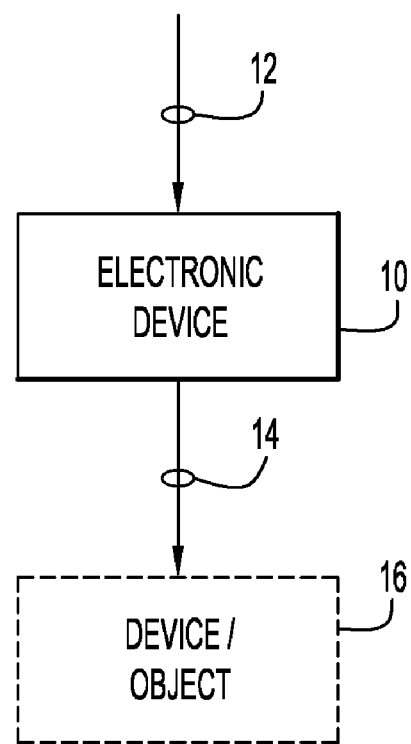
FIG. 1 illustrates a schematic block diagram of an electronic device according to an embodiment of the present invention.

Referring to FIG. 1, a schematic diagram of an electronic device according to an embodiment of the present invention is illustrated. The electronic device 10 can be any electronic device that outputs or generates an output that is in the form of a signal. The signal can be an electrical signal. For example, electronic device 10 can be an electronic device that generates an audio output.

In one embodiment, the electronic device 10 is configured so that data can be input into the electronic device 10, as represented by the arrow 12 in FIG. 1. The data can be in a variety of forms when it is input. As described below, the data can be input via several components of the electronic device 10 and in several different ways.

In one embodiment, the electronic device 10 is configured so that data can be output from the electronic device 10, as represented by the arrow 14 in FIG. 1. The data can be in a variety of forms when it is output from or by the electronic device 10. One or more of the components of the electronic device 10 can be used to output the data in the form of a signal.

The data that is output from the device 10 can be transmitted or communicated to a device or object 16. The data can be a text message, instructions for movement of an object, input for an application, or some other information.

Generally herein, the term "electronic device" includes any device that receives and/or generates a signal. An alternative term for "electronic device" is a "smart device." Some exemplary devices are mobile digital devices, such as an iPhone, iPod, iTouch, iPad, Blackberry, an MP3 player, Android, cell phone, PDA, or a tape recorder.

Figure 1A:
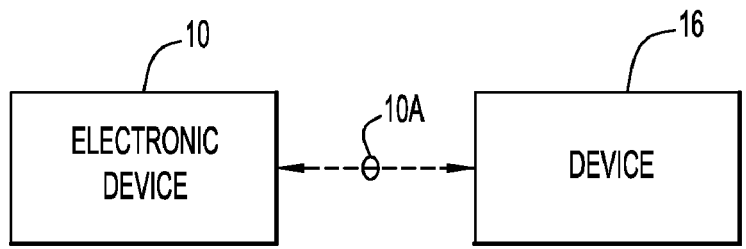
FIGS. 1A-1C illustrate schematic block diagrams of different communications between an electronic device and another device.
Figure 1B:
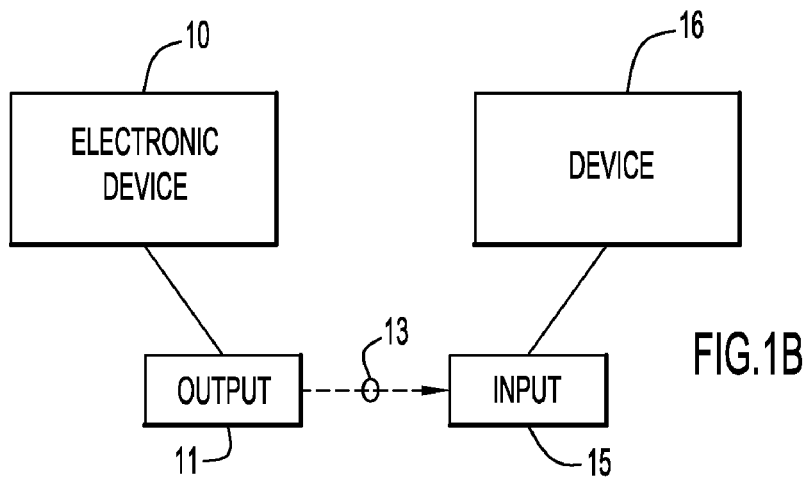
Figure 1C:
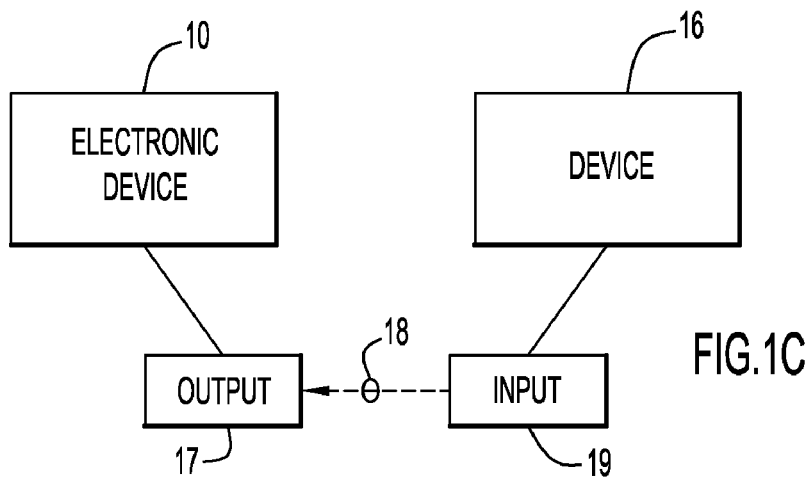

Referring to FIGS. 1A, 1B, and 1C, different configurations of the electronic device 10 and device 16 are illustrated. Referring to FIG. 1A, the electronic device 10 can communicate with device 16 as represented by arrow 10A. The communication 10A can be accomplished in a wired manner in which the devices 10 and 16 are connected together such as via a USB cable, in a wireless manner, and/or in a contact manner in which the devices 10 and 16 are in physical contact with each other. Referring to FIG. 1B, electronic device 10 includes an output 11 that communicates with an input 15 of device 16 as shown by arrow 13. The output 11 can communicate to multiple points or inputs for multiple devices. Referring to FIG. 1C, electronic device 10 includes an input 17 that receives data or information from output 19 of device 16.

The communications between two electronic devices can be accomplished through optical pairing or recognition between the devices. For example, an electronic device could include a combination of a camera and a screen. The two electronic devices can be different types of devices operating different platforms.

Figure 2:
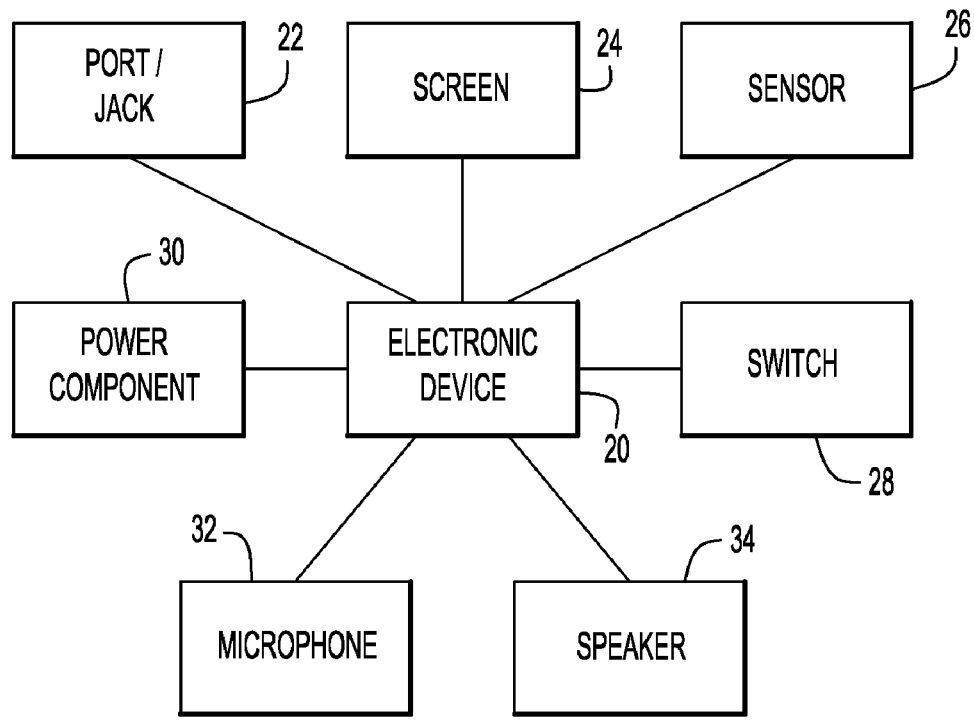
FIG. 2 illustrates a schematic block diagram of an exemplary electronic device according to an embodiment of the invention.

Referring to FIG. 2, a schematic block diagram of an embodiment of an electronic device is illustrated. In this embodiment, the electronic device 20 includes several components. It is to be understood that in alternative embodiments, the electronic device 20 may not include all of the components illustrated in FIG. 2. Moreover, the electronic device 20 may include more than one of the particular components illustrated in FIG. 2.

In FIG. 2, the electronic device 20 is illustrated as having several components, including a port or jack 22, a visual display component 24, such as a screen, a sensor 26, a switch 28, a power component 30, a microphone 32, and a speaker 34. Each of these components can be used to input data or information to and/or output data or information from the device 20.

Regarding the inputting of data to the device 20, several of the components of device 20 can be used. Some such components include the port or jack 22, the screen 24, the sensor 26, the switch 28, and the microphone 32.

The electronic device 20 may include a housing with a port or jack 22 formed therein. The port or jack 22 can be a headphone jack or a microphone jack. The port or jack 22 is sized to receive a plug that is connected to one or more components. The plug that is inserted into the jack 22 is in electrical contact with the system of the device 20. The plug that is inserted into the jack 22 can include a contact that engages the microphone line in the headphone jack 22. In one embodiment, the port or jack 22 of the electronic device 20 includes a microphone line in communication therewith. Thus, the plug is directly coupled to the line in the jack 22. Data can be transmitted out via the microphone lead in the headphone jack.

Figure 3:
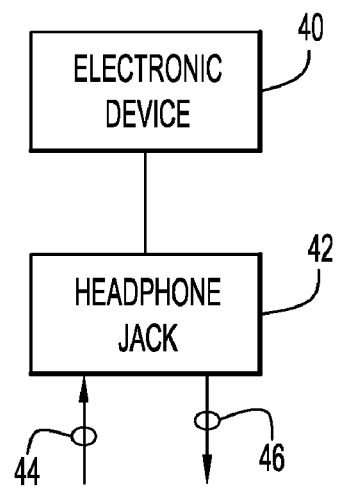
FIG. 3 illustrates a schematic block diagram of an electronic device according to an embodiment of the invention.

Referring to FIG. 3, in one embodiment, the electronic device 40 includes a headphone jack 42 and the jack 42 can be used to input data (arrow 44) to the electronic device 40 and output data (arrow 46) from the electronic device 40.

Figure 4:
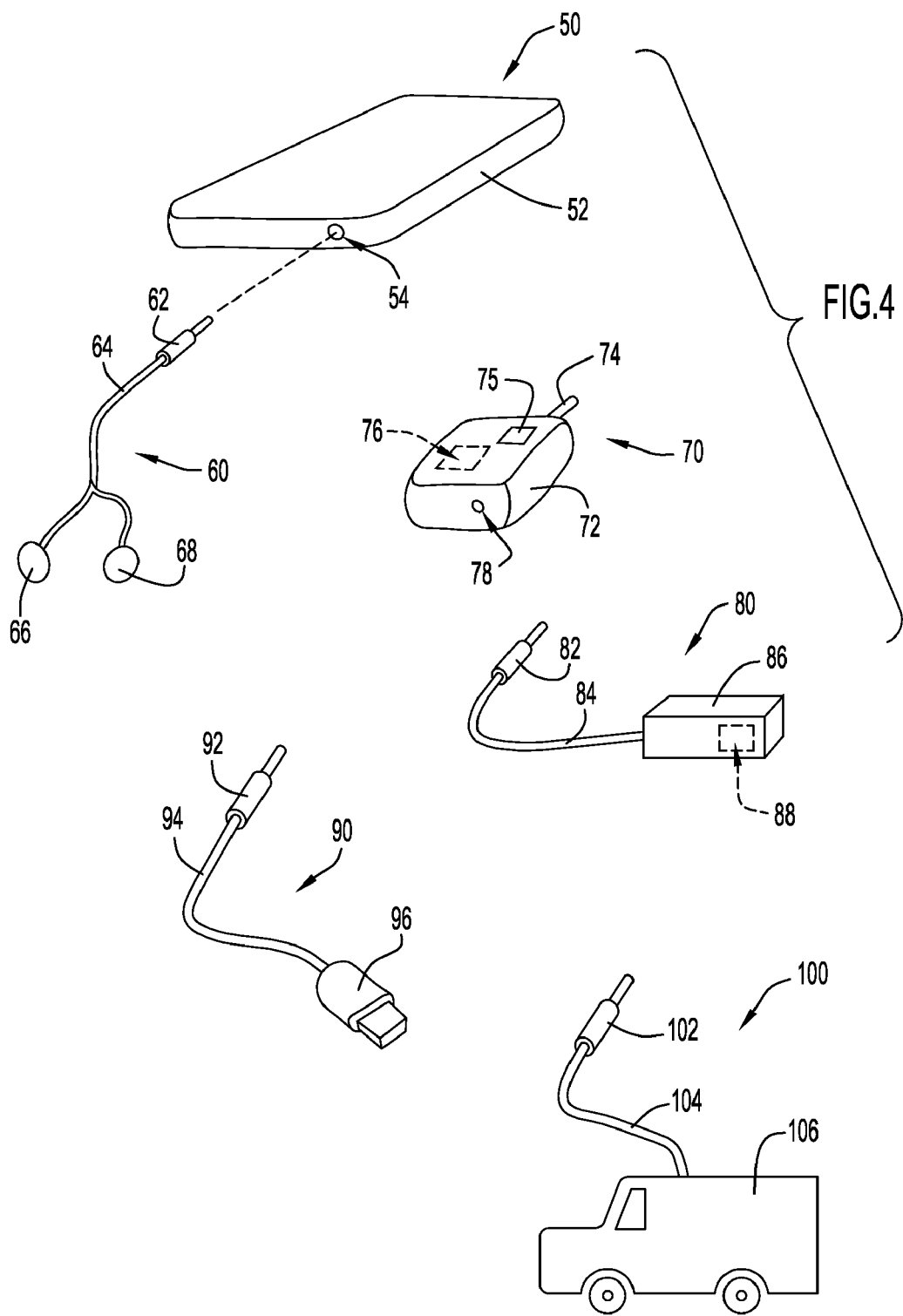
FIG. 4 illustrates a perspective view of an electronic device and several accessories for use with the electronic device according to different embodiments of the invention.

Referring to FIG. 4, an electronic device 50 includes a housing 52 with a port 54. In one embodiment, as shown in FIG. 4, the component 60 includes a plug 62 that can be inserted into the port 54 of device 50. The plug 62 is connected to a wire 64 coupled to one or more headphones 66 and 68.

Alternatively, the component or module 70 includes a housing 72 with a plug 74 wire can be inserted into the port or jack 54 of the device 50. The discussion of the functions of module 70 applies to the other modules of other embodiments described in greater detail later.

The component 70 can be used to process, distribute, manipulate or otherwise handle a signal from the device 50 that is communicated via the plug 74 to component 70. The component 70 may include a transmitter 76 that can transmit signals externally from the housing 72 to a different object or device via one of several types of communications, including RF, IR, a light such as a bulb or an LED, wired, audio, video, Bluetooth, WiFi, ZigBee, or other wireless communication. The component 70 can be directly coupled to the jack and as a result, the component 70 can be powered by drawing power from the electronic device 50. In one implementation, the component 70 may include a AC/DC converter for this purpose.

The signal from the device 50 may be an audio signal and/or a video signal which includes an encoded or embedded signal therein. The module 70 includes audio decoding circuitry 75 that can decode the encoded or embedded signal to a known or usable signal, which can be processed and assigned a code and subsequently transmitted by the transmitter 76 to a receiver of a different device. The embedded or encoded signal can be used to drive functionality (such as generating an output like an action) in the different device.

The encoding of signals may be accomplished by embedded a tone in an audio or sound file such as a song. A decoder, which is programmed to identify the tone frequency of the song, can be used to filter out the embedded signal which is different than the tone frequency of the song. Alternatively, inaudible tones, either lower or higher than a human's hearing range, can be used with the audio signal. Some electronic devices have an audio range of typically 20-22 kHz at the higher end of the range and as low as 10 Hz at the lower end of the range. In another embodiment, the pulse width of the tones can be used to communicate a signal. The decoder or processor can count the pulse width of the tones. The sinusoidal wave audio file can be chopped or separated into pulses, the frequency of which can be analyzed and the embedded signal identified.

In other embodiments, the encoding or embedding of data or information can be accomplished using monotones, duotones, a sequence of monotones and/or duotones, dual-tone multi-frequency (DTMF) signaling, a mixture of particular tones (such as to form a code using a timed sequence of tones), a frequency change in the tones of a signal, multiple tones at the same time, audible tones, or inaudible tones.

The electronic device may have a record application programming interface (API) to process real time audio as it is coming in to the electronic device. The application functions as a decoder of the audio input as it is receive. In one embodiment, the functioning of the electronic device can be changed by clicking on/off the microphone jack, which would allow the detection of the sound, such as a pop, to be used as a signal. Some functionality may be to advance to the next song, to turn the device on, etc. Also, for example, the microphone jack can detect a press and hold on the microphone line as opposed to a single press. Alternatively, by pressing and holding the line, the circuitry of the electronic device may be coupled to an AC/DC circuit.

As shown in FIG. 4, in an alternative embodiment, the housing 72 may include a port or jack 78 into which another plug, such as plug 62, can be inserted. Thus, the module 70 can be used to receive and process one or more signals from the device 50 and then audio signals can be heard by the user via headphones 66 and 68 when component 60 is coupled to the module 70.

In yet another embodiment, the component 80 may include a plug 82 connected to a wire 84 that is coupled to a dongle 86. The dongle 86 includes a system 88 that can process a signal from the device 50 and transmit the processed signal or a coded signal externally.

In another embodiment, the component 90 may include a plug 92 connected to a wire 94 that has a connector 96 also connected to it. The connector 96 can be coupled to another device or object and the signal from device 50 transmitted through the wire 94. For example, an electronic device, such as an iPhone mobile digital device, can be plugged into a separate device and an image or other signal can be transferred from one device to another device.

In another embodiment, also shown in FIG. 4, the component 100 includes a plug 102 connected to a wire 104 that is wired to a toy 106. In this implementation, signals from device 50 are transmitted through the wire 104 to the toy 106.

In different embodiments, one or more of the plugs 62, 72, 82, 92, and 102 can be connected to the housing 52 of the device 50 and not removable.

Referring back to FIG. 2, the electronic device 20 may include a visual output component 24, such as a screen or display. In one mode of operation, the screen 24 can be used as an input for the electronic device 20. In another mode of operation, the screen 24 can be used as an output for the electronic device 20.

Figure 5:
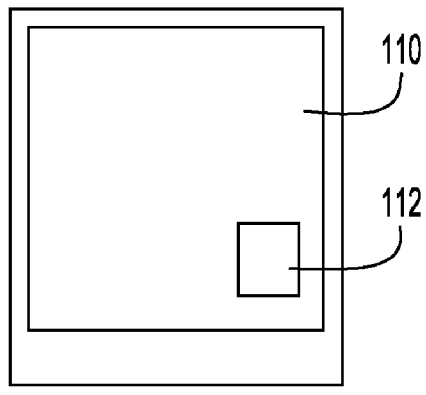
FIGS. 5-8 illustrate different displays or screens of an electronic device according to an embodiment of the invention.

Referring to FIGS. 5-8, some exemplary visual output components 24 are illustrated. In FIG. 5, a screen 110 is illustrated with a particular region 112 that is used to communicate information from the device having screen 110. While region 112 is illustrated in FIG. 5, as a small area of screen 110, in different embodiments, the region 112 can be as large as the entire viewing area of the screen 110. Thus, one or more images in the region 112 (whether full screen or smaller portion of the screen) can flash. The pattern of the flashing (such as the frequency of flashes), the content of the flashing, the color or colors that are flashed are different ways and techniques by which information or data can be communicated from the device externally.

Figure 6:
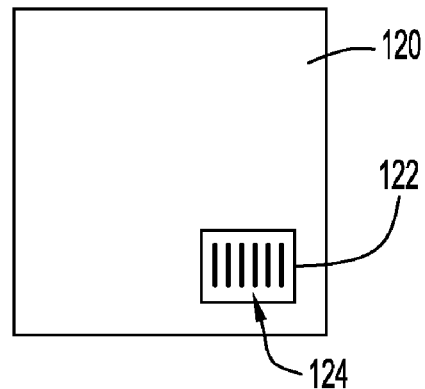

Referring to FIG. 6, the screen 120 may include a portion or region 122 that has a barcode 124 displayed. The content of the barcode 124 can be changed as desired to communicate different information. In other words, the barcode 124 can be flashing or the content or arrangement of the barcode 124 can vary. In one embodiment, the barcode 124 can be a three dimensional barcode.

Figure 7:
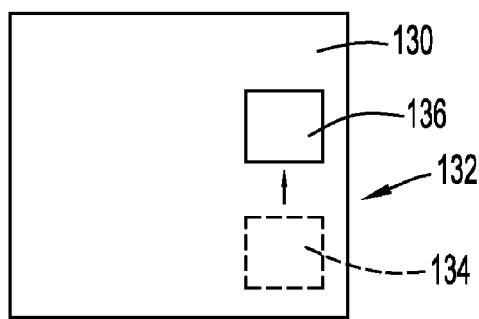

Referring to FIG. 7, the screen 130 may include a portion or region 132 that is a different color or image than the remainder of the screen 130. In this mode of communication, the region 132 can move from a first position 134 to a second position 136. Some of the different techniques of communicating information using the region 132 include, but are not limited to, the speed at which region 132 moves from position 134 to 136, the location of position 136, the direction or path of movement of region 132, and any change in the size of region 132 while in positions 134 and 136 or moving therebetween.

Figure 8:
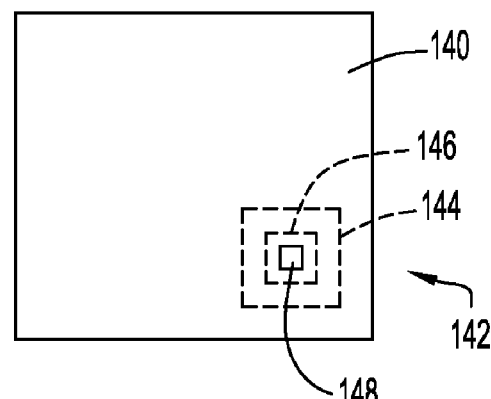

Referring to FIG. 8, the screen 140 may include a portion or region 142 that is used to communicate information. In this mode of communication, the region 142 changes in size to communicate information. For example, during the elapsing of time, the size of the region 142 may change from a larger size 144 to a smaller size 146 and to an even smaller size 148. The particular sizes 144, 146, and 148 and the rate at which the size of region 142 changes are two exemplary ways in which the region 142 can be used to communicate information.

In summary, in each of the FIGS. 5-8, the regions 112, 122, 132, and 142 can be flashed in whole or in part, the location can change, and/or the color and/or image in the region can change. For example, a corner of the screen of the electronic device can have a flashing part to provide an input or signal into the screen. In addition, the flashing part can be an emitter in that it emits a signal from the device.

Referring to FIG. 9, the communication between two devices which are in contact with each other is illustrated. In this arrangement, electronic device 150 is in contact with or is touching electronic device 160. The contact between the devices 150 and 160 facilitates the communication of information between the devices 150 and 160. One manner in which such communication can occur is to place the devices 150 and 160 so that their screens are facing each other and each may include a photo detector or camera that can be used to input data.

Referring to FIG. 10, in this embodiment, electronic device 150 includes a sensor 152. Sensor 152 can be an accelerometer or a piezoelectric element. Electronic device 160 includes a generator or actuator 162 that can be activated to generate a signal. In one implementation, the generator 162 can be a vibrating element, such as a pager motor, an off-center weight that is driven, or other device that creates vibrations. Such vibrating elements can be activated to provide a haptic output. The generator 162 can be a transducer that generates vibrations when audio output is generated and produced by the transducer.

The vibrations or movements generated by the generator or actuator 162 can be felt by the electronic device 150, and in particular, by the sensor 152 because the devices 150 and 160 are in contact. Alternatively, electronic device 150 may have a microphone that can hear the other device 160 buzzing or a tapping on the device 150 using a vibrating or shaking device to input via morse code into device 150.

The sensor 152 of the device 150 can be used to identify the other device that is placed in contact with electronic device 150. For example, there may be multiple devices 160, 170, and 180, each of which includes a generator 162, 172, and 182, respectively. Each of the actuators or generators 162, 172, and 182 produces a different output signal, such as vibrations at different frequencies. For example, actuator 162 may vibrate at a frequency greater than actuator 172 which vibrates at a frequency greater than actuator 182.

Electronic device 150 includes an electronic system that is configured to identify the particular device placed in contact with electronic device 150. The identification of the device 160, 170, or 180 is based on the signal or pattern detected by sensor 152 and identified by the system of the device 150.

Figure 11:
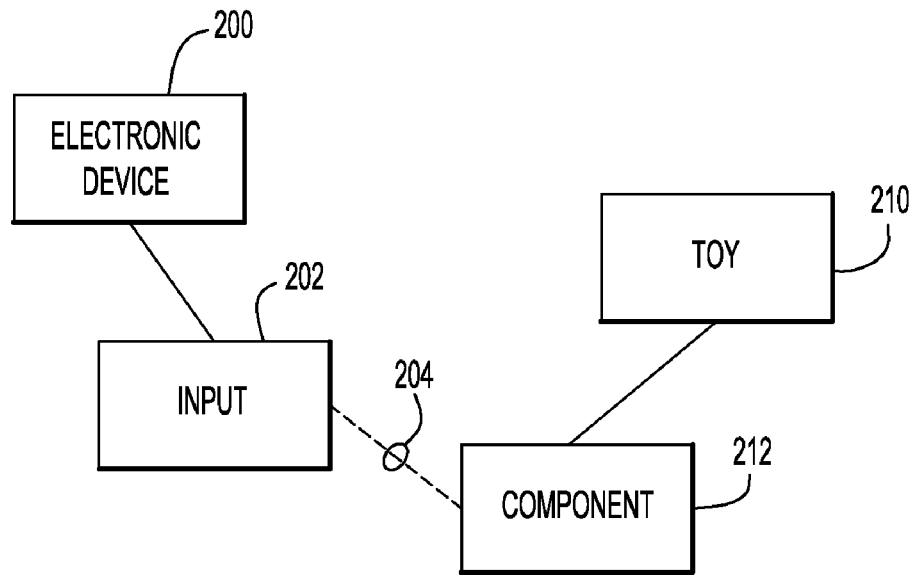
FIG. 11 illustrates a schematic block diagram of communication between an electronic device and a toy according to an embodiment of the invention.

Referring to FIG. 11, another embodiment of the invention is illustrated. In this embodiment, an electronic device 200 has an input or input mechanism 202 that can be engaged or actuated to provide an input to device 200. Another device, such as a toy 210, includes a component 212 that can be used to identify the device 210. The component 212 can be brought into contact with the input 202 of electronic device 200 as shown by dashed line 204. The electronic device 200 has an electronic system that uses signals from input 202 to control one or more outputs from device 200 and/or data that is input into the device 200 for processing and/or storage.

Figure 12:
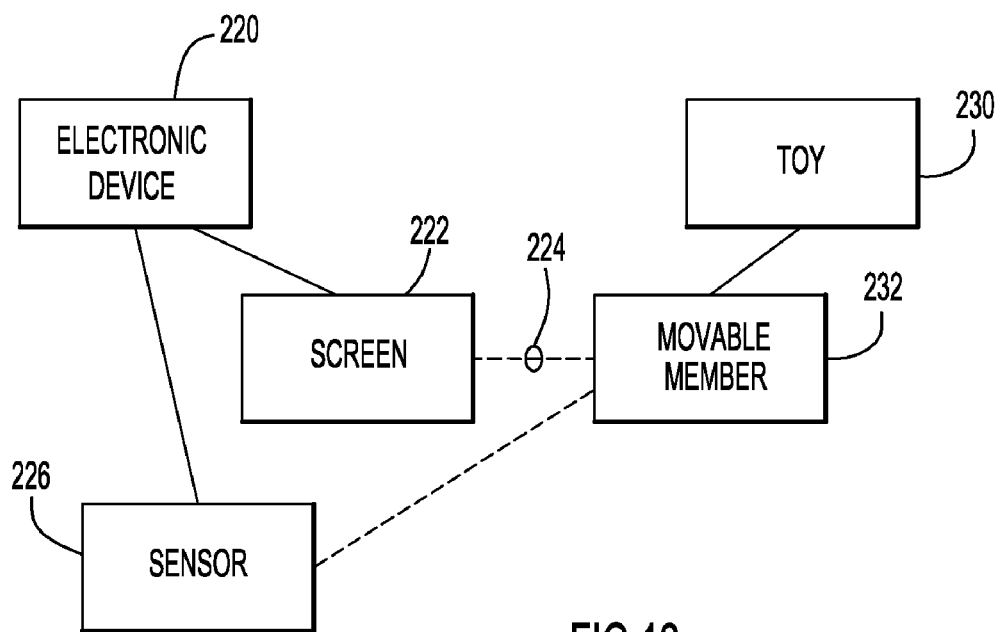
FIG. 12 illustrates a schematic block diagram of another communication between an electronic device and a toy according to another embodiment of the invention.

Referring to FIG. 12, electronic device 220 includes a screen 222 which functions as an input mechanism for electronic device 220. In one embodiment, the screen 222 can be a touch screen and the operating system of the device 220 can be connected to the screen 222 so that signals generated by the screen 222 can be processed by the device 220. Another device, such as a toy 230, may include a movable member 232 that can be brought into engagement with the screen 222 as shown by dashed line 224. The member 232, whether stationary or moving, can engage the screen 222 which uses the particular contact between the member 232 and the screen 222 to determine the identification of the member 232 and the toy 230 based on the detected signals. Different toys 230 can be brought into contact with the screen 222 which can determine the identification of the toy 230 based on the contact with the screen 222.

Figure 13:
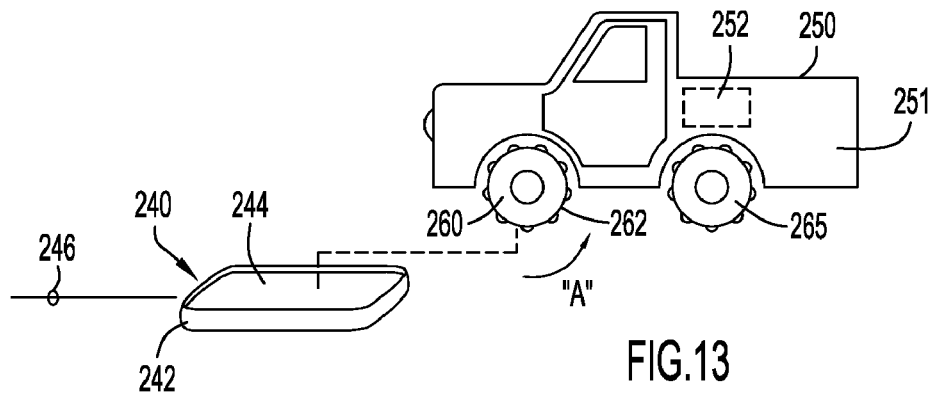
FIG. 13 illustrates a view of an electronic device and a toy for use therewith according to an embodiment of the invention.

Referring to FIG. 13, an electronic device 240 having a housing 242 with a screen or display 244 is illustrated. The shape of the housing 242 can vary and in this embodiment, the housing 242 has a longitudinal axis 246. Screen 244 is a touch screen and can be referred to alternatively as a touch panel or touchscreen panel as well. The touch screen can be used as an input device and depending on the particular type of touch screen, a different type of input is used therewith. One type of touch screen is a pressure-sensitive or resistive touch screen. Another type of touch screen is an electrically-sensitive or capacitive touch screen. Another type of touch screen is an acoustically-sensitive touch screen that uses surface acoustic waves. A yet another type of touch screen is a photo-resistive (infrared) touch screen. A capacitive touch screen has a layer of capacitive material that holds an electrical charge. Touching the screen changes the amount of charge at a specific point of contact, which can be determined based on the change in the charge. A resistive touch screen is activated when pressure from an object, such as a human's finger, causes conductive and resistive layers of circuitry to touch each other. The result of the contact is a change in the circuit's resistance, and the location of the change can be determined by the device.

Also shown is another device 250, which in this embodiment is a toy vehicle. The device or toy vehicle 250 has at least one movable member that is driven for movement relative to the body 251 of the toy vehicle 250 by a drive mechanism 252. One movable member is in the form of a wheel 260 which is rotated relative to the body 251. The wheel 260 can be rotated along the direction of arrow "A." The toy vehicle may have additional wheels 265 as well.

Figure 14:
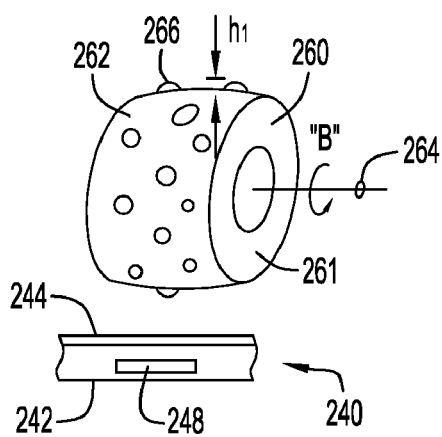
FIG. 14 illustrates a view of the electronic device and a wheel of the toy of FIG. 13.

Referring to FIG. 14, a perspective view of wheel 260 is illustrated. The wheel 260 includes a body 261 with an outer surface 262 that extends along the portion of the wheel 260 in contact with a surface as the wheel 260 rotates. The wheel 260 also includes several bumps or protrusions 266 that extend outwardly from the outer surface 262. The protrusions can be referred to as nubs. The wheel can be mounted for rotation about axis 264 along the direction of arrow "B." The wheel 260 can be formed of molded plastic, a rubber-like material, or other similar material.

In one embodiment, the protrusions 266 are integrally formed with the body 261 of the wheel 260. In an alternative embodiment, the protrusions 266 are formed separately from the wheel 260 and coupled to the body 261 by a friction fit, a snap arrangement, an adhesive, or another coupling technique or mechanism. For wheel 260, the protrusions 266 may extend a distance "h1" from the outer surface 262 of the wheel 260. In an alternative embodiment, the distance that the protrusions 266 extend from the outer surface 262 of the wheel 260 may vary.

As the wheel 260 rotates, the wheel 260 is brought into contact with the screen 244 of electronic device 240. In this embodiment, the protrusions 266 are arranged in three rows that extend around the outer surface 262 of the wheel 260. In a different embodiment, the protrusions 266 can be arranged in fewer or more than three rows.

Figure 15:
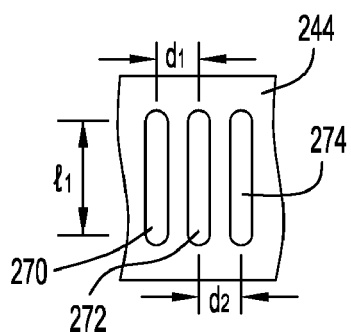
FIG. 15 illustrates an exemplary pattern of marks on the electronic device of FIG. 13.

The electronic device 240 may be running a program or application that changes color or appearance of the locations or areas of the screen 244 that are contacted by an object. Referring to FIG. 15, an exemplary pattern of contact of the protrusions 266 on rotating wheel 260 with the screen 244 is illustrated. As shown, areas 270, 272, and 274 are created on the screen 244 as protrusions 266 engage the screen 244 and move therealong in contact until continued rotation of the wheel 260 results in the particular protrusions 266 no longer contacting the screen 244. Areas 270, 272, and 274 can be substantially the same length "l1" provided that the radius of the outer surface 262 of the wheel 260 and the height "h1" of the protrusions are substantially the same.

When the protrusions 266 are located in three rows extending around the wheel 260, the areas 270, 272, and 274 have row-like shapes that are spaced apart by the distances between the rows of protrusions 266 on the wheel 260. As shown, areas 270 and 272 are spaced apart by a distance "d1" and areas 272 and 274 are spaced apart by a distance "d2." In different embodiments, the distances "d1" and "d2" are the same or can be different from each other.

Figure 16:
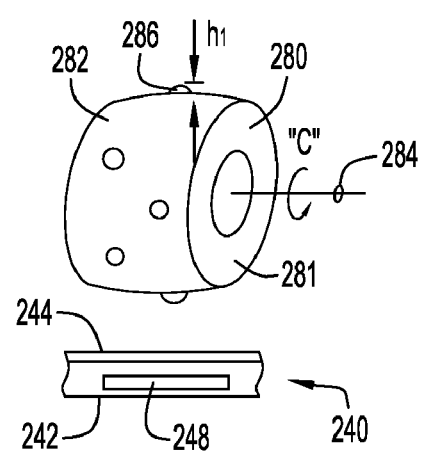
FIG. 16 illustrates a view of the electronic device of FIG. 13 and a wheel of a different toy.

As mentioned above with respect to FIG. 12, the screen of an electronic device can be used to identify a particular device or object that is brought into contact with the electronic device. Referring to FIG. 16, a different wheel 280 is illustrated. In one implementation, wheel 280 is coupled to a different toy body (not shown) and forms a part of a different toy vehicle, such as a sedan, truck or other vehicle (not shown).

Figure 17:
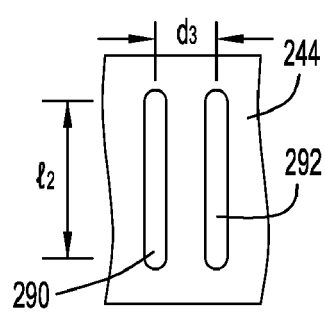
FIG. 17 illustrates an exemplary pattern of marks on the electronic device of FIG. 13 with the wheel of FIG. 16.

Wheel 280 includes a body 281 that has an outer surface 282 with several bumps or protrusions 286 extending therefrom. The body 281 is configured to rotate along the direction of arrow "C" about axis 284. As compared to wheel 260 illustrated in FIG. 14, wheel 280 include few protrusions 286 located around the outer surface 282. In this embodiment, the protrusions 286 are located in rows around the outer surface 282 and when engaged with the screen 244, areas 290 and 292 (see FIG. 17) are formed on the screen 244. The length dimension "l2" of the areas 290 and 292 and dimension "d3" between the areas 290 and 292 can vary depending on the protrusions 286.

In one variation, the front wheels and the rear wheels of a toy vehicle can vary. In particular, the protrusions located on the front wheels and the rear wheels can be different. For example, the protrusions may be in a different pattern, may have a different height, may be in a different quantity, and/or may have different spacing. In addition, the diameters of the outer surface of the front wheels and the rear wheels may be different, which would result in different length areas being created on the surface of the screen of an electronic device based on the engagement of the wheels with the screen.

Thus, instead of the electronic device identifying different devices or toys based solely on each wheel of a toy being the same, each toy may have two or more different wheels and the electronic device may be running an application that prompts a user or otherwise anticipates that the user will put at least two different wheels from a toy vehicle in contact with the screen of the device. Accordingly, the order and manner in which the user places multiple wheels of a toy in engagement with the screen is part of the identification process.

Referring back to FIG. 14, the electronic device 240 may include a sensor 248, such as a piezoelectric element, that can sense or pick up vibrations to the housing 242. The vibrations can be imparted to the housing 242 based on the contact of an object with any part of the housing 242, such as the screen 244 or the rear surface of the housing 242.

When wheel 260 is rotated about axis 264, the protrusions 266 engage the device 242 (either via the screen 244 or another surface of the housing 242) and such engagement creates a particular pattern of vibrations or movements imparted to the device 240 as protrusions 266 engage the device 240. The pattern of vibrations depends in part on the quantity of protrusions 266, the height of the protrusions 266, the spacing of the protrusions 266, and the speed of rotation of the wheel 260. Similarly, when wheel 280 is rotated about axis 284 and engaged with device 240, the protrusions 286 create a vibration or vibrating effect that is different than wheel 260 because the configuration of protrusions 286 are different than the configuration of protrusions 266.

The sensor 248 in electronic device 240 can detect the vibrations imparted to device 240 and the particular wheel 260 or 280 and the particular toy vehicle to which the wheel corresponds can be identified.

In an alternative embodiment, a toy can be made of a conductive rubber with bumps on the surface on a particular pattern. The bump pattern could be detected by an electronic device with a multi-touch screen. For example, the electronic device may detect a change in capacitance or charge on the touch screen when that toy is placed on the screen of the electronic device and touched with a finger of a user. In alternative embodiments, the electronic device may detect one or more changes in physically-, electrical resistance-, acoustical-, or photo-related properties of the touch screen when the toy is placed on the screen. In one embodiment, an entire keyboard structure can be provided via the touch screen of an electronic device using such a structure. The touch screen may have a grid with different spots or input areas defined thereon that may be contacted by the item placed on the touch screen. While the item may define many contact areas for the user (such as a keyboard), the grid on the touch screen may have fewer areas defined thereon provided that a microcontroller can determine the particular input from the user on the item.

In one embodiment of the invention, an object can interact with an electronic device. Such an object can be a toy that is altered slightly to create unique characteristics that can be detected by an electronic device. To stimulate a touch screen of an electronic device, the object may appear to the screen to like one or more fingers of a human.

Figure 18:
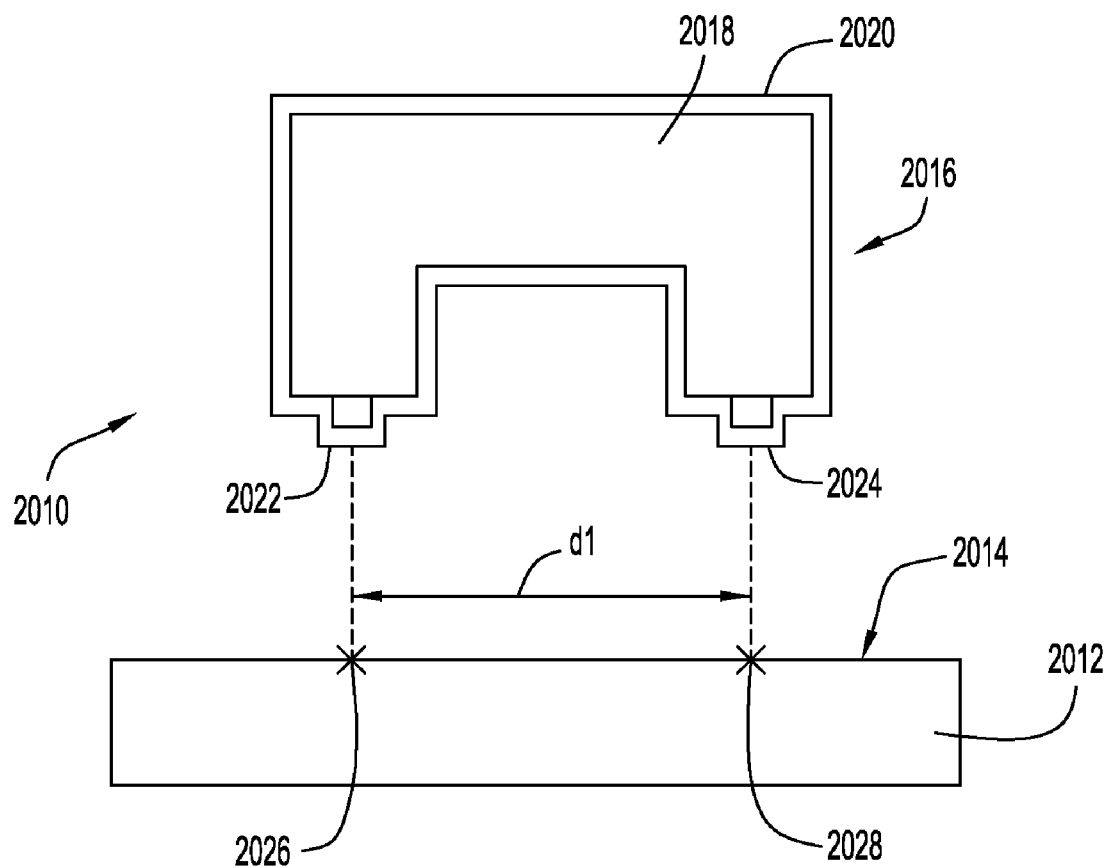
FIG. 18 illustrates a schematic diagram of a system for identifying an object according to an embodiment of the present invention.

FIG. 18 illustrates a schematic diagram of a system 2010 for identifying an object according to an embodiment of the present invention. In some implementations, one type of "identifying" of an object includes recognizing and confirming whether the object is an appropriate or proper object for use with an application running on a device. In some implementations, the "identifying" of an object includes determining whether the object is in a proper location or space on the touch screen and whether the object is an appropriate object for use with the application running or operating on the device. In other implementations, another type or level of "identifying" of an object includes determining the particular category of the object, such as a toy vehicle or toy figure, or a certain type of toy vehicle or toy figure. In yet other implementations, another type or level of "identifying" of an object includes determining the particular identity of the object. As described herein, the particular information that is confirmed or determined, or otherwise "identified," for an object can be used by the application in a variety of manners.

The system 2010 includes an electronic device 2012 having a touch screen 2014 and a recognizable object 2016. In one implementation, the object 2016 is conductive and can be placed in contact with or proximate to the touch screen 2014 of the electronic device 2012, such as an iPhone®, an iPad®, an iPod Touch®, or similar electronic device with a touch screen.

In one embodiment, the conductive object 2016 includes a plastic core 2018, which has been substantially coated or encased with a conductive material 2020, such as conductive silicone applied via a vacuum metalized process or a conductive paint. Alternatively, the object may be a metal object, a die cast conductive object, a conductive rubber object, a plain rubber object with conductive rubber coating, a co-molded object having some conductive regions, or an object with a conductive coating resulting from being dipped into a conductive material, such as copper. Also, the object may be either hard or soft. When a user holds the object 2016, the charge in the touch screen 2014 at the location or locations where the object 2016 is positioned proximate to or in contact with the touch screen 2014 changes because some of the charge is transferred to the user due to the conductive coating 2020 on the object 2016 and the user contacting the coating 2020. The result is that the device can determine the location or locations at which there is a change in capacitance of the touch screen 2014 as caused by the change in the charge of a layer of the touch screen 2014. Thus, the object 2016 may be capacitively coupled to the touch screen 2014, thereby allowing the contact point or points of the object 2016 to be detected.

The object 2016 includes a first contact member 2022 engageable with the touch screen 2014 and a second contact member 2024 engageable with the touch screen 2014. The contact members 2022, 2024 are spaced from each other and effective form a multi-tipped stylus. The electronic device 2012 senses the locations of each of the contact members 2022, 2024 when the contact members 2022, 2024 engage or are proximate to the touch screen 2014. The electronic device 2012 then determines the distance d1, such as a quantity of pixels, between the two sensed contact (or proximity) points 2026, 2028 of the contact members 2022, 2024 on the touch screen 2014, respectively. The distance d1 between the contact points 2026, 2028 corresponds to the spacing between the contact members 2022, 2024. This distance d1 is associated with the particular object 2016, such as a particular toy figure or toy vehicle. Thus, the conductive object 2016, when placed on the touch screen 2014, conducts the charge from a user to the touch screen 2014, which is detected by the device 2012 as a recognizable pattern or geometric arrangement of touches or contact points 2026, 2028. The pattern of contact points 2026, 2028 defines an identification for the object 2016. According to the present invention, the term "identification" of an object and the term "identifying" an object may encompass multiple levels of information determining. In one embodiment, the identification is the recognizing or confirming that the object is not one or more human's fingers. In particular, this confirmation may be a determination that the object is a proper object to be used with a particular application operating on the electronic device. For example, the application may be looking for a particular pattern of contact points, indicating that the object is a proper or correct object to be placed in contact with or proximate to the touch screen 2014, before the application provides the user with access to a different part of the application or with other information. In another embodiment, the identification is the recognizing or confirming that the object proximate to or in contact with the touch screen 2014 is of a particular category of objects, such as toy vehicles or figures. In this implementation, if the application confirms that the object is of a particular type or category that is proper or correct to be used with the application, then the application can provide additional content or information or access to different portions of the application. In another embodiment, the identification is unique to the particular object 2016 and encompasses unique, specific information, such as an object-specific identity. At this level of identification, the exact identity of the object can be determined and content or information specific to that object can be output or obtained.

Thus, the particular object 2016 is identified based on the distance d1 between the sensed contact points 2026, 2028. The contact members 2022, 2024 define a pattern of contact points 2026, 2028 on the touch screen 2014 (when the object 2016 is engaging or proximate to the touch screen 2014), which is recognizable by the electronic device 2012 for identifying the object 2016. Further, the location of the object 2016 on the touch screen 2014 may be determined based on the location of the contact points 2026, 2028 on the touch screen 2014.

The specific configuration of the object usable with the disclosed systems herein may vary. For example, the object may be a configured as a toy figure, a toy vehicle, a toy building, or some other structure.

Referring to FIG. 19, in one embodiment, the object is configured as a toy action FIG. 2030. The FIG. 2030 includes a torso 2032 and appendages, such as a head 2034, arms 2036, 2038 and legs 2040, 2042. An underside 2044 of a foot 2046 of the leg 2040 includes a first contact member 2048, and an underside 2050 of a foot 2052 of the other leg 2042 includes a second contact member 2054. When placed on or proximate to the touch screen 2014 of the electronic device 2012, the first and second contact members 2048, 2054 define first and second contact points 2056, 2058. The electronic device 2012 senses the contact points 2056, 2058 and considers them to be figures of a human. A distance d2 between the contact points 2056, 2058 is determined by the electronic device 2012. The determined distance d2 is then associated with an identification of the specific toy FIG. 2030.

In one embodiment, the torso 2032 is rotatable relative to the legs 2040, 2042. The head 2034 and/or arms 2036, 2038 may also rotate and/or move relative to the torso 2032. However, the legs 2040, 2042 and feet 2046, 2052 of the FIG. 2030 remain in a fixed position relative to each other. Thus, the spacing between the first and second contact members 2048, 2054, and distance d2 between the corresponding contact points 2056, 2058, remains constant. As a result, the identification of the action FIG. 2030 remains constant.

An action FIG. 2060 having an identification different than the identification associated with FIG. 2030 is illustrated in FIG. 20. Similar to action FIG. 2030, action FIG. 2060 also includes a torso 2062, a head 2064, arms 2066, 2068 and legs 2070, 2072. The arms 2066, 2068, legs 2070, 2072 and/or head 2064 of the FIG. 2060 have a different configuration compared to the corresponding appendages of the FIG. 2030. The legs 2070, 2072 are configured so that the FIG. 2060 appears to be kneeling down on a knee 2074 of the leg 2072. The leg 2070 includes a first contact member 2076, and the other leg 2072 includes a second contact member 2078. In particular, an underside 2080 of a foot 2082 of the leg 2070 may include the first contact member 2076. A portion of the knee 2074 engageable with the touch screen 2014 of the electronic device 2012 includes the second contact member 2078. When placed on the touch screen 2014, the first and second contact members 2076, 2078 define first and second contact points 2082, 84, respectively. The distance d3 between the contact points 2082, 2084 corresponds to the distance between the contact members 2076, 2078. The electronic device 2012 may therefore determine the distance d3 when the FIG. 2060 is placed on or is near the touch screen 2014. The identification of the FIG. 2060 is thereby recognized based on the pattern of contact points 2082, 2084 generated by the contact members 2076, 2078.

Another action FIG. 2090 having a unique identification is illustrated in FIG. 21. Action FIG. 2090 includes a torso 2092, a head 2094, arms 2096, 2098 and legs 2100, 2102. The arms 2096, 2098, legs 2100, 2102 and/or head 2094 of the FIG. 2090 may have a different configuration compared to the corresponding appendages of the FIGS. 2030, 2060. The legs 2100, 2102 are configured so that the FIG. 2090 appears to be walking forward. The front leg 2100 includes a first contact member 2104, and the back leg 2102 includes a second contact member 2106. In particular, an underside 2108 of a foot 2110 of the front leg 2100 includes the first contact member 2104, and an underside 2112 of a foot 2114 of the back leg 2102 includes the second contact member 2106. When placed on the touch screen 2014, the first and second contact members 2104, 2106 define first and second contact points 2116, 2118 on the touch screen 2014. The distance d4 between the contact points 2116, 2118 is determined by the electronic device 2012. The determined distance d4 is associated with an identification that is recognized as the FIG. 2090.

Thus, each of the pairs of contact points 2056, 2058 or 2082, 2084 or 2116, 2118 generated by each of the corresponding FIGS. 2030, 2060, 2090 defines a distinct pattern or spacing of contact points. Each specific pattern of contact points is associated with a particular figure. In this way, the electronic device 2012 recognizes a particular FIG. 2030, 2060 or 2090. When a figure is identified, a figure specific output, which may include audio and/or visual components, may be generated by the electronic device. The output may include sound effects, access to previously locked material (such as features, game levels, a diary, etc.), the opening of an online world, a change in the state of a game being played, or the addition of features to a game or application on the electronic device. The use of multiple figures provides the ability for real time competitive gaming on an electronic device, such as an iPad.

Figure 22:
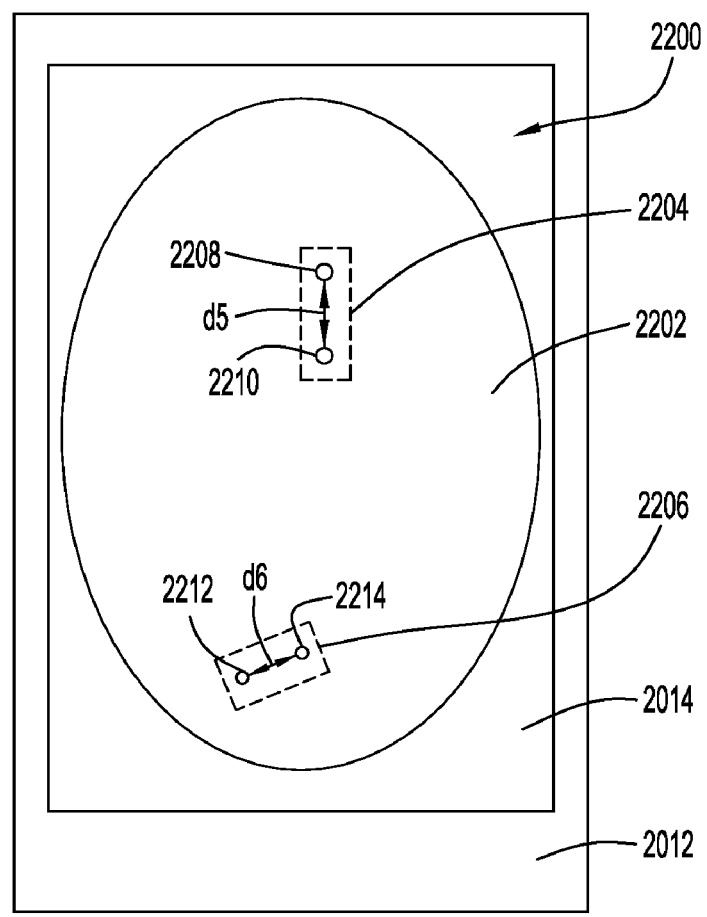
FIG. 22 illustrates a plan view of an electronic device displaying an application operable with the disclosed objects according to an embodiment of the present invention.
Figure 23:
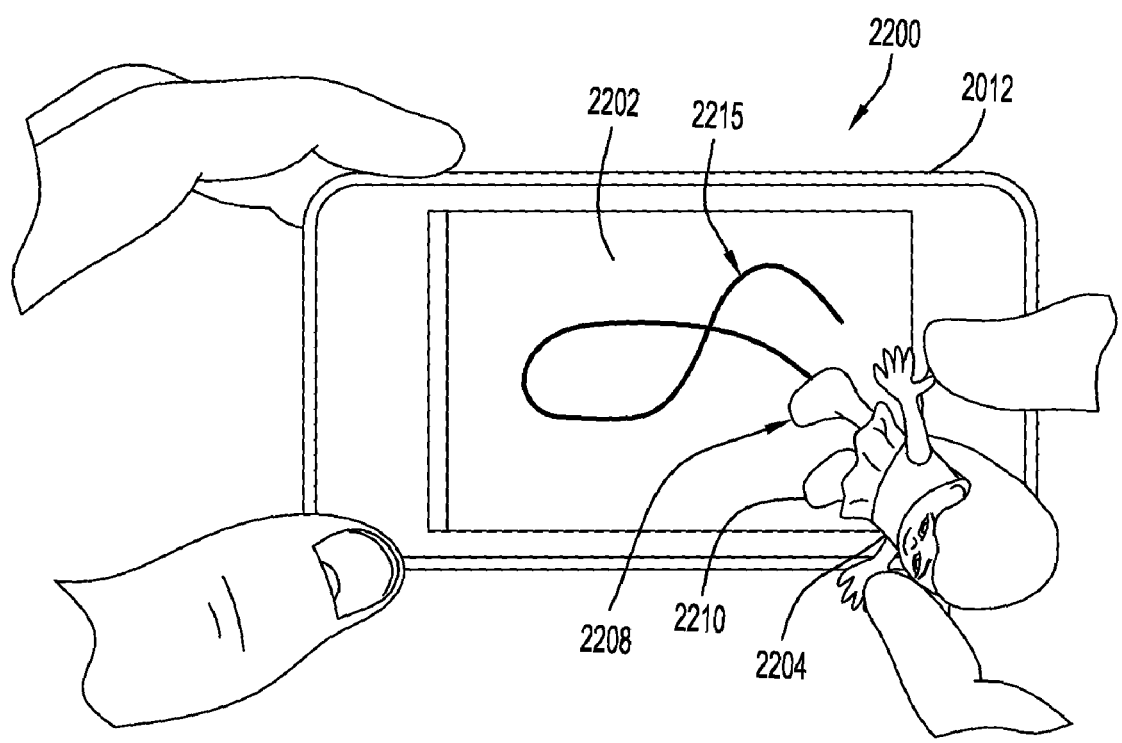
FIG. 23 illustrates a top view of an input object engaging an electronic device.

Referring to FIGS. 22 and 23, an application (e.g. a game) may be operable with the electronic device 2012. For example, an ice skating game 2200 may be operable on the electronic device 2012. The device 2012 displays a simulated ice rink 2202 on the touch screen 2014. One or more objects, such as toy FIGS. 2204, 2206 (shown in phantom in FIG. 22 and shown in FIG. 23), may be placed on the touch screen 2014. One of the FIG. 2204 includes contact members 2208, 2210 (such as feet) spaced by a distance d5, and the other FIG. 2206 includes contact members 2212, 2214 spaced by another distance d6 different than distance d5. When the FIG. 2204 is placed on the touch screen 2014 so that its contact members 2208, 2210 engage or are proximate to the touch screen 2014, a specific pattern of contact points (spaced by distance d5) is recognized by the electronic device 2012. Similarly, when the other FIG. 2206 is placed on the touch screen 2014 so that its contact members 2212, 2214 engage or are proximate to the touch screen 2014, a different pattern of contact points (spaced by distance d6) is recognized by the electronic device 2012. The identifications of the corresponding FIGS. 2204, 2206 are associated with each of the FIGS. 2204, 2206 disposed on the touch screen 2014. Thus, the electronic device 2012 recognizes the identification of each FIG. 2204, 2206, as well as the location of each particular FIG. 2204, 2206 on the touch screen 2014.

As shown in FIG. 22, more than one FIG. 2204, 2206 may be placed on the touch screen 2014. Thus, the electronic device 2012 simultaneously recognizes the identification and location of multiple FIGS. 2204, 2206 on the display screen 2014. Further, any movement of the FIGS. 2204, 2206 on the touch screen 2014 (such as when a user slides the FIGS. 2204 and/or 2206 across the touch screen 2014) is tracked by the electronic device 2012. Referring to FIG. 23, as the toy FIG. 2204 is moved along the touch screen a line 2215 is generated by the application that corresponds to the path along which the toy FIG. 2204 has traveled or "skated." The line 2215 can remain on the screen while the application runs. In addition, an audible output resembling ice skate blades traveling along the ice is generated as the figure moves along the display simulating ice. It should be understood that only one FIG. 2204 or 2206 may alternatively be used at a given time with the device 2012. Alternatively, additional figures may be used (e.g., three or more figures) with the electronic device 2012, whereby all figures are recognized by the device 2012.

Upon recognizing the identification and/or location of the FIGS. 2204 and/or 2206, the electronic device 2012 may generate a visual and/or audio output in response thereto. For example, an image associated with the FIGS. 2204 and/or 2206 (e.g., such as an image representing the figure wearing skates) may be displayed on the touch screen 2014. The image may be aligned with or proximate to the corresponding physical FIG. 2204 or 2206 disposed on the touch screen 2014, and move along with the FIG. 2204 or 2206 as the user or users move the FIGS. 2204 and 2206. In different embodiments, the FIGS. 2204 and 2206 can interact and the output generated and displayed on the touch screen 2014 includes a theme corresponding to the theme of the FIGS. 2204 and/or 2206.

It should be understood that the particular theme of the object and/or application may vary. For example, the toy figure(s) and/or the associated application(s) may be configured as wrestlers, soldiers, superheroes, toy cars, underwater vehicles or creatures, space vehicles or creatures, etc. In an embodiment using wrestler action figures, when a particular wrestler is placed into contact with the touch screen, that wrestler's signature music and/or phrases can be generated by the electronic device.

In different embodiments of the invention, some exemplary applications include a cataloging application which can track the user's figure collection, share stats, etc. Another example application is to use the figures or accessories as keys into an online game, either as play pieces or tokens to enable capabilities, unlock levels or the like.

In one embodiment, the object to be identified by the electronic device 2014 can be a weapon that is useable with the FIGS. 2030, 2060, 2090. For example, the object can be a weapon, such as a sword, that has two or more identifiable contact members projecting therefrom. Each of the contact members is engageable with or can be placed proximate to the touch screen 2014 of the electronic device 2012 when the user holds the weapon near the touch screen 2014. If the electronic device 2012 is running an application that includes a simulated battle with FIGS. 2030, 2060, and 2090, and when prompted by the electronic device 2012, the user engages the weapon with the touch screen 2014, the electronic device 2012 can identify the conductive weapon from its contact members and a simulated weapon in the game on the electronic device 2012 can be associated with one or more of the FIGS. 2030, 2060, and 2090. Accordingly, the user can play with the weapon and one or more of the FIGS. 2030, 2060, and 2090, while the game running on the electronic device 2012 also includes representations of the FIGS. 2030, 2060, and 2090 and the weapon.

Figure 24:
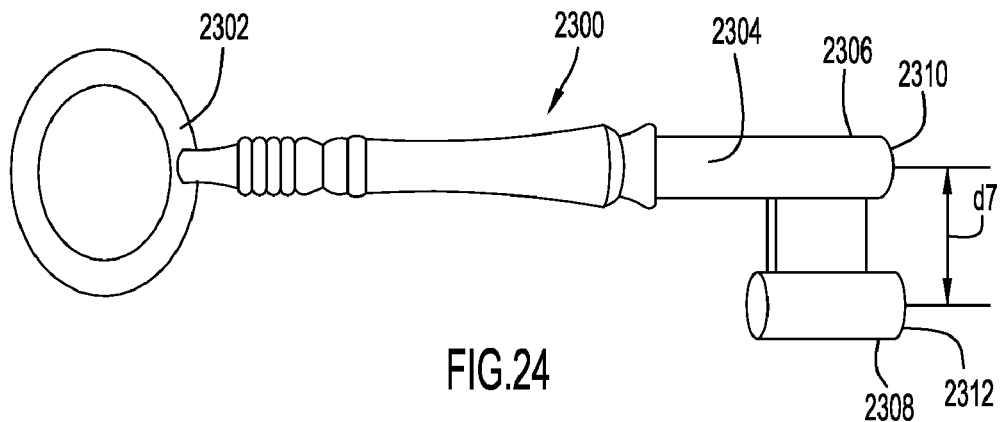
FIG. 24 illustrates a perspective view of another object configured as a key having another identification recognizable by the disclosed systems.

Another embodiment of an object usable with the disclosed system is illustrated in FIG. 24. The object is configured to resemble a key 2300. The key 2300 includes a handle portion 2302 and an opposing end portion 2304 having spaced projections 2306, 2308. One of the projections 2306 includes a first contact member 2310, and the other projection 2308 includes a second contact member 2312. The contact members 2310, 2312 are spaced by a distance d7. In this embodiment, the key 2300 includes a conductive coating covering the key 2300 and defining the outer surface thereof. When a user holds the key 2300, a charge from the user passes along the conductive outer coating on the key 2300 and to the contact members 2310, 2312.

Figure 25:
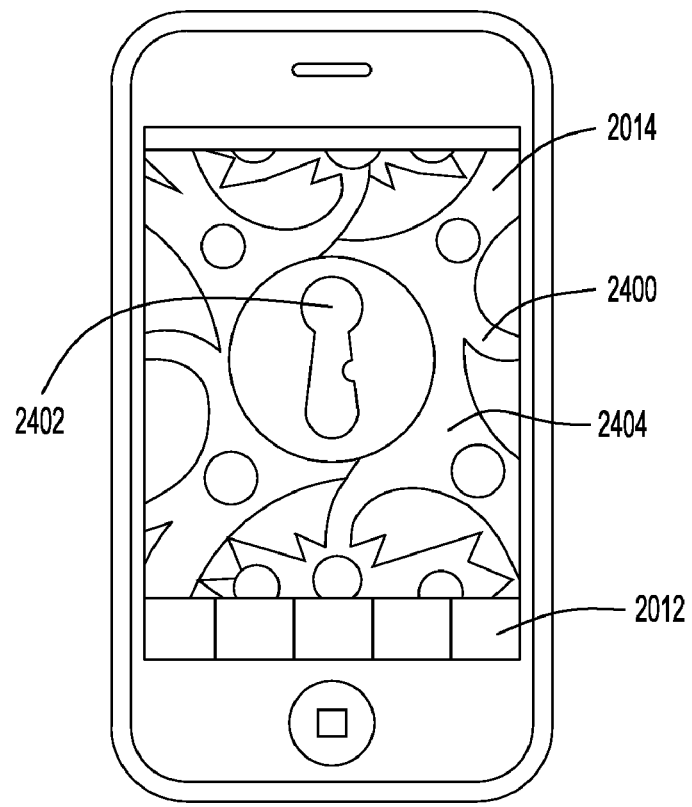
FIG. 25 illustrates a plan view of an electronic device displaying an application operable with the key of FIG. 24.

Referring to FIG. 25, another application operable with an electronic device is illustrated. The application is a game 2400 that includes an environment through which a user must navigate. The environment may include passages, locked doors, hidden treasure, etc. In order to pass through a particular passage, or to advance to another level, the user may be prompted to engage a particular object on the touch screen 2014. For example, at a point in the game 2400, a keyhole 2402 of a lock 2404 is displayed on the touch screen 2014. In order to 'unlock' the lock 2404, the user places the spaced projections 2306, 2308 and thus the first and second contact members 2310, 2312 against the touch screen 2014 in positions aligned with the keyhole 2402.

Referring to FIG. 26, when projections 2306, 2308 of the key 2300 are properly aligned with the keyhole 2402, the contact members 2310, 2312 engage the touch screen 2014 so that a specific pattern of contact points 2406, 2408 (spaced by distance d7) is sensed and recognized by the electronic device 2012. The electronic device 2012 then associates the pattern and location of contact points 2406, 2408 with the key 2300. The key 2300 may then be rotated in a direction X1 (e.g., 90° rotation about a longitudinal axis of the key 2300). The electronic device 2012 detects the corresponding movement of the contact points 2406, 2408, and in turn generates a visual and/or audio output associated with the movement. For example, a rotation of the keyhole 2402 may be displayed on the touch screen 2014, followed by the image of the lock 2404 turning and being unlocked (or an associated displayed door swinging open or vanishing). The user may then navigate past the lock 2404 in the game 2400.

The system is capable of identifying a gesture using the object (e.g., the key), as well as the object itself. A gesture is the movement of contact points across the touch screen. For example, a contact pattern, such as two contact points, can be made distinct from a human's fingers by requiring a gesture which is difficult to make with fingers. In one example, the key-like conductive object 2300 must be rotated some number of degrees, such as 90 degrees. It is difficult, if not impossible, for a user to make this gesture with his or her fingers, while maintaining a constant finger spacing. Accordingly, this gesture component of the system increases the ability to generate an output in response to a particular gesture via the key object-screen interaction, and two distinguish such a gesture from a human attempt to mimic the gesture without the key object. A simple two or three contact ID object, coupled with a requirement of a particular gesture or gestures using the object, creates a more expansive identification system with respect to different applications and outputs that can be generated.

Referring to FIGS. 27-29, the process of determining the movement of an object relative to the electronic device 2012 is illustrated. The application running on the electronic device 2012 is configured so that it can determine the distance between the contact points 2406 and 2408, which are caused by the contact members 2310 and 2312. The contact members 2310 and 2312 of the key 2300 are a fixed distance apart from each other. When the application determines that the distance d7 between the contact points 2406 and 2408 is constant while one or both of the contact points 2406 and 2408 moves relative to the screen 2014, the application determines that the object 2300 is causing the contact points 2406 and 2408 and not a human's fingers, for which the constant distance between touch points is difficult to maintain.

Referring to FIG. 27, when the contact points 2406 and 2408 are in a first orientation 2405, such as that illustrated in FIG. 26, the contact points 2406 and 2408 are spaced apart by a distance d7. In FIG. 28, the contact points 2406 and 2408 have moved along the directions of arrows "7A" and "7B," respectively, to a different orientation 2407. As shown, the distance between the contact points 2406 and 2408 remains the same. Similarly, the contact points 2406 and 2408 have moved along the direction of arrows "7C" and "7D," respectively, to a different orientation 2409, and have the same dimension d7 therebetween.

The application continuously checks the distance d7 and tracks the precise distance between the contact points 2406 and 2408 as the object moves. In one embodiment, once movement of one or both of the contact points 2406 and 2408 is detected, the application checks the distance every $\frac{1}{1000}^{th}$ of a second. The distance between contact points 2406 and 2408 is calculated each time the application checks the distance.

Figure 30:
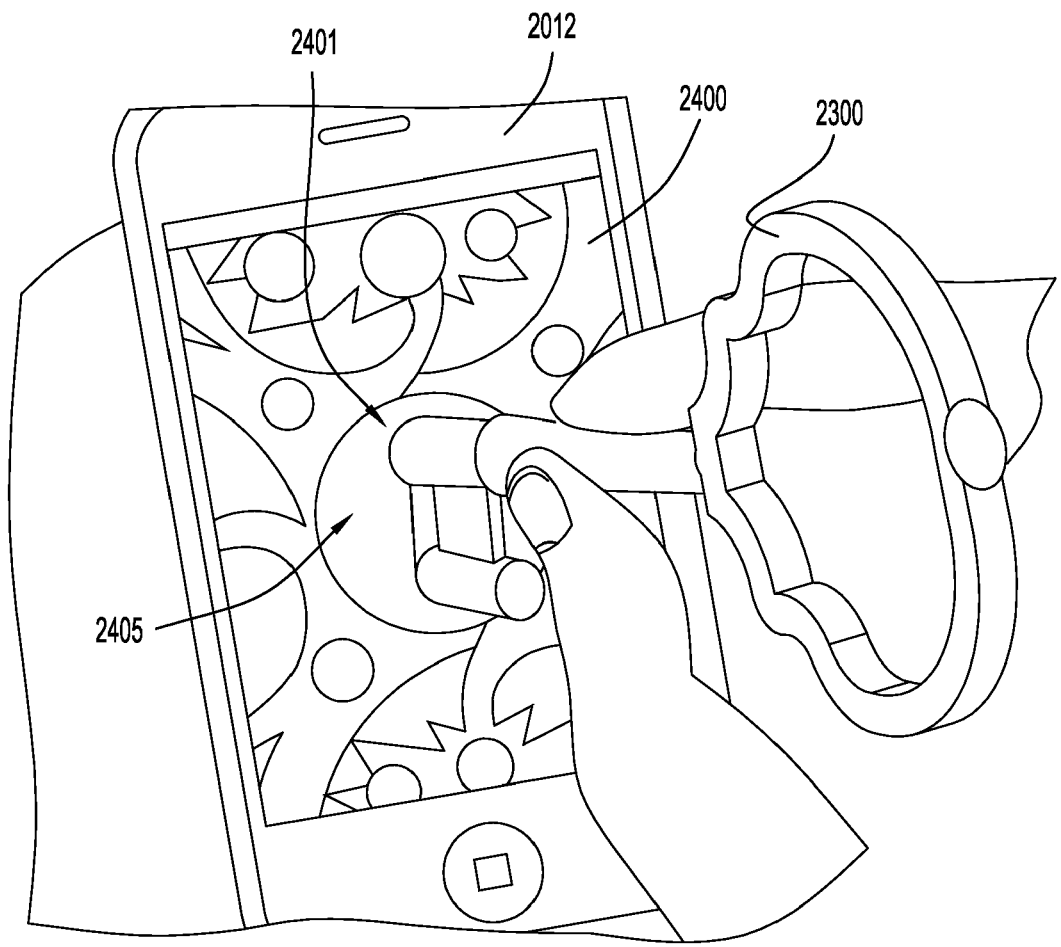
FIGS. 30 and 31 illustrate views of the input object engaging an electronic device and performing a gesture.
Figure 31:
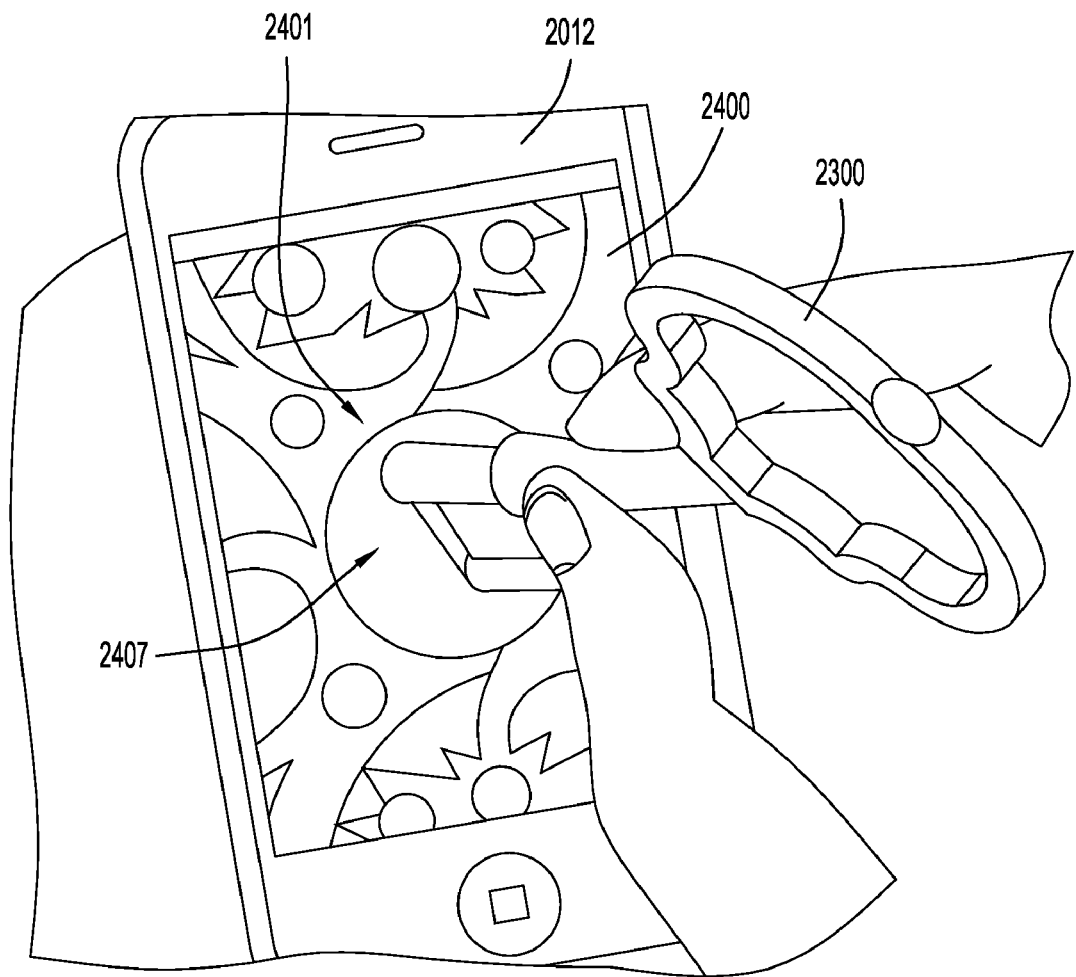

Referring to FIGS. 30 and 31, an exemplary gesture involving the input object 2300 and an exemplary application 2400 running on the electronic device 2012 are illustrated. In FIG. 30, the object 2300 is engaged with a particular region or area 2401 on the touch screen 2014. This orientation of object 2300 corresponds to the orientation 2405 illustrated in FIG. 27. In FIG. 31, the object 2300 is rotated or moved to orientation 2407 (also shown in FIG. 28) and the region 2401 is also rotated because the application has determined that the distance between the contact points created by object 2300 has remained fixed, thereby confirming that it is a proper input object and not the fingers of a human.

Figure 32:
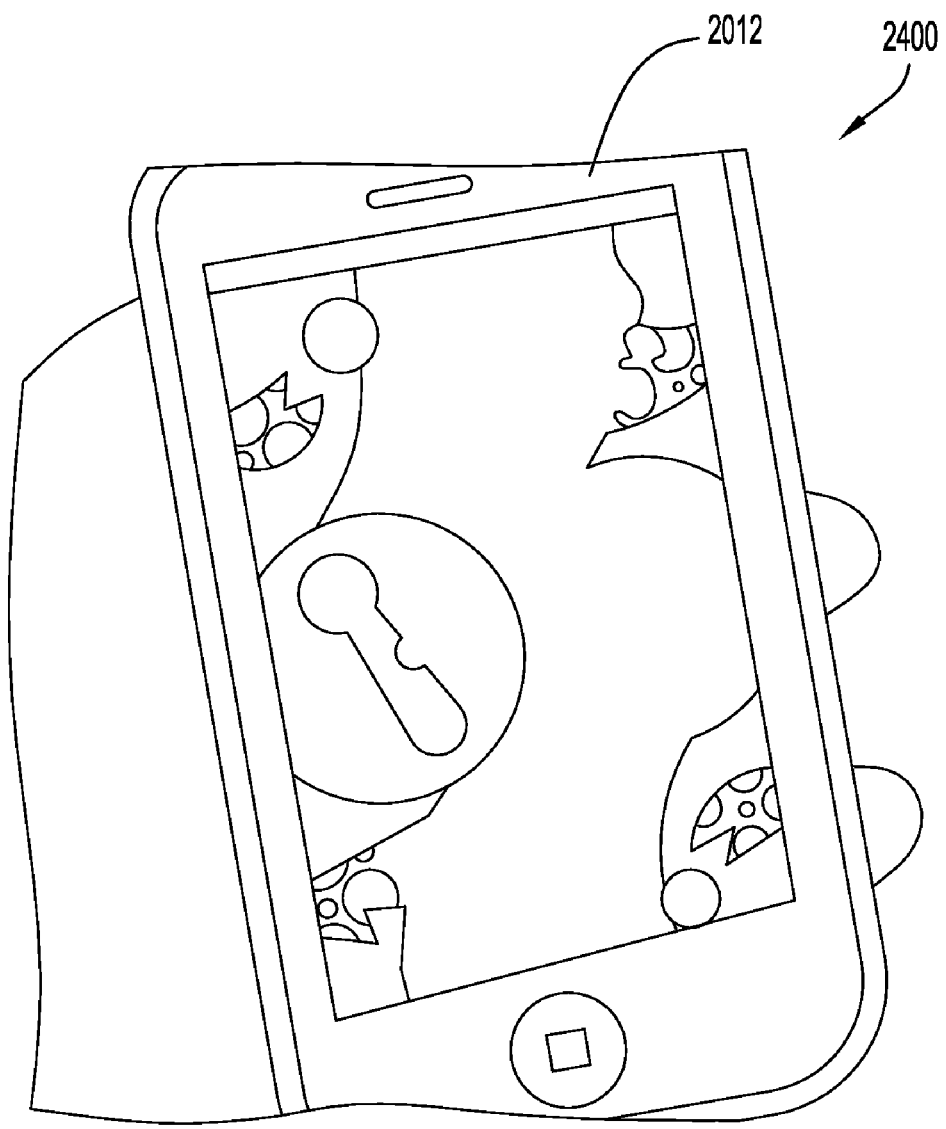
FIGS. 32 and 33 illustrate different screen shots of an application that result from the gesture illustrated in FIGS. 30 and 31.
Figure 33:
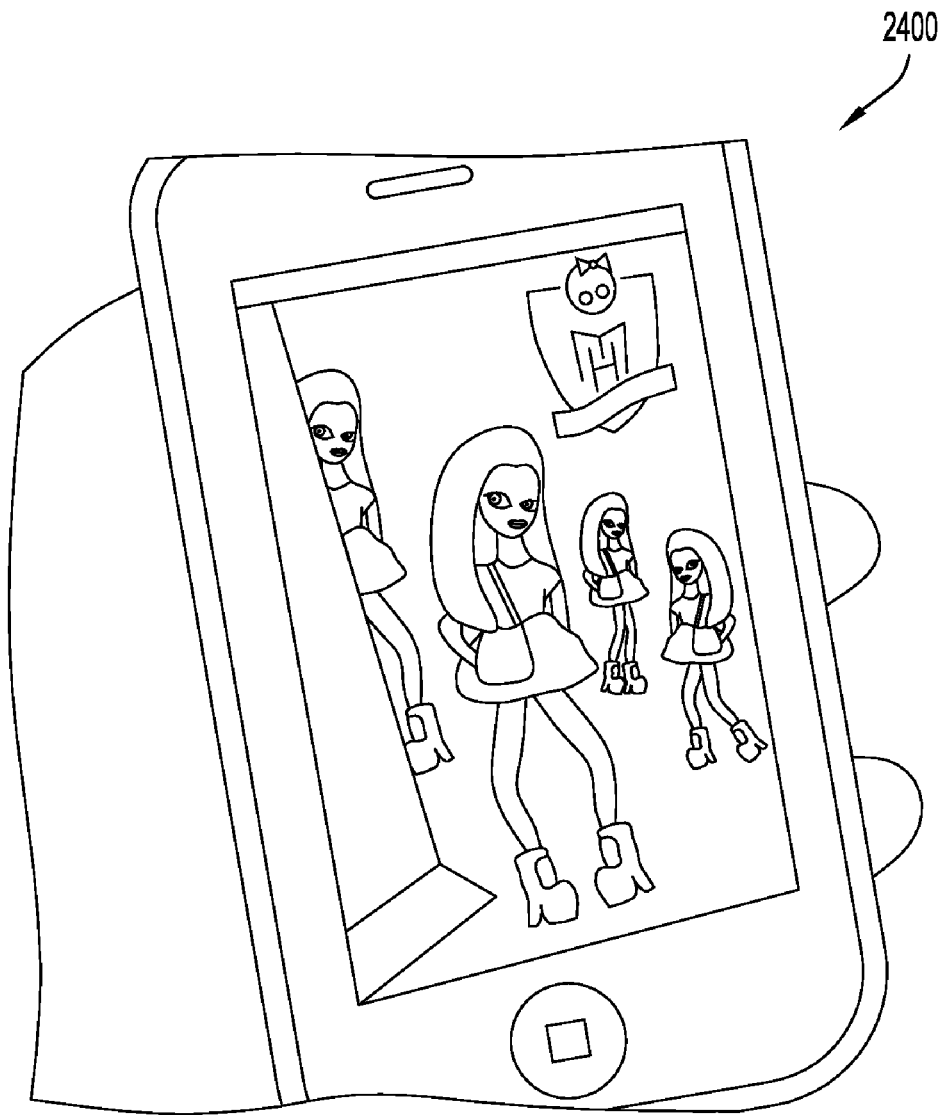

In FIG. 32, a screenshot shows the door portions in the application separating as a result of a correct or proper movement or gesture of the object 2300 with the application 2400. In FIG. 33, a screenshot of the application 2400 is shown that is exemplary of the interior or inside of the closed doors illustrated in FIGS. 30 and 31. Various audible and/or visible outputs can be generated by the device upon the unlocking of the door as described above.

It should be understood that the specific configuration of the object usable with a gaming or other application may vary. For example, the object may be configured as a weapon, jewelry, food or an energy source, or any other device or structure related to the particular game. Alternatively, the object may be configured as a knob, which may be placed on the screen 2014 and rotated and/or slid relative to the touch screen 2014 for increasing volume, scrolling through pages, or triggering some other visual and/or audio output or event. The object may be configured as a playing card, whereby the distance between spaced contact members identifies the particular suit and number (or other characteristic) of the card.

Figure 34:
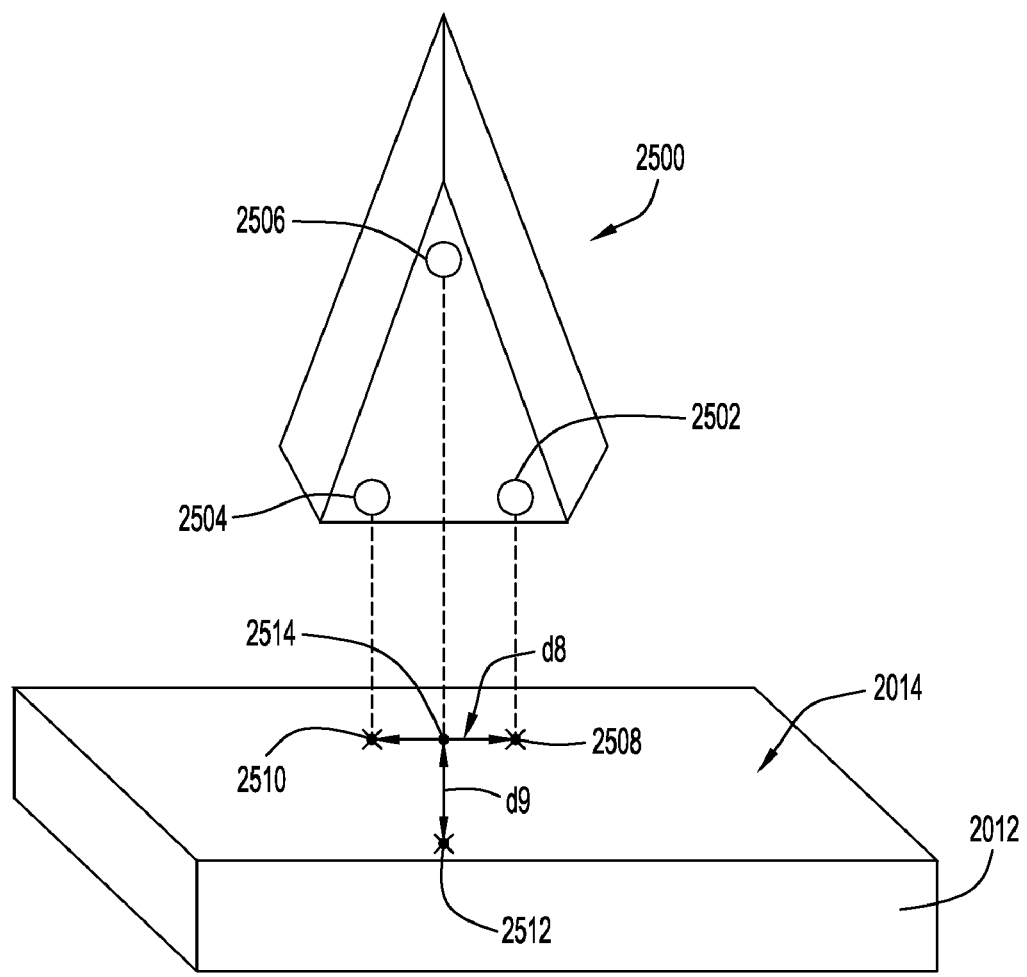
FIG. 34 illustrates a schematic diagram of a system for identifying an object according to another embodiment.

An object 2500 according to another embodiment is illustrated in FIG. 34. The object 2500 includes first and second contact members 2502, 2504 spaced by a distance d8. The object 2500 also includes a third contact member 2506. First, second and third contact points 2508, 2510, 2512 are detected on the touch screen 2014 by the electronic device 2012 when the first, second and third contact members 2502, 2504, 2506 engage or are proximate to the touch screen 2014. The first and second contact points 2508, 2510 are spaced from each other by distance d8 (corresponding to the spacing between the first and second contact members 2502,2 504). The third contact point 2512 is spaced from a midpoint 2514 between the first and second contact points 2508, 2510 by another distance d9. The arrangement of the first, second and third contact members 2502, 2504, 2506 of the object 2500, as defined by distances d8 and d9, define a unique pattern of contact points 2508, 2510, 2512.

In one implementation, the electronic device 2012 determines the distance d8 between the first and second contact points 2508, 2510 in order to determine the specific identity and location of the object 2500 in contact with or proximate to the touch screen 2014. If the distance d8 is a particular distance, the electronic device 2012 then determines the distance d9 between the midpoint 2514 of the first and second contact points 2508, 2510 and the third contact point 2512 in order to determine the orientation of the object 2500.

In another implementation, the electronic device 2012 first determines the distance d8 between the first and second contact points 2508, 2510 to determine a toy category associated with the object 2500. For example, based on a distance d8 between the first and second contact points 2508, 2510 of a particular distance, such as 64 pixels (about 10 mm), which spacing is provided on all toy cars usable with the system or the particular application, the electronic device 2012 may determine that the object 2500 is a toy car. The electronic device 2012 then determines the specific identify of the object 2500 within the toy category based on the distance d9 between the midpoint 2514 and the third contact point 2512. For example, based on a distance d9 between the midpoint 2514 and the third contact point 2512 of 55 pixels, the electronic device 2012 may recognize the toy car to be a black van with red wheels. A different distance d9 could be representative of a white racing car. Further, the electronic device 2012 may determine the location of the object 2500 based on the detected pattern of contact points 2508, 2510, 2512.

Figure 35:
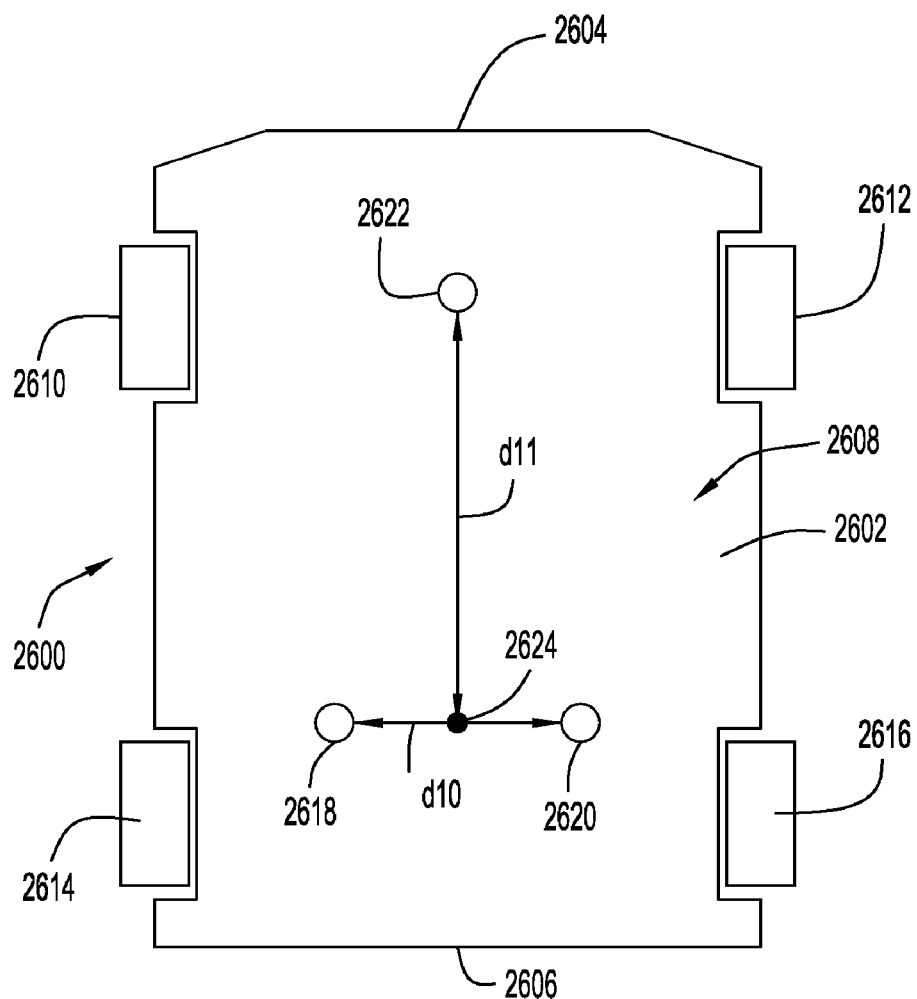
FIG. 35 illustrates a bottom plan view of another object configured as a toy vehicle having another identification recognizable by the disclosed systems.

Referring to FIG. 35, an object usable with the disclosed system is configured as a toy vehicle 2600. The toy vehicle 2600 can be just one of many toy vehicles that can be identified by the system. A bottom view of the toy vehicle 2600 is shown in FIG. 35. The vehicle 2600 includes a chassis or body 2602 having a front end 2604, a rear end 2606, and an underside 608. Wheels 2610, 2612, 2614, and 2616 are coupled to the body 2602. The wheels 2610, 2612, 2614, and 2616 may be rotatable or fixed relative to the body 2602. First and second contact members 2618, 2620 are coupled to and project outwardly from the underside 2608. The first and second contact members 2618, 2620 are spaced by a distance d10. A third contact member 2622 is also coupled to and projecting outwardly from the underside 2608. The third contact member 2622 is spaced from a midpoint 2624 between the first and second contact members 2618, 2620 by a distance d11. Distance d10 is different than the distance between contact members 2618 and 2622 and the distance between contact members 2620 and 2622, thereby allowing the electronic device to properly categorize the object using contact members 2618, 2620 initially.

The base distance between contact points 2618 and 2620 is dimension d10, which can be a fixed distance such as 64 pixels discussed above. For different objects in a group that have the same dimension d10 (which means that the objects are in the same category), the dimension d11 can be a multiple of dimension d10. For example, three different toy vehicles can have the same dimension d10, but different dimensions d11 that are integer increments of dimension d10, such as one, two, and three times dimension d10, respectively. Alternatively, if a greater quantity of toy vehicles is contemplated and space is limited, dimension d11 can be smaller increments of dimension d10, such as increments of 1.1, 1.2, 1.3, etc. of dimension d10.

Figure 36:
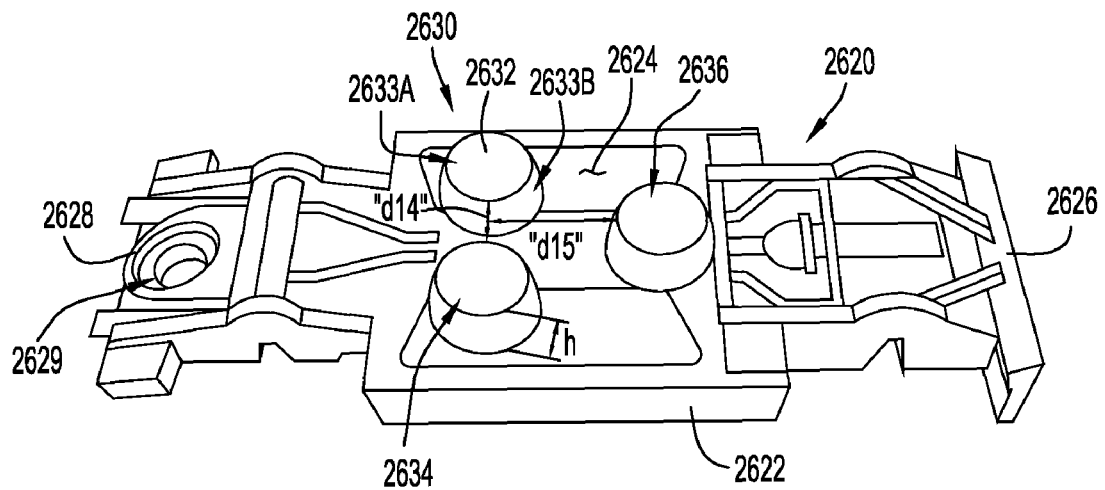
FIG. 36 illustrates a bottom perspective view of a chassis of a toy vehicle having an identification recognizable by the disclosed systems.

Referring to FIG. 36, a bottom perspective view of a chassis for a toy vehicle is illustrated. In this embodiment, the chassis 2620 can be a molded plastic object with a conductive coating. The chassis 2620 can be electrically coupled to the touch of a human holding the toy vehicle so that the capacitance or charge at a location of the touch screen changes based on contact thereof from the human through the chassis 2620. For example, a child may touch one or more sides of the chassis 2620 while holding the toy vehicle. Alternatively, there may be a conductive member or piece of material that is connected to the chassis 2620 and extends through the body of the toy vehicle so the child can touch the conductive member. The chassis 2620 includes a body 2622 with a lower surface 2624 and opposite ends 2626 and 2628, with a mounting aperture 2629 located proximate to end 2628.

The chassis 2620 includes an identification system 2630 that can be detected and used by the electronic device 2012 to identify the object of which chassis 2620 is a part and the orientation of the object. In this embodiment, the identification system 2630 includes several bumps or protrusions or contact members 2632, 2634, and 2636, that extend outwardly from lower surface 2624. Protrusion 2632 includes a lower surface 2633A and a side wall 2633B that extends around the protrusion 2632. The distance between contact members 2632 and 2634 is dimension d14 and the distance between contact member 2636 and the line between contact members 2632 and 2634 is dimension d15. In one embodiment, dimension h, which is the height or distance that the protrusions extend from surface 2624, is slightly greater than the distance that the outer surface of wheels of the toy vehicle to which chassis 2620 is coupled extend relative to the lower surface 2624. This greater height allows the contact members 2632, 2634, and 2636 to engage the touch screen of the electronic device. In other embodiments, the dimension h for one or more of contact members 2632, 2634 and 2636 is slightly less than the distance that the outer surface of wheels of the toy vehicle to which chassis 2620 is coupled extend relative to the lower surface 2624. In this latter case, contact members 2632, 2634 and/or 2636 might only be detected by the screen in the event that the user pressed down upon the vehicle, causing the axles to flex slightly and the contact members to come into closer proximity to the screen, at which point they would be detectable by the system. The dimension h may also be adjusted such that while it is slightly less than the distance that the outer surface of wheels of the toy vehicle to which chassis 2620 is coupled extend relative to the lower surface 2624, the contact members are nevertheless detectable by the system due to their close proximity (though not contact) with the screen.

Protrusions 2634 and 2636 are similarly constructed to protrusion 2632. In one embodiment, the protrusions 2632, 2634, and 2636 can be formed integrally with the chassis. In another embodiment, the protrusions 2632, 2634, and 2636 can be formed separate from the chassis and coupled thereto, using a coupling technique, such as an adhesive, bonding, melting, welding, etc. While protrusions 2632, 2634, and 2636 are illustrated as being generally frusto-conical, in different embodiments, the configurations of the protrusions may be a cylinder, a cube, a semisphere, and a rectangular prism.

Figure 37:
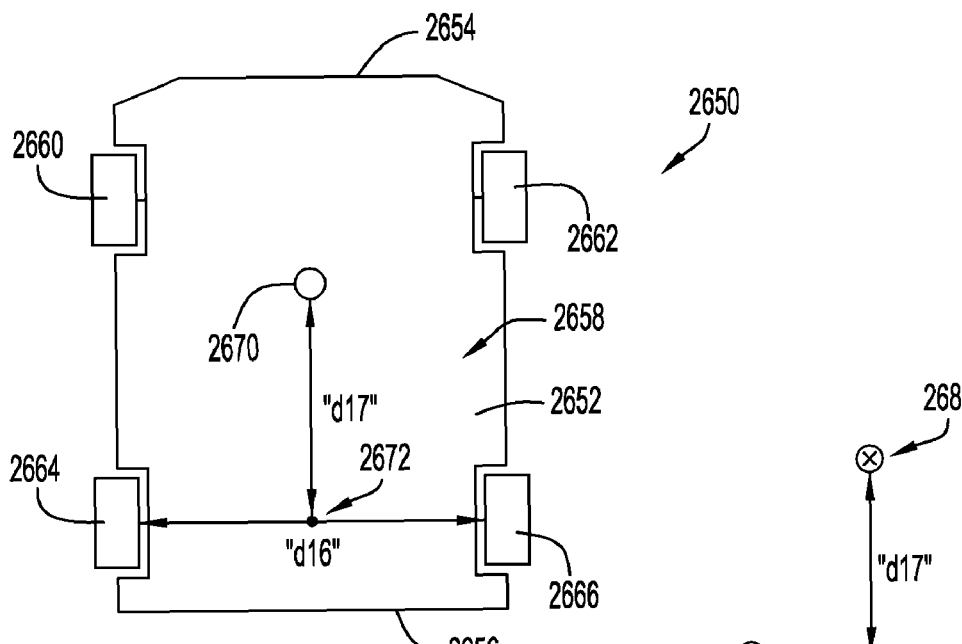
FIG. 37 illustrates a bottom plan view of another object configured as a toy vehicle having another identification recognizable by the disclosed systems.

Referring to FIG. 37, a bottom view of another object usable with the disclosed system is configured as a toy vehicle 2650 is illustrated. The vehicle 2650 includes a chassis or body 2652 having a front end 2654, a rear end 2656, and an underside 2658. Several wheels 2660, 2662, 2664, 2666 are coupled to the body 2652 and are either rotatable or fixed relative to the body 2652.

In this embodiment, a single contact member 2670 projects outwardly from the underside 2658. Wheels 2664 and 2666 are conductive and are either made of metal or other conductive material or are formed of a non-conductive material and coated with a conductive coating. The wheels 2664 and 2666 are spaced apart by a distance d16. The contact member 2670 is spaced from a midpoint 2672 between wheels 2664 and 2666 by a distance d17. Distance d17 is different than the distance between the wheels 2664 and 2666, thereby allowing the electronic device to properly categorize the object using contact members 2664 and 2666 initially.

Figure 38:
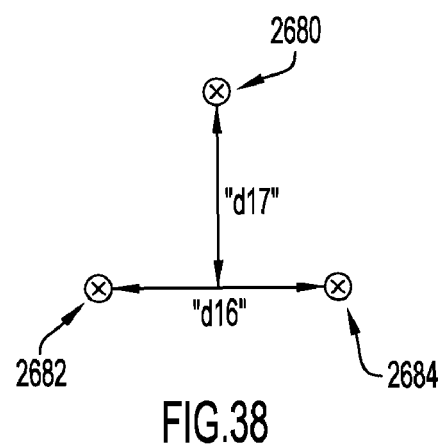
FIG. 38 illustrates a schematic view of the contact points detected by an electronic device based on the object illustrated in FIG. 37.

The resulting contact points on the screen or surface of the electronic device are illustrated in FIG. 38. Contact member 2670 causes contact point 2680 and wheels 2682 and 2684 cause contact points 2682 and 2684 with dimensions d16 and d17 as shown. When the toy vehicle 2650 is placed proximate to or in contact with the electronic device 2012, and is moved around relative to the device 2012, the dimensions d16 and d17 remain constant. As discussed above, the application running on the electronic device 2012 continuously checks to see if the distances d16 and d17 remain constant through the motions of the toy vehicle 2650. If the distances remain constant, the application can then determine that the object is the toy vehicle 2650 and not the touches of a human.

Figure 39:
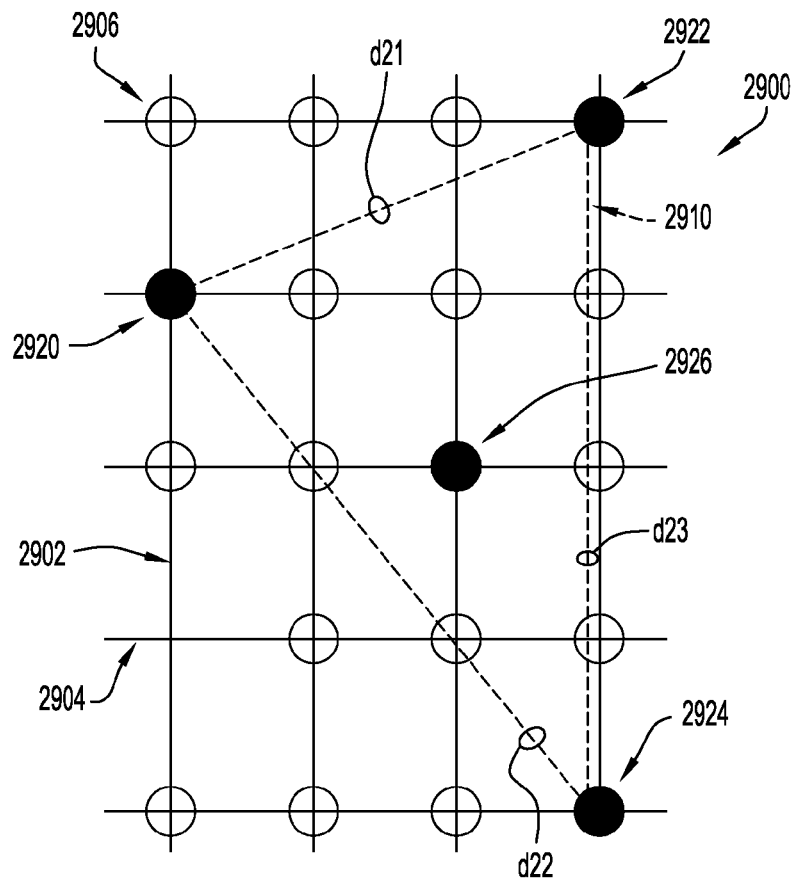
FIG. 39 illustrates a schematic diagram of a virtual or conceptual grid associated with an object having an identification system.

Referring to FIG. 39, a schematic diagram of a virtual or conceptual grid that is associated with a toy object having an identification system is illustrated. In this embodiment, the grid 2900 is formed by two sets 2902 and 2904 of perpendicular lines. The intersections of the lines are illustrated as nodes or points 2906. This conceptual grid 2900 is mapped onto the toy object and is not present on the electronic device. If the grid 2900 can be matched or mapped onto the object, then the identification of the object can be determined and used by the application and device, as described below.

In this embodiment, the identification system of an object is represented by several contact points. The profile of the system is shown as 2910 in FIG. 39. While the object may have any shape or configuration, in this embodiment, the profile 2910 has a generally triangular shape defined by contact points 2920, 2922, and 2924. When the electronic device senses the contact points 2920, 2922, and 2924, the application running on the electronic device determines whether the distances between the contact members and the contact points can be mapped onto a grid.

In other words, contact points 2920 and 2922 are spaced apart by a distance d20, contact points 2920 and 2924 are spaced apart by a distance d21, and contact points 2922 and 2924 are spaced apart by a distance d22. When the object, such as a toy vehicle, is placed onto the screen of the electronic device, the device detects the locations of the contact points 2920, 2922, and 2924. The device then manipulates the grid 2900 to match up the contact points 2920, 2922, and 2924 with different nodes 2906, as shown in FIG. 39. If each of the contact points 2920, 2922, and 2924 is matchable with a node 2906, the application can determine that the contact points 2920, 2922, and 2924 are representative of a particular type or category of object, such as toy vehicles. Accordingly, the object can be identified as a toy vehicle. In addition, the orientation of the object can be determined once the contact points 2920, 2922, and 2924 are matched up to grid 2900. If the device cannot determine that the contact points 2920, 2922, and 2924 are matchable with a grid 2900, then the device determines that the object is not the particular type expected or associated with the running application.

In this embodiment, the identification system generates a fourth contact point 2926. The fourth contact point 2926 is spaced apart from the profile 2910 defined by contact points 2920, 2922, and 2924. For example, the fourth contact point 2926 is located within the perimeter of profile 2910 in the embodiment illustrated in FIG. 39. The location of the fourth contact point 2926 is used to determine the particular identity of the object, such as a specific truck or car.

Figure 40:
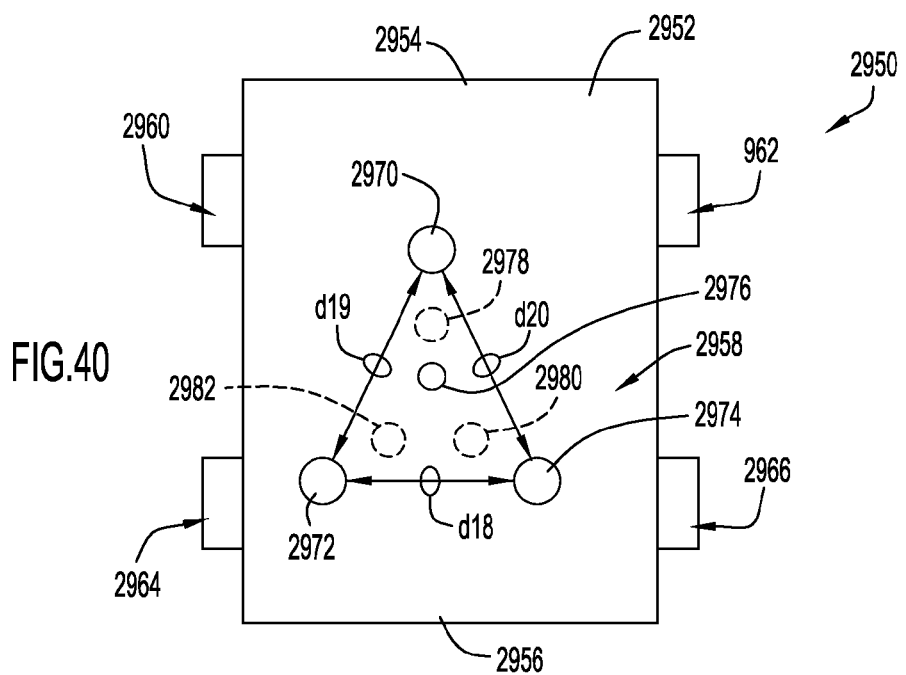
FIG. 40 illustrates a bottom plan view of another object configured as a toy vehicle having another identification recognizable by the disclosed systems.

Referring to FIG. 40, a bottom plan view of another object with an identification system is illustrated. In this embodiment, the toy vehicle 2950 includes a body or chassis 2952 with a front end 2954, a rear end 2956, and a lower surface 2958. Several wheels 2960, 2962, 2964, and 2966 are rotatably or fixedly coupled to the body of the vehicle 2950. In different embodiments, one or more of the wheels 2960, 2962, 2964, and 2966 can be made of a conductive material or made of a non-conductive material with a conductive coating or layer applied thereto.

The toy vehicle 2950 also includes an identification system located on the lower surface 2958. The identification system includes contact members or protrusions 2970, 2972, and 2974 that are spaced apart from each other. As shown, contact members 2970, 2972, and 2974 form a generally triangular shape, which would result in the contact points 2920, 2922, and 2924 on the electronic device, as illustrated in FIG. 39. The distances d18, d19, and d20 in FIG. 40 correspond to the distances d21, d22, and d23, respectively, in FIG. 39. The contact members 2970, 2972, and 2974 are used to identify the particular category of object 2950.

A fourth contact member 2976 is provided that is used to identify the specific object 2950. For toy vehicle 2950, contact member 2976 is located in a particular spot relative to the other contact members 2970, 2972, and 2974. This spot is associated with one toy vehicle. For different toy vehicles, the fourth contact member 2976 and be placed at any one of the different locations 2978, 2980, and 2982 that are shown in dashed lines.

Figure 41:
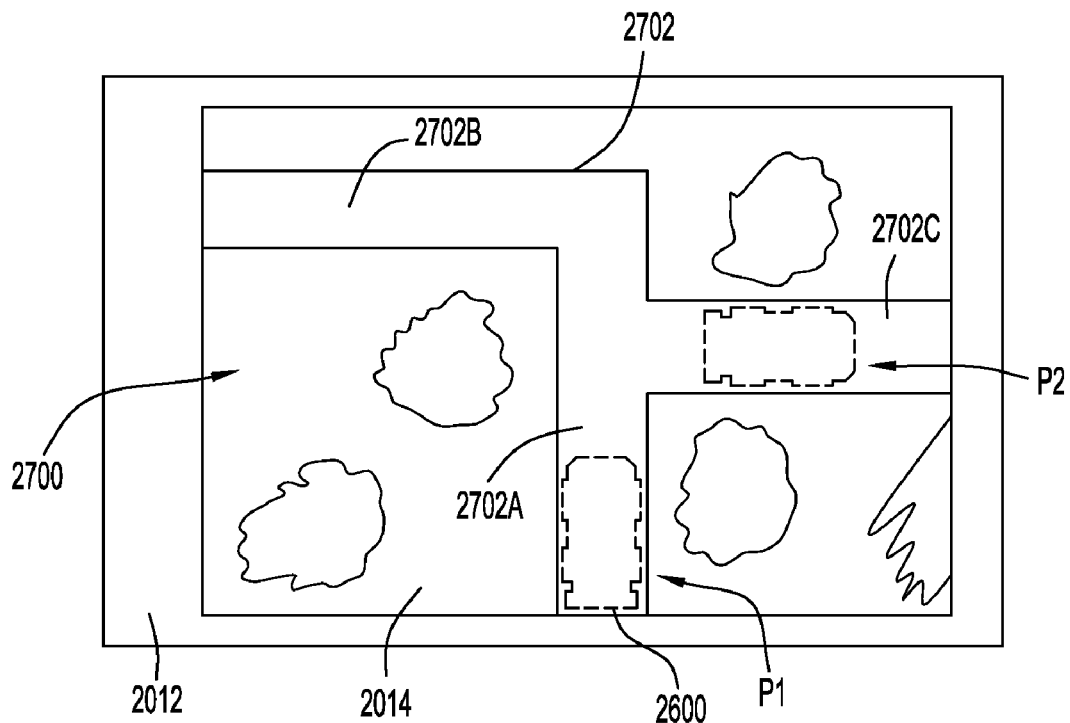
FIG. 41 illustrates a plan view of an electronic device displaying an application operable with the toy vehicle of FIG. 35.

Referring to FIG. 41, an application operable with the electronic device 2012 and the toy vehicle 2600 is illustrated. The application is a game 2700 including a roadway 2702 along which a user may 'drive' or 'steer' the vehicle 2600. Portions 2702A, 2702B and 2702C of the roadway 2702 are displayed on the touch screen 2014. The vehicle 2600 may be placed anywhere on the touch screen 2014. The determination that the object is a toy vehicle 2600 is made by the electronic device 2012 based on the distance d10 between the first and second contact points (associated with the first and second contact members 2618, 2620 engaging or proximate to the touch screen 2014). For example, the vehicle 2600 may be placed on portion 2702A of the roadway 2702 so that the vehicle 2600 (shown in phantom) is in a position P1. The identity and location of the vehicle 2600 on the touch screen 2014 are then recognized, as described above. The third contact point (corresponding to the point of engagement of the third contact member 2622) is also detected and identified. The electronic device 2012 recognizes the orientation of the front end 2604 of the vehicle 2600 based on the detection of the third contact member 2622 and the distance d11.

Figure 42:
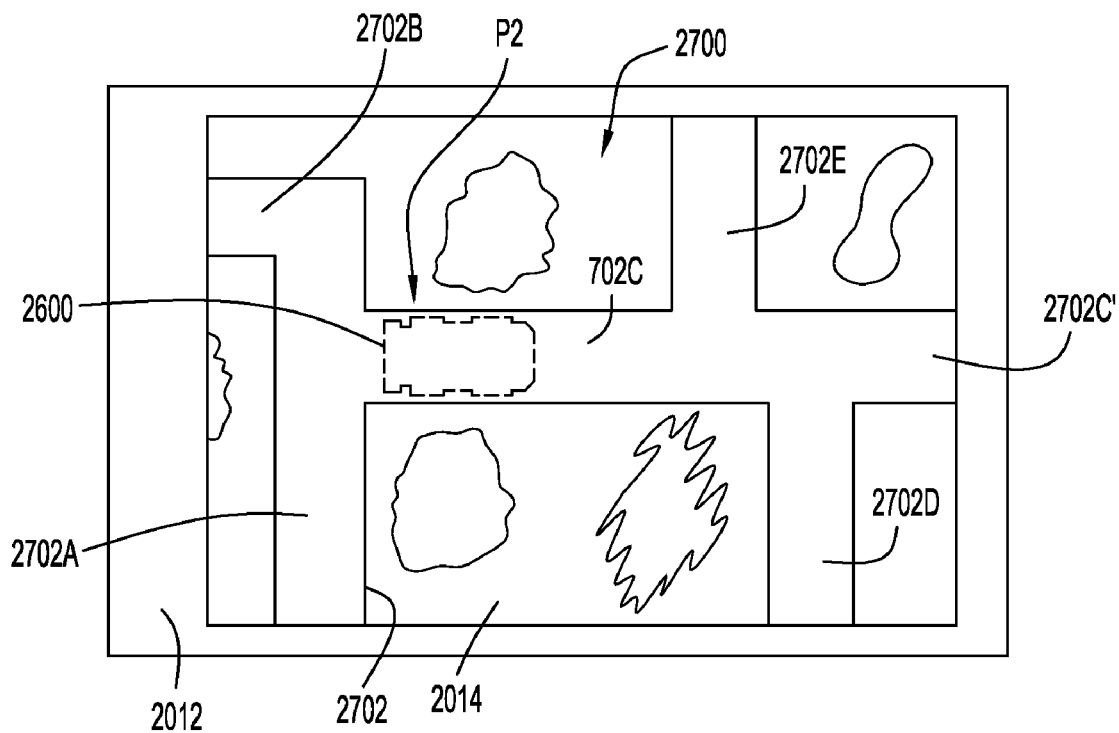
FIG. 42 illustrates another plan view of the electronic device of FIG. 41 showing another display output in response to movement of the toy vehicle of FIG. 35.

With continued reference to FIG. 41, the user may slide the vehicle 2600 upwardly along portion 2702A of the roadway 2702, and then rotate or 'turn' the vehicle 2600 to the right (relative to the user) so that the vehicle 2600 (shown in phantom) proceeds onto portion 2702C of the roadway 2702, shown at a position P2. The identity and location of the vehicle 2600 are recognized and tracked by the electronic device 2012 as the vehicle 2600 is moved on the touch screen 2014 by the user. In addition, a visual and/or audio output may be generated and displayed in response to the movement of the vehicle 2600 on the touch screen 2014. For example, as shown in FIG. 42, portions 2702A, 2702B and 2702C of the roadway 2702 have shifted to the left (relative to the user) as the vehicle 2600 was moved from position P1 on portion 2702A to position P2 on portion 2702C. In addition, portions 2702C' of the roadway 2702, as well as newly displayed portions 2702D, 2702E, are displayed as the vehicle 2600 proceeds toward the right of the touch screen 2014 (relative to the user). Thus, the roadway 2702 changes, simulating virtual movement of the vehicle 2600, as well as in response to actual movement of the vehicle 2600 on the touch screen 2014. In some embodiments, the electronic device 2012 can generate various audible outputs associated with the traveling of the vehicle 2600 off the road when the movement of the vehicle 2600 is detected at a location that is not part of the road in the application.

Although orientation of an object may be detected via detection of first, second and third contact members, in some embodiments, the orientation of the object may be automatically determined or specified by the application. As such, the third detection point may be obviated for some applications. For example, an object including only two contact members (e.g., the figures described above) may be deemed to have a forward facing orientation on the touch screen and relative to the user.

In addition, an object including more than three contact members may be provided and is usable with an application operable on the electronic device. This type of an object can be used for dynamic play with the electronic device.

Figure 43:
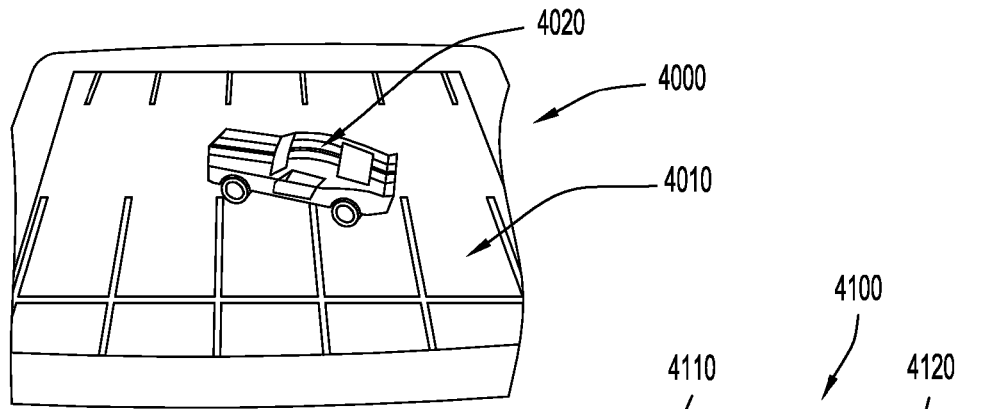
FIGS. 43-46 illustrate electronic devices with exemplary display outputs.
Figure 44:
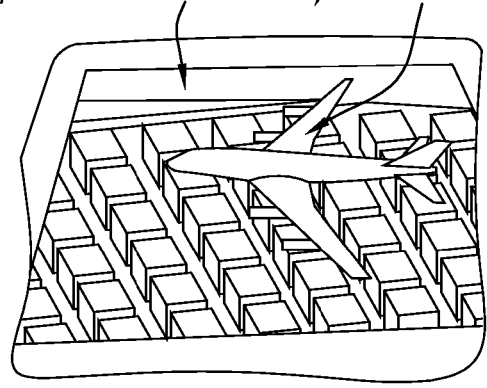
Figure 45:
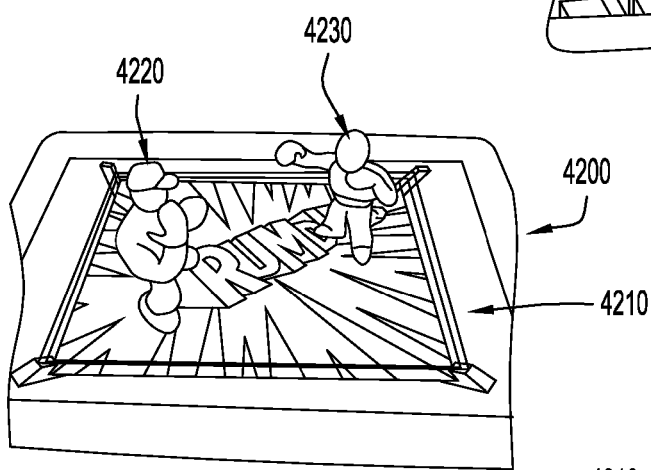
Figure 46:
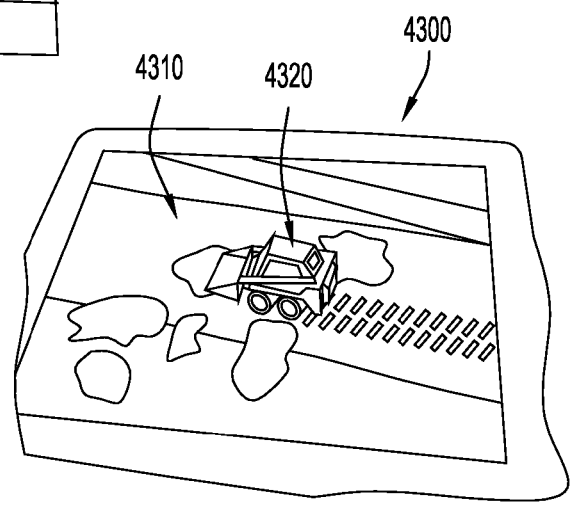

Referring to FIGS. 43-46, exemplary embodiments of applications and objects that can be used therewith are illustrated. In FIG. 43, an electronic device 4000 is generating a display 4010 simulating a parking lot from a simulated driving program. An object 4020, such as a toy vehicle 4020, can be used with the device 4000 to provide for interactive play. Similarly, in FIG. 44, an electronic device 4100 generates a display 4110 simulating a city and an object 4120 resembling a toy airplane can be used with a flying program on the electronic device 4100. Also, in FIG. 45, an electronic device 4200 generates a display 4210 resembling a wrestling ring and multiple objects 4220 and 4230 that are action figures resembling wrestlers can be used with the device 4200. In FIG. 46, an electronic device 4300 generates a display 4310 resembling a construction site and an object 4320 configured as a toy construction vehicle can be used with the device 4300.

Figure 47:
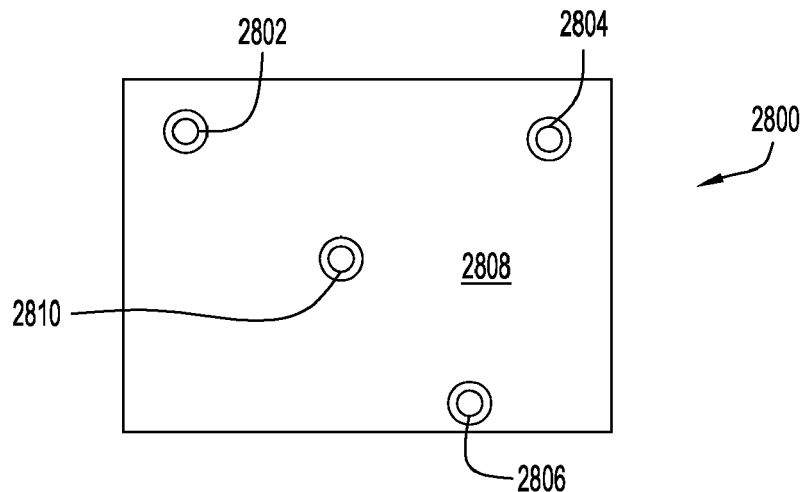
FIG. 47 illustrates a plan bottom view of another object including first, second, third and fourth contact members, and defining another identification recognizable by the disclosed systems.
Figure 48:
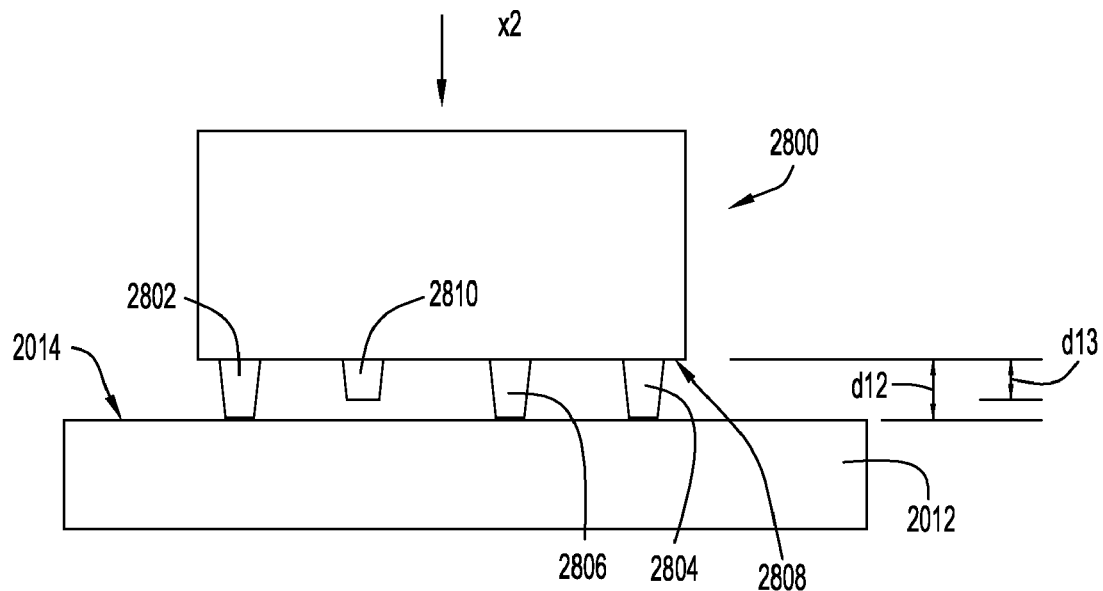
FIG. 48 illustrates an elevational view of the object of FIG. 47 disposed on a touch screen of an electronic device.

Referring to FIGS. 47 (bottom view) and 48 (side view), an object 2800 includes a first contact member 2802, a second contact member 2804, and a third contact member 2806 extending outwardly from an underside 2808 of the object 2800 by a distance d12. The object 2800 also includes a fourth contact member 2810 extending outwardly from the underside 2808 by a distance d13 less than the distance d12. If the object 2800 is placed on a touch screen 2014 of an electronic device 2012, the first, second and third contact members 2802, 2804, 2806 engage the touch screen 2014 (as shown in FIG. 48) and are thereby detected by the electronic device 2012. A first output is generated by the electronic device 2012 upon detection of the first, second and third contact members 2802, 2804, and 2806. The fourth contact member 2810 engages the touch screen 2014 and is detected by the electronic device 2012 if the object 2800 is pushed downwardly in direction X2 toward the touch screen 2014. In one embodiment, this movement of contact member 2810 into engagement with the touch screen 2014 can occur if contact members 2802, 2804, and 2806 are compressible. In another embodiment, contact member 2810 can be movable relative to the body to which it is coupled. A second output different than the first output is generated by the electronic device 2012 upon detection of the first, second, third and fourth contact members 2802, 2804, 2806, and 2810. In one implementation, the fourth contact member can be a switchable touch or contact point that is associated with a feature button, a turbo button for a vehicle, or a fire button for a weapon.

Another embodiment of an object that is useable with a touch screen in a selective manner is illustrated in FIGS. 49-53. The object 3000 is a dynamic device that includes a mechanical component. As described in detail below, the object 3000 includes an additional contact member that creates an additional contact point that results in an output that is in addition to simply the presence of a fixed object on a touch screen.

Figure 49:
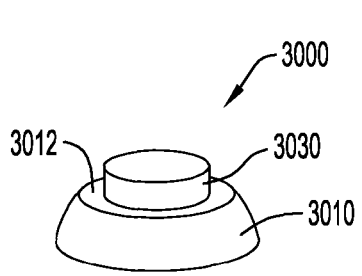
FIG. 49 illustrates a front perspective view of another input object according to an embodiment of the invention.

Referring to FIG. 49, a perspective view of the object 3000 is illustrated. While the outer perimeter of object 3000 in this embodiment is generally circular, in different embodiments, the shape of the perimeter of the object 3000 can vary and be a square, a rectangular, or other shape or configuration. In this embodiment, the object 3000 includes a base member 3010 and an input member 3030. The input member 3030 is movably coupled to and supported by the base member 3010 and can be manipulated in a manner similar to a switch. The object 3000 can be placed onto a touch screen of an electronic device. The input member 3030 can be moved or manipulated by a user to provide an additional contact or input to the touch screen in a selective manner.

Figure 50:
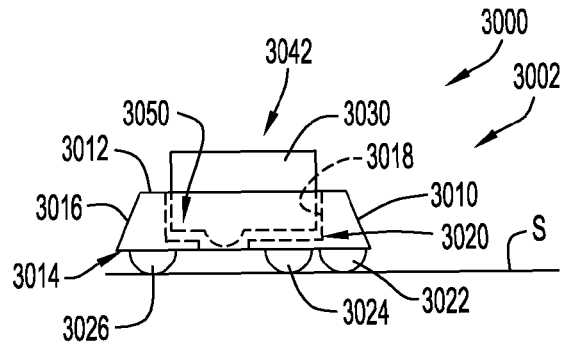
FIG. 50 illustrates a side view of the object illustrated in FIG. 49 in a non-use configuration.
Figure 51:
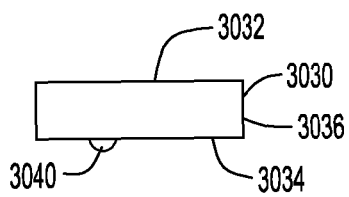
FIG. 51 illustrates a side view of a component of the object illustrated in FIG. 49.
Figure 52:
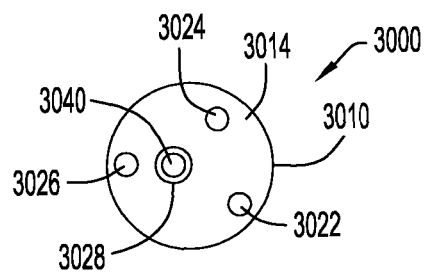
FIG. 52 illustrates a bottom view of the object illustrated in FIG. 49.

Referring to FIGS. 50 and 51, side and bottom views of the object 3000 are illustrated. As shown, the base member 3010 has an upper surface 3012, a lower surface 3014, and a side surface 3016. The base member 3010 also includes an inner wall 3018 that defines a receptacle or channel 3020 in which the input member 3030 is located. As shown, the lower surface 3014 of the object 3000 has an opening 3040 that is in communication with the receptacle 3020 of the base member 3010.

Extending from the lower surface 3014 are several contact members 3022, 3024, and 3026. In one embodiment, the contact members 3022, 3024, and 3026 may be conductive so that contact by a person holding the object 3000 proximate to or in contact with the touch screen S results in a change in the charge of the screen at touch points, as part of the charge is transferred to the person holding the object. The base member 3010 can be made of or coated with a conductive material to transfer the touch of a human to the contact members 3022, 3024, and 3026. The contact members 3022, 3024, and 3026 generate touch or contact points on the touch screen which are used to identify the particular object. A first output or series of outputs can be generated by the electronic device in response to the detection of contact members 3022, 3024, and 3026. In a different embodiment, the contact members 3022, 3024, and 3026 are not conductive and are used only to support the object 3000 on the touch screen S.

Referring to FIG. 51, a side view of the input member 3030 is illustrated. In this embodiment, the input member 3030 includes an upper surface 3032 and a lower surface 3034. A protrusion or contact member 3040 extends from the lower surface 3034 as shown. In one embodiment, the input member 3030 can be made of a conductive material so that the capacitance of a touch screen S can be changed due to a person touching the input member 3030.

Figure 53:
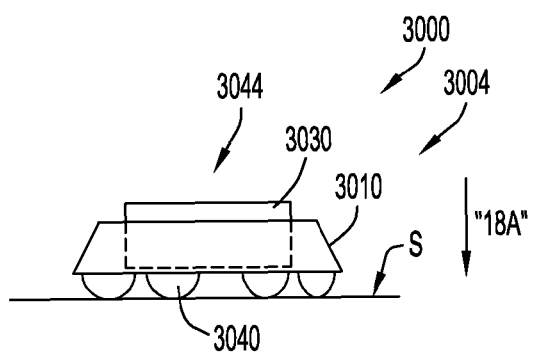
FIG. 53 illustrates a side view of the object illustrated in FIG. 49 in a use configuration.

Referring to FIGS. 50 and 53, the use of the object 3000 is illustrated. In FIG. 50, the toy object 3000 is illustrated in a non-use configuration 3002 in which the input member 3030 does not engage the touch screen S. In this configuration 3002, the input member 3030 is in a raised or non-engaged position 3042 spaced apart from the touch screen S. In FIG. 53, the input member 3030 has been moved along the direction of arrow "18A" to its lowered or engaged position 3044 in which the contact member 3040 touches or is proximate to the touch screen S.

The input member 3030 may be retained to the base member 3010 and prevented from separating therefrom via a tab and slot arrangement or other mechanical mechanism. A biasing member, such as a spring 3050, can be located between the input member 3030 and the base member 3010 to bias the input member 3030 to its non-engaging position 3042. Since the input member 3030 is spring-loaded, the input member 3030 will be in only momentary contact with the touch screen.

A user can selectively move the input member 3030 repeated along the direction of arrow "18A" to make intermittent contact with the touch screen S. When the button is pressed, the addition contact point is created on the touch screen and feedback, such as a tactile feedback, can be generated and felt by the user. Some examples of objects may include levers, rotary knobs, joysticks, thumb-wheel inputs, etc. Alternatively, the intermittent contact can be used to input data into the electronic device in a serial manner.

In another embodiment, the input member 3030 and base member 3010 may be a two part conductive plastic item with a spring detent, such that when a user holds the object 3000 to the screen of the device, the input device or object types is detected, and the button or input member 3030 can be pressed.

In one exemplary implementation, the toy object can be a simulated blasting device with a switch. The base member of the toy object can be a housing and the input member 3030 can be a movable plunger, the movement of which into engagement with the touch screen results in an output on the electronic device that is audible, visible, and/or tactile.

In various embodiments, the actuation and movement of the input member of a toy object can vary. In addition to the pressing motion described above, the input member can be rotated, twisting, rolled, slid, and/or pivoted relative to the base member.

Figure 54:
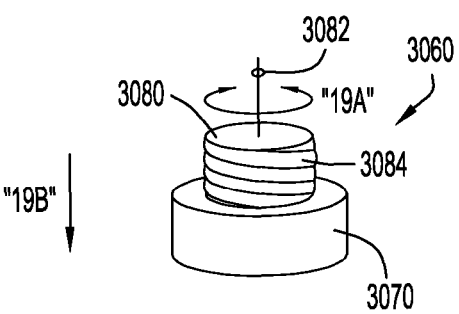
FIG. 54 illustrates a perspective view of another input object according to an embodiment of the invention.

Referring to FIG. 54, in this embodiment, the base member 3070 has an input member 3080 movably coupled thereto. The input member 3080 can be screwed into and out of an opening in the base member 3070. The input member 3080 has a thread 3084 located on its outer surface and can be rotated in either direction of arrow "19A" about axis 3082. When the input member 3080 is rotated sufficiently so that the input member is moved along the direction of arrow "19B," a contact member located on the lower surface of input member 3080 engages the touch screen of an electronic device on which the object is placed.

Figure 55:
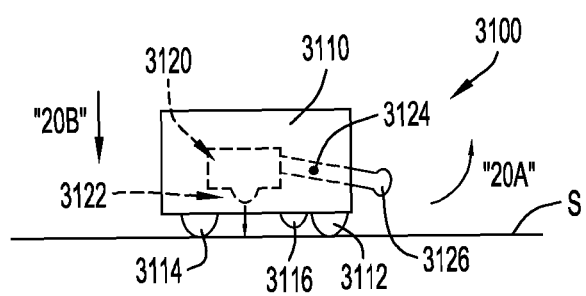
FIG. 55 illustrates a side view of another input object according to an embodiment of the invention.

Referring to FIG. 55, in this embodiment, the object 3100 includes a base member 3110 with several contact members 3112, 3114, and 3116 that can engage a touch screen S, as previously described. The object 3100 includes an input member 3120 located within a receptacle or chamber in the base member 3110. The input member 3120 has a main body with a contact member 3122 extending therefrom. A lever arm 3126 is pivotally mounted at pivot point 3124 to the base member 3110 so that movement of lever arm 3126 along the direction of arrow "20A" results in movement of the body 3120 along the direction of arrow "20B" so that contact member 3122 engages the touch screen S. To disengage contact member 3122 from the touch screen S, the lever arm 3126 is moved in the opposite direction. In a variation of this embodiment, the lever arm can be replaced with an arm that is pressed or slid downwardly to move the input member in the same direction.

In another embodiment, the object includes two or more contact members, as well as data stored in an associated memory. Upon depression of the object against the touch screen, the data is transmitted from the object to the electronic device. For example, a user's contact information may be transmitted to the electronic device upon depression or activation of the object. The object may be configured such that different or additional data is transmitted upon subsequent depressions or activations. For example, an address of the user may be transmitted upon an initial depression or engagement of the object against the touch screen of an electronic device. The user's business profile (e.g., employment history, technical skills, etc.) may then be transmitted from the object to the electronic device upon a subsequent depression or engagement between the object and the touch screen.

In another embodiment, the object, once properly identified by an application, may 'unlock' a database accessible to the electronic device, which may include information relating to the object. For example, collector dolls may be provided with contact members that can be used with an electronic device to identify the object. Upon engagement with the touch screen by the contact members, information relating to collector type data is presented to the user.

Thus, the recognized pattern of contact points may be used by an application running on the electronic device to identify the particular conductive object and/or to provide specific information related to the object or user. Various applications may be run on the electronic device that use the contact and identification of the conductive object as an input. For example, a game application can look for a particular object to be used with the screen at a particular point in the game. If the correct object is placed on the screen, then a feature or portion of the game can be unlocked and/or a particular output may be generated and displayed.

The electronic device and associated application are configured to generate an output specific to a recognized pattern of contact points on the touch screen, as well as in response to movement of the recognized pattern of contact points on the touch screen. The pattern of contact points defines an identification that is associated with a particular object. An output specific to the associated object is then generated and displayed on the touch screen. The particular output generated and displayed may vary depending on the various patterns of engagement points associated with the corresponding various objects, as well as on the particular application operable by the device.

In different implementations, the conductive devices or objects can be hard or soft. Further, the particular types and locations of touches or contact points on the touch screen can vary, as well as the content that is unlocked or accessed. Thus, various embodiments of the present invention are possible.

The quantity of contact points that can be detected by an application is determined in part by the particular electronic device running the application.

Figure 56:
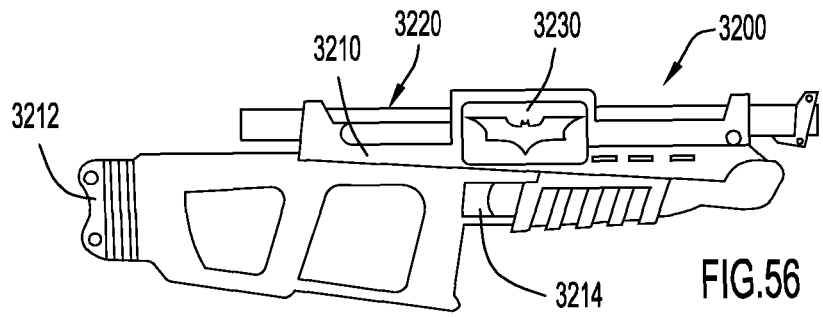
FIG. 56 illustrates a side view of another input object according to an embodiment of the invention.
Figure 57:
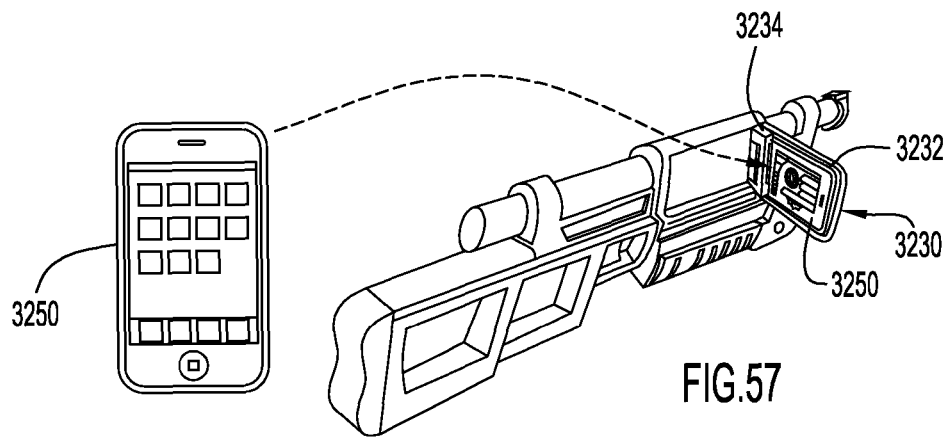
FIG. 57 illustrates a rear perspective view of the input object illustrated in FIG. 56 with an electronic device.
Figure 58:
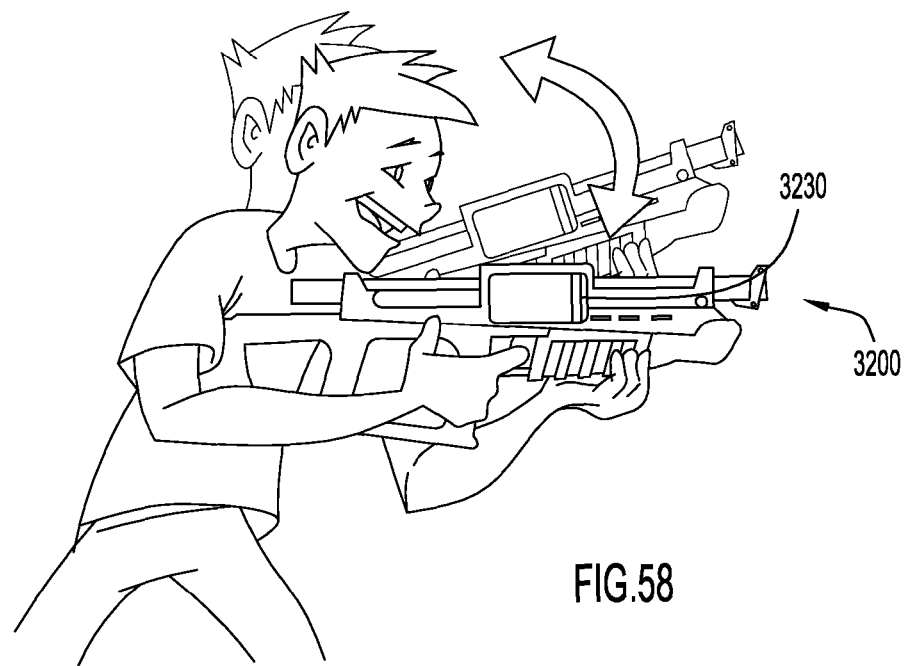
FIG. 58 illustrates a side view of the input object illustrated in FIG. 56 in use.

Another exemplary embodiment of the invention is illustrated in FIGS. 56-58. In this embodiment, a simulated toy weapon 3200, such as a rifle, includes a barrel portion 3210, a support portion 3212, and a trigger 3214 that can be manually actuated. The toy weapon 3200 includes an electronic system with several light emitting elements 3220 and a transducer for generating audible outputs. When a child plays with the toy weapon 3200, lights and/or sounds are generated in response to interaction by the child with the toy weapon 3200.

The toy weapon 3200 can be used with an electronic device 3250 (shown in FIG. 57). The toy weapon 3200 includes a repositionable, interactive portion 3230 that includes a door or plate 3232 that is pivotally coupled to the barrel 3210 at its end 3234 by a coupler or hinge. Portion 3230 can be flipped outwardly to couple the device 3250 to the toy weapon 3200. The inner surface of the plate 3232 includes a receptacle into which the device 3250 can be inserted or snapped into place so that the device 3250 is physically retained by the physical toy (the toy weapon 3200). As a result, the screen 3252 of the device 3250 becomes part of the physical toy. In another embodiment, the plate 3232 can be slidably coupled to the toy weapon 3200. When the repositionable portion 3230 is flipped outwardly, the screen 3252 remains viewable for the child while playing with the toy weapon 3200, thereby enhancing the play experience. At the same time, the toy weapon 3200 retains independent play value even when the electronic device 3250 is not attached to the toy. For example, it might include lights and sounds that can be actuated even in the absence of electronic device 3250.

The toy weapon 3200 can recognize the presence of the device 3250 through detection via a switch and the device 3250 can recognize the toy weapon 3200 through its touch screen 3252. In one embodiment, a portion of the toy weapon 3200, such as a portion near hinge 3234, can engage the touch screen 3252 of the device 3250 in a manner that enables an application running on the device 3250 to identify the toy weapon 3200 to which the device 3250 is coupled. For example, the application may create a special area or region in which a part of the toy weapon 3200, such as a conductive portion, may engage the touch screen 3252. The single touch point created by the toy weapon 3200 is used for identification of the toy weapon 3200. The single touch point may be created when the user touches the toy as long as the capacitance of the user can travel and pass to the touch screen 3252 of the device 3250.

In one implementation, when the electronic device 3250 is coupled to the toy weapon 3200, the device 3250 can sense or detect when a child first picks up the weapon 3200 through the touch of the child on the weapon 3200. When a child picks up the weapon 3200, the touch of the child provides the capacitance needed by the touch screen of the electronic device 3250 to cause an application running thereon to generate an audible and/or visible output. At least a part of the weapon 3200 may be made of a conductive material or a non-conductive material with a conductive coating or plating thereon. Thus, when a child first picks up the weapon 3200, the device 3250, either alone or via the weapon 3200, can generate an output that is interesting to the child to cause the child to play with the weapon 3200.

The toy weapon 3200 may also recognize the presence of the device 3250 as described below. In particular, a portion of the screen of device 3250 may blink in a recognizable pattern that may be detected by a detector included in toy weapon 3200. For example, a portion of door plate end 3234 might include a photodetector that can recognize the presence or absence of light (or light at certain wavelengths) emitted from a target portion of the screen of device 3250. Device 3250 may use this capability to transmit data, including a signature indicating not only that device 3250 is installed in toy 3200, but that the proper application is running on device 3250.

When the device 3250 determines that it is mounted or coupled to the toy weapon 3200, the application running on the device 3250 can enter into a different portion of the program or application. For example, the toy weapon 3200 by itself can be manipulated to make audible and/or visible outputs, such as by the actuation of the trigger 3214 or the movement of the toy weapon 3200. The application on the device 3250 can enhance the outputs from the toy weapon 3200 by generating audible and/or visible outputs as well in response to any interaction of the child with the toy weapon 3200. The application on the device 3250 can use the output components (the electronic system including the transducer) of the toy weapon 3200 as a pass-through for the outputs generated from the device 3250. In other words, the outputs generated by the device 3250 can be played through the output components of the toy weapon 3200, which can amplify the outputs of the device 3250.

In one implementation, the generation of outputs by the device 3250 and toy weapon 3200 can occur in response to a particular input from the user of the toy weapon 3200. The device 3250 may wait for a second contact point to be detected by the touch screen 3252 before any outputs are generated. The second contact point may be generated in response to the child's activation of the trigger of the toy weapon 3200. When a child pulls the trigger, a second touch point in a special region of the touch screen 3252 can be generated. In response to this second touch point, the electronic device 3250 can generate a particular output, such as the sound of a weapon shooting. This second touch point can be generated by a mechanical link or linkage coupled to the trigger that moves into contact with the touch screen 3252 as the trigger is pulled. Alternatively, this second touch point can be generated by a wire or cable that is movable in response to the movement of the trigger of the toy weapon 3200. The wire or cable touches the touch screen 3252 when the trigger is pulled. This second touch or contact point provides for focused outputs that are directed associated with the interaction of the child with the toy weapon 3200. In yet another alternative, the second touch point may already be in contact with the screen 3252, but might not be capacitively coupled to the child's body until the child pulls the trigger. For example, the pulling of a trigger may close a switch that electrically connects the second touch point to the child's finger.

Figure 59:
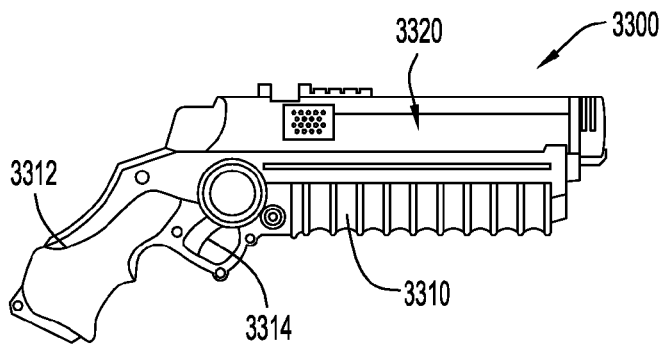
FIG. 59 illustrates a side view of another input object according to an embodiment of the invention.
Figure 60:
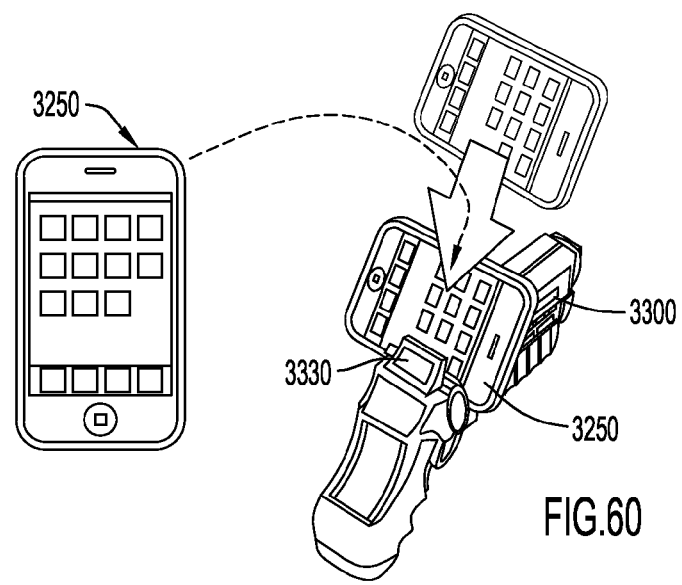
FIG. 60 illustrates a rear perspective view of the input object illustrated in FIG. 59 with an electronic device.
Figure 61:
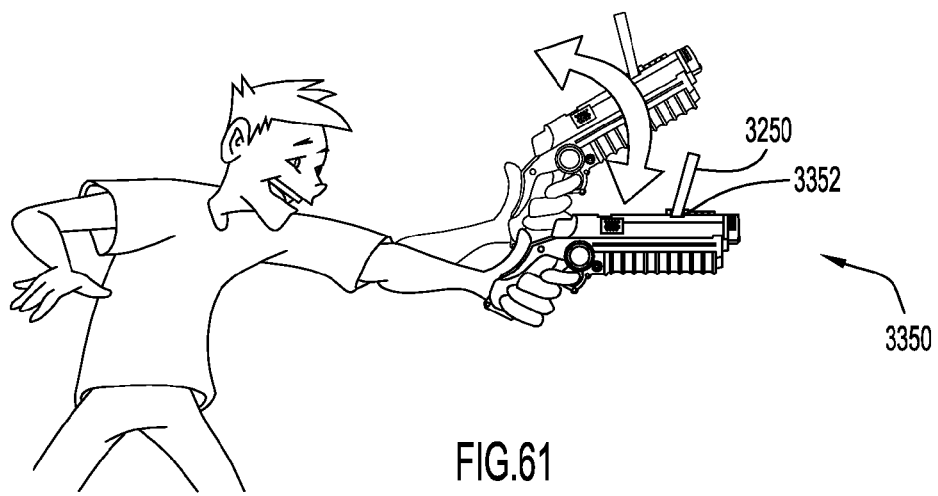
FIG. 61 illustrates a side view the input object illustrated in FIG. 59 in use.

Referring to FIGS. 59-61, additional embodiments of a toy weapon useable with an electronic device are illustrated. Referring to FIG. 59, the toy weapon 3300 includes a barrel portion 3310, a handle 3312, and a trigger 3314. A light output device 3320 is coupled to the barrel portion 3310. Similar to toy weapon 3200, the toy weapon 3300 can generate audible and/or visible outputs.

Referring to FIG. 60, toy weapon 3300 includes a mounting mechanism 3330 that is configured to receive a portion of the electronic device 3250 to couple the device 3250 to the toy weapon 3300. The mounting mechanism 3330 is located near the intersection of the handle portion and barrel portion of the weapon 3300. The mobile electronic device 3250 can be slid into the mounting mechanism 3330 which includes a slot to receive the device 3250. In one embodiment, an application for an on screen game is opened when the electronic device 3250 is mounted to the toy weapon 3300. When the device 3250 is mounted, the device 3250 can interact with the toy weapon 3300, which detects the presence of the device 3250 through mounting mechanism 3330.

Referring to FIG. 61, a toy weapon 3350 is illustrated that is generally similar in configuration to toy weapon 3300 with the exception that the location of its mounting mechanism 3352 is located along the barrel portion of the toy weapon 3350.

Figure 62:
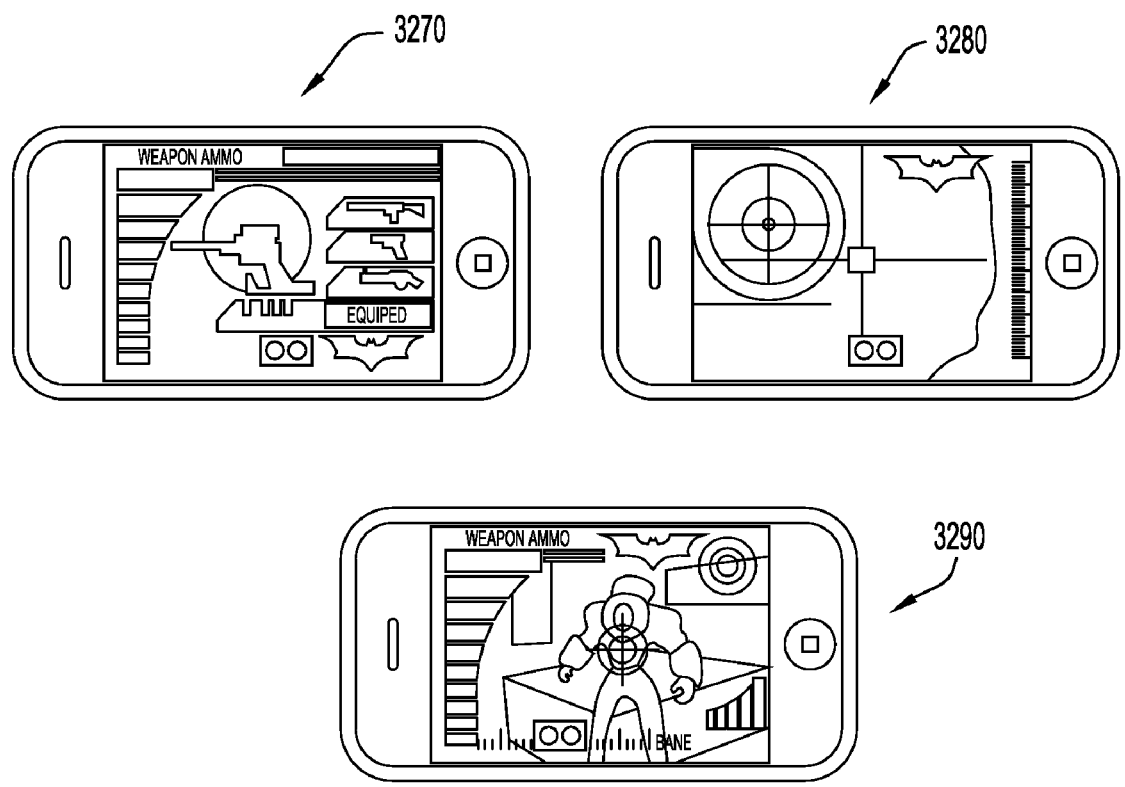
FIG. 62 illustrates three exemplary screenshots from an application that can be associated with the input objects illustrated in FIGS. 56-61.

Some exemplary applications that can be run on the electronic device 3250 while coupled to the toy weapons 3200 and 3300 are illustrated in FIG. 62. Screen shot 3270 is part of a change weapon mode of play in the application in which the child can change the particular weapon that the toy weapon 3200 simulates via various outputs. Screen shot 3280 is part of a night vision play in the application. Screen shot 3290 shows an augmented reality game that can be playing on the device 3250 while the child plays with and maneuvers the toy weapon 3200. In one implementation, the electronic device adds a screen tint to generate an imaginary night vision mode. In another implementation, the toy weapon can have infrared LEDs that would allow for right night vision play using the electronic device. In another implementation, the electronic device can enter a stealth mode when lights are turned off and the toy weapon can automatically turn on the infrared LEDs.

The touch screen 3252 of the electronic device 3250 can be used for both input and output. Input via the screen can be accomplished as described above through the use of one or more contact members creating one or more contact points, and thus, the toy weapons 3200 and 3300 can control the device 3250 by the points. The screen can also output data and information to the toy weapons 3200 and 3300 by blinking an image or lights (or lights of particular wavelengths) that can be sensed by a detector associated with and/or forming part of the toy weapons 3200 and 3300. Such data could include a signature indicating the running of a particular application, or it might include data used by the toy to enhance gameplay.

In other embodiments of the invention, an interactive toy different than the toy weapons 3200 and 3300 can be can be used with an electronic device 3250 which enhances the play and use of the interactive toy.

A weapon similar to weapon 3200 or weapon 3300 can have several different features. The weapon or toy can signal the device. For example, when a child pulls the trigger on the toy, the electronic device outputs sound effects to an audio amplifier of the toy and out through the speaker of the toy. In addition, the electronic device can instruct the toy about effects patterns and timing. The electronic device can automatically recognize the toy that it is coupled or mounted to and can configure itself to offer the correct play and interactive content with the toy.

The electronic device can be used to provide a heads up display. A camera on the electronic device can be used to deliver a room scene with statistics and other screen overlays, including but not limited to, weapon type, power level, messages from other players, targeting, and tracking. The electronic device can be used for different types of tracking. One example includes locking onto targets on its screen using graphics. Another example includes eye tracking for targeting systems in an electronic device with a front facing camera.

The electronic device can be configured so that when a child tilts the toy weapon, an input is created. For example, the child may be able to tilt or lift the front of weapon to effectively "reload" the toy weapon for additional play. The electronic device also provides voice interaction with the toy weapon. Voice commands can be generated by the electronic device. For example, the electronic device may output "reload!", "plasma grenade!", or "status report!" Other commands may be related to ammunition or weapons selection, or may request changes in the system and feedback from the child. Also, the electronic device may include various audible feedbacks relating to the play using the toy weapon.

The electronic device can be used to facilitate co-op play. In one example, co-op play in the same room or remotely can be accomplished through WiFi or Bluetooth communications or a network connection. Game play, such as scoring, can be coordinated between multiple players using multiple electronic devices. The players can exchange statistics with each other, and send "bombs" or "hits" to an opponent, which result in a reaction (audible, visual, and/or tactile) at the toy weapon of the opponent. The accelerometer and compass of an electronic device can be used to track other players and to "see" virtual objects during game play. Some virtual objects, including an avatar for an opponent, can be seen on an electronic device during game play. In addition, the electronic device can be used to record video and/or audio of game play using the toy weapon. For example, video of following an opponent, shooting/tagging an opponent, and a battle with another opponent can be recorded.

Figure 63:
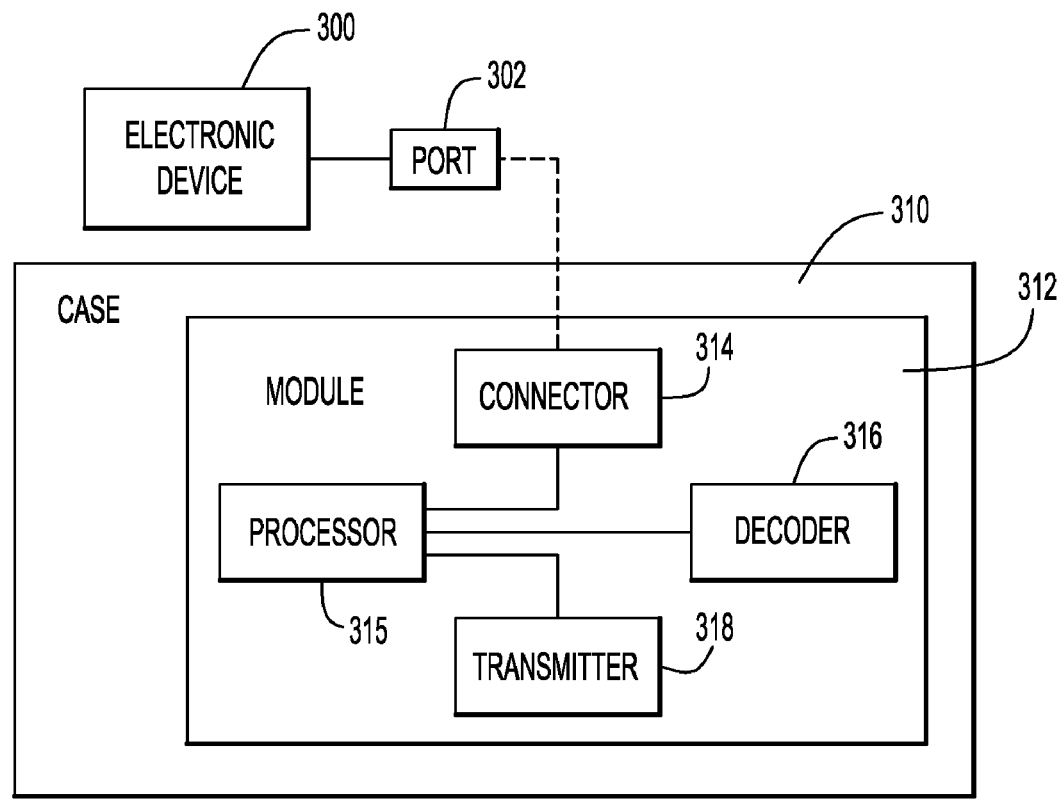
FIG. 63 illustrates a schematic block diagram of an electronic device and a case according to an embodiment of the invention.

Referring to FIG. 63, another mode of communication with an electronic device is illustrated. In this implementation, an electronic device 300 generates a signal and a case 310 coupled to the electronic device 300 can pick-up the signal, process it, and transmit it to a different device. Thus, the case 310 has input and output capabilities and functionalities. The case 310 can be hard or soft and can be made of molded plastic or other material and can be mounted to the device 300 such that the case 310 provides protection to the electronic device 300.

The electronic device 300 includes a housing with a port or headphone jack 302. The case 310 includes a module or component 312 that can be in communication with the electronic device 300. In this embodiment, the module 312 is in contact with the device 300. The module 312 includes a connector 314, such as a plug, that can be inserted into the port 302 of the electronic device 300. The connector 314 allows for electrical communication between the case 310 and the electronic device 300.

In this embodiment, the module 312 also includes a processor 315, a decoder 316 for decoding one or more signals output by the device 300 and passed through the module 312, and a transmitter 318 for transmitting the decoded signals to a separate device or object. The module 312 can be used to decode one or more signals from the device 300. Some exemplary decoded signals and decoding techniques are described below. The decoded signal(s) can be processed and transmitted via a transmitter 314 to one or more different devices or objects.

Figure 64:
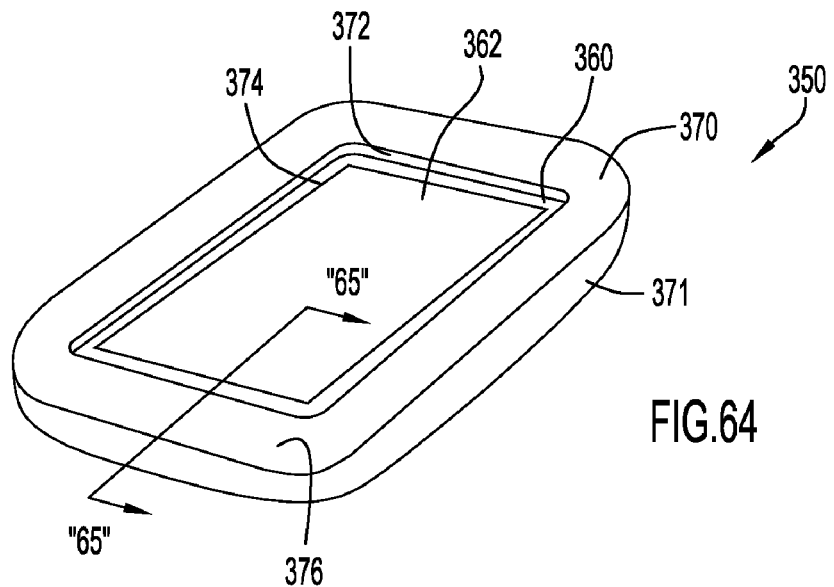
FIG. 64 illustrates a perspective view of a case and an electronic device according to an embodiment of the invention.
Figure 65:
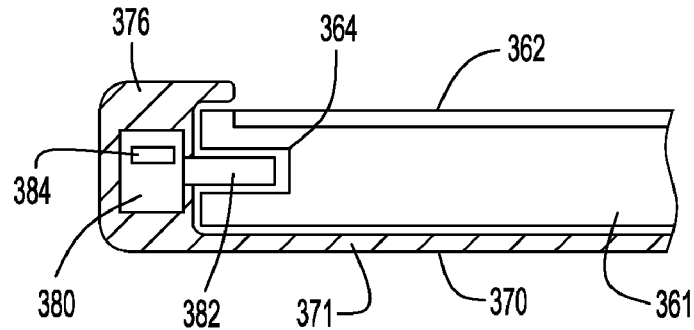
FIG. 65 illustrates a partial cross-sectional view of the case and electronic device of FIG. 64 taken along line "65-65."

Referring to FIGS. 64 and 65, an embodiment of a system 350 including an electronic device 360 and a case 370 is illustrated. In this embodiment, the electronic device 360 includes a housing 361 and a screen or display 362 that extends along a portion of the housing 361. The housing 361 also includes a port or jack 364. The device 360 includes an internal electronic system (not shown) that generates outputs depending on the particular application being run by the operating system of the device 360.

The case 370 includes a housing 371 that surrounds a portion of the device 360. The housing 371 of the case 370 has an edge 372 that defines an opening 374 that permits access to the screen 362 of the device 360. Proximate to one end 376 of the case housing 371 is a module 380 with circuitry and that includes a connector or plug 382. The connector 382 is configured to be inserted into the port 364 (such as an audio jack or a microphone jack) of the device 360 and to facilitate communication between the device 360 and the module 380. The module 380 also includes a decoder (not shown) and a transmitter 384 that can transmit a signal based on the decoded signal from the device 360.

Figure 66:
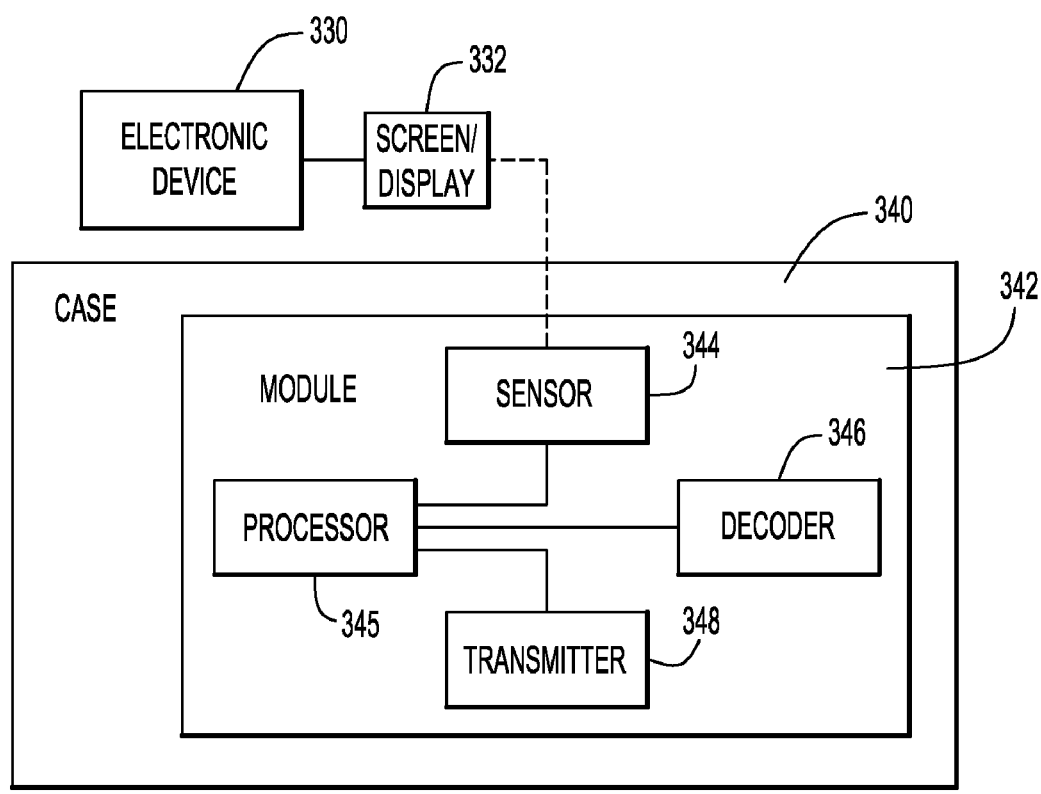
FIG. 66 illustrates a schematic block diagram of an electronic device and another case according to an embodiment of the invention.

Referring to FIG. 66, another mode of communication with an electronic device is illustrated. An electronic device 330 generates a signal and a case 340 coupled to the electronic device 330 can pick-up the signal, process it, and transmit it to a different device. In this implementation, the electronic device 330 includes a housing with a screen or display 332. The case 340 includes a module or component 342 that can be in communication with the electronic device 340. Instead of the connector 314 in module 312 illustrated in FIG. 18, case 340 includes a sensor 344 that is used in conjunction with the screen or display 332. The sensor 344 and the display 332 enable communication between the case 340 and the electronic device 330. The sensor 344 and the display 332 do not have to be in contact with each other. The module 342 of the case 340 may include a processor 345, a decoder 346, and a transmitter 348 similar to the processor 315, the decoder 316, and the transmitter 318 of module 312.

Figure 67:
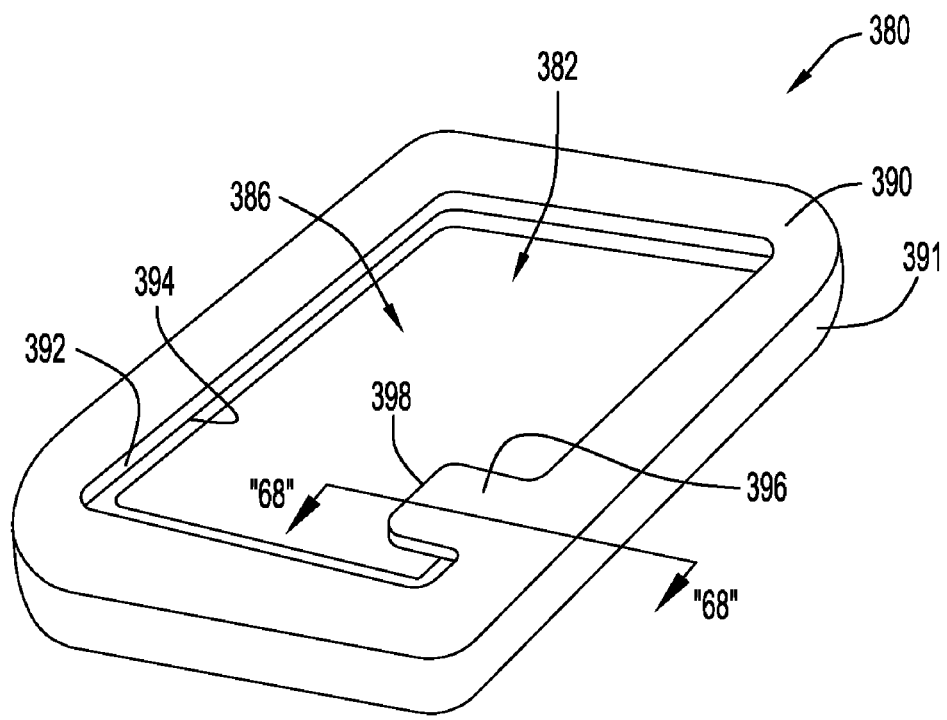
FIG. 67 illustrates a perspective view of another case and an electronic device according to an embodiment of the invention.
Figure 68:
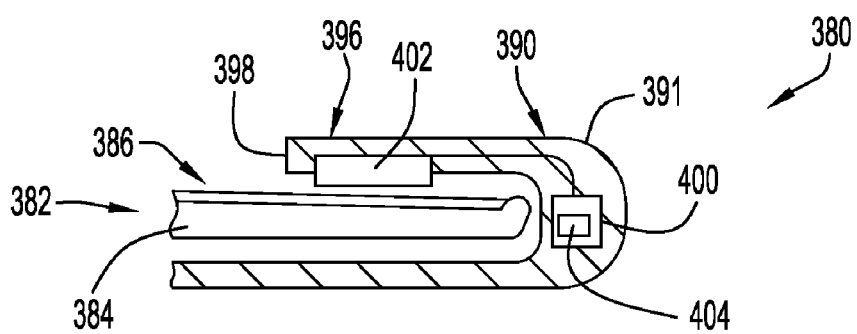
FIG. 68 illustrates a partial cross-sectional view of the case and electronic device of FIG. 67 taken along line "68-68."

Referring to FIGS. 67 and 68, another embodiment of a system 380 including an electronic device 382 and a case 390 is illustrated. Electronic device 382 includes a housing 384 and a screen or display 386 that extends along a portion of the housing 386.

The case 390 includes a housing 391 that surrounds a portion of the device 382. The housing 391 of the case 390 has an edge 392 that defines an opening 394 that permits access to the screen 386 of the device 382. The housing 391 includes a module 400 that includes circuitry and a sensor 402. The sensor 402 can be a photo detector or photo sensor. In alternative embodiments, in the event that a particular image is to be detected from the screen 386, a CMOS (complimentary metal oxide semiconductor) image sensor or a CCD (charge coupled device) image sensor can be used as sensor 402.

The sensor 402 is located so that the sensor 402 can be positioned proximate to a particular area or region of the screen 386. As described above with respect to FIGS. 5-8, the screen 386 may include a particular area or region that can be used to communication information therefrom.

In this embodiment, the case 390 includes a projection or projecting portion 396 that extends inwardly from the edge or perimeter of the case 390. The projection 396 is located such that the projection 396 and its end 398 extends over or overlaps part of the screen 386. The sensor 402 is coupled to the projection 396 and located over a desired part of the screen 386. The module 400 also includes a decoder (not shown) and a transmitter 404 that can transmit a signal based on the decoded signal from the device 382. In an alternative embodiment, a photo detector can be coupled to an electronic device or a screen of an electronic device by a coupling structure, such as a suction cup. In another embodiment, the photo detector can be clamped on the housing of the electronic device or to the screen.

In one embodiment, the case for an electronic device can include a speaker and/or a microphone. The microphone can be used to detect vibrations. In an alternative embodiment, a case for an electronic device can include both a connector 382 and a sensor 402. In an alternative embodiment, a piezoelectric device can be provided in the case, which may be a hard case or a soft case. The piezoelectric device can be vibrated to provide an input to an accelerometer of the electronic device.

In one implementation, the modules 380 and 400 of the cases 370 and 390 may be molded into the housings of the cases. Alternatively, the housings of the cases 370 and 390 may be formed with an opening or recess into which the modules 380 and 400 may be inserted after the cases 370 and 390 have been formed. In addition, another opening or recess, if necessary, can be formed in the housing 391 of case 390 for the sensor 402 to be inserted therein. In one implementation, the case may include a light detector or transmitter.

Figure 69:
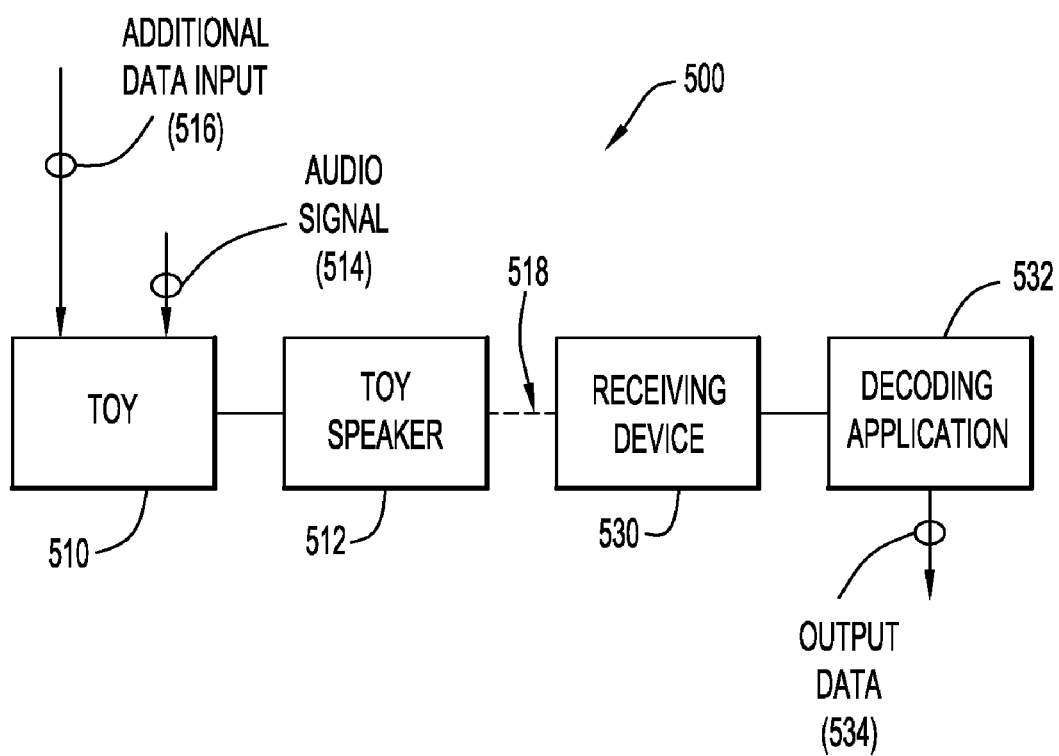
FIG. 69 illustrates a schematic block diagram of a system according to an embodiment of the invention.

Referring to FIG. 69, another system for processing information from an electronic device is illustrated. In this embodiment, the system 500 includes an electronic device 510, which can be a toy, that has a speaker or transducer 512 that can output audible output, such as speech, sound effects, and/or music. The signal output from the speaker 512 is represented by dashed line 518 and can be detected or sensed by another device 530 separate from the toy 510. The signal 518 from the toy 510 includes information or data that is embedded or encoded into the audio stream that is output from the transducer 512. As shown in FIG. 69, an audio signal 514 can be stored in memory of the toy 510 or communicated to the toy 510 from an external source. The additional data input 516 is the information that is included with the sound file or files of the audio signal 514. The inclusion of the signal can be referred to as digital or audio watermarking or steganography.

In one embodiment, the embedded signal can be visible or not hidden in the audio that is output. In other words, the embedded signal is perceptible to a listener in the outputted audio. The embedded information can also be perceived if the information becomes part of the play pattern of the toy 510. In an alternative embodiment, the embedded signal is hidden or not visible in the audio that is output. In that scenario, a listener cannot perceive or detect the embedded signal in the outputted audio. This technique can be referred to as audio marking.

The device 530 can be referred to as a receiving device and may include a receiver, a microphone, or other input mechanism that can receive the signal 518 output by the toy 510. The device 530 can be an electronic device consistent with the examples identified above. The audio signal including the encoded or embedded information is sent wirelessly to the device 530. The device 530 picks up the encoded audio via its input mechanism, such as a microphone. The operating system of the device 530 is running a decoding application 532 that processes and decodes the signal received from the toy 510 and separates or filters out certain output data 534 that is part of the received signal. The decoded information is used to drive functionality within an application on the device 530.

In an alternative embodiment, the information is embedded or encoded in a video signal that is output from the device 510. The receiving device 530 includes a sensor or receiver that can receive the transmitted video signal from device 510.

Figure 70:
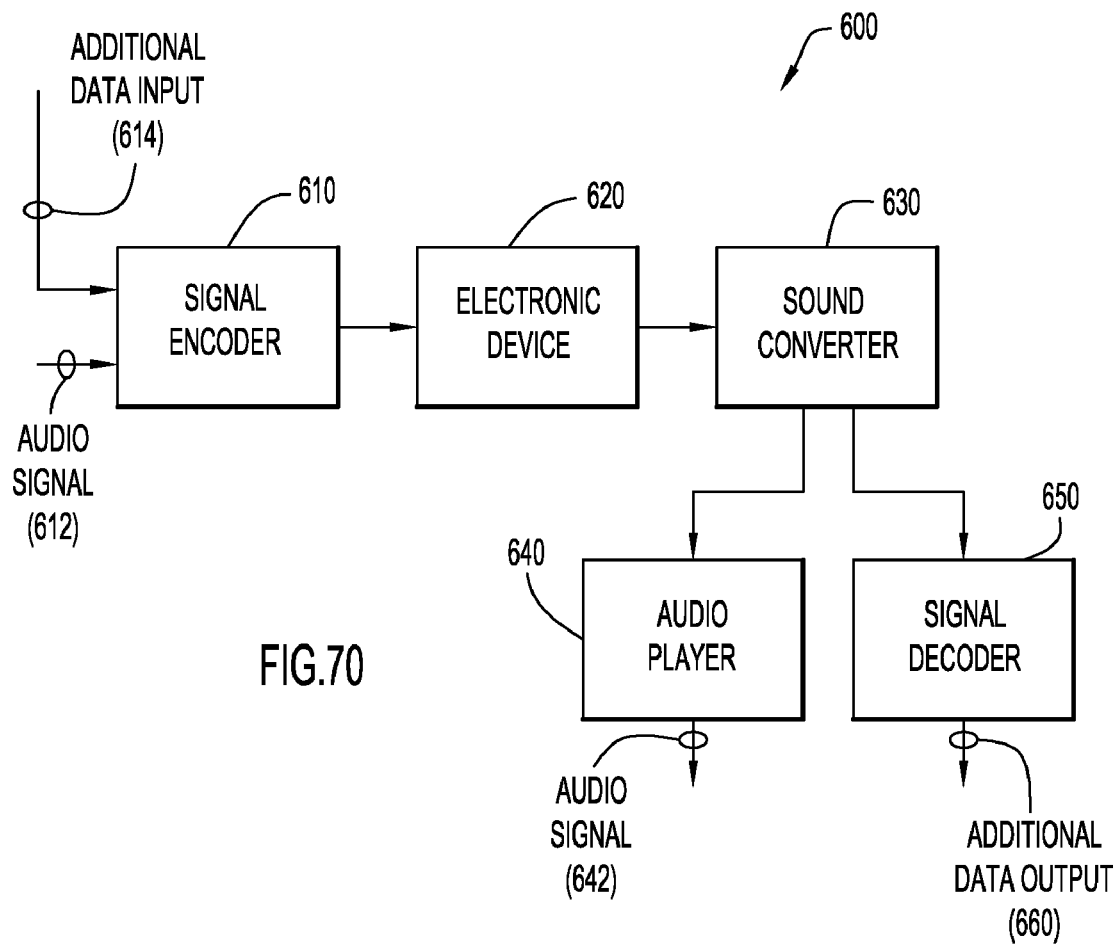
FIG. 70 illustrates a schematic block diagram of a system according to an embodiment of the invention.

Referring to FIG. 70, another system for processing information from an electronic device is illustrated. In this embodiment, the system 600 includes an electronic device 620 and a sound converter or decoder 630 that is operably connected to the electronic device 620. The system 600 also includes a signal encoder 610 that receives an audio signal 612 and an additional data input 614. The encoder 610 processes the received signal 612 and input 614 for the electronic device 620. The processing by encoder 610 involves embedding the information or data input 614 into the audio signal 612. The embedded information can be visible or invisible in the signal 612.

In one embodiment, the signal encoder 610 can be part of the electronic device 620. In another embodiment, the signal encoder 610 can be separate from the electronic device 620 and can be connected, either in a wired manner or a wireless manner, to the electronic device 620.

The system 600 includes a sound converter 630 that receives the signal output by the electronic device 620. The sound converter 630 is external to the electronic device 620. In one embodiment, the sound converter 630 can include a plug that is inserted into a 3.5 mm stereo headphone jack of the electronic device 620. As described below, in that embodiment, the sound converter 630 can transmit one or more signals to a separate electronic device. In another embodiment, the sound converter 630 is part of another electronic device.

The system 600 includes an audio player 640 that is separate from the electronic device 620. The audio player 640 receives the audio signal from the sound converter 630 and can reproduce an audio signal 642 for a listener to hear. A signal decoder 650 receives the data input 614 portion of the signal from the converter 630 and can decode the additional information from the data input 614. The decoded information is in the form of an additional data output 660 that can be used by an electronic device to perform one or more actions, movements, etc. For example, the additional data output 660 can be one of an IR control, motor movement, a light trigger, a sound trigger, or the like.

In alternative embodiments, the electronic device 620 can be running an application other than an audio generating program. For example, in one embodiment, the signal 612 can be a video signal and the data input 614 is embedded in the video signal 612. In another embodiment, the signal 612 can be one or more picture files and the data input 614 is embedded in the picture files. The embedded information can be visible or invisible in the signals 612.

Figure 71:
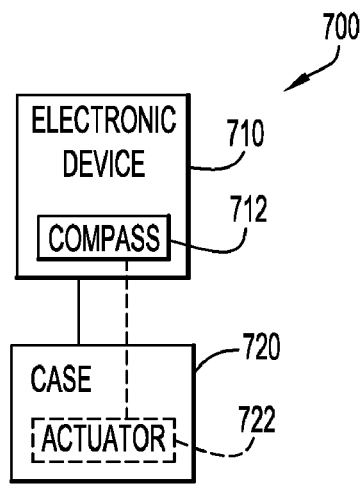
FIG. 71 illustrates a schematic block diagram of an electronic device and a case according to an embodiment of the invention.

Referring to FIG. 71, another system of a mode of communication with an electronic device is illustrated. As shown, this system 700 includes an electronic device 710 and a case 720. The electronic device 710 includes an internal compass 712 and in one embodiment, the electronic device 710 is a digital mobile device, such as a phone. The case 720 is configured to be mounted to the device 710. Sometimes, the compass 712 of the electronic device 710 needs to be calibrated. In one embodiment, the case 720 can send data in to the device 710 and electromagnetically turn on the compass 712 on the device 710 when the case 720 is proximate to the device 710. Such activation of the compass 712 results in the compass 712 being re-calibrated and functioning properly.

In an alternative embodiment, movement of the device 710 can result in the electromagnetic charging of the device 710 as well as electromagnetically turning on the compass 712.

In one embodiment, the case 720 may include an actuator 722 that is activated by the movement of the case 720 and the device 710. When the actuator 722 is activated, an electromagnetic field can be generated by the actuator 722 and/or the case 720. The generated field can turn on the compass 712 so that the compass 712 is recalibrated.

In an alternative embodiment, a manner of play can be derived by moving the electronic device 710 around. Such movement of the device 710 can be determined or tracked by the compass 712 or other component of the device 710.

Figure 72:
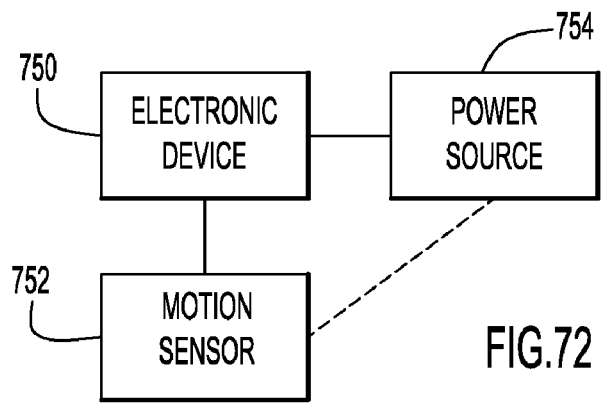
FIGS. 72-74 illustrate schematic block diagrams of electronic devices according to embodiments of the invention.

According to the invention, there are several manners in which power can be generated or supplied to an electronic device. Referring to FIG. 72, an alternative embodiment of an electronic device is illustrated. In this embodiment, the electronic device 750 includes a motion sensor 752 and a rechargeable power source or power storage component 754.

The motion sensor 752 is configured such that the motion sensor 752 can detect motion of the electronic device 750 and generate a signal upon the detection of the motion. The signal generated by the motion sensor 752 is used to generate power for the electronic device 750. The motion sensor 752 signal is used to charge up the circuitry connected to the power source 754 so that the amount of energy or power stored in the source 754 increases when movement of the electronic device 750 is detected. The electronic device 750 can include a reservoir to which the coupling or charging components can be connected to build up a charge for the device 750. In one embodiment, a capacitor could be used to build up a charge intended for powering the device 750. The charge would desirably be large enough to increase the capacitance.

Figure 73:
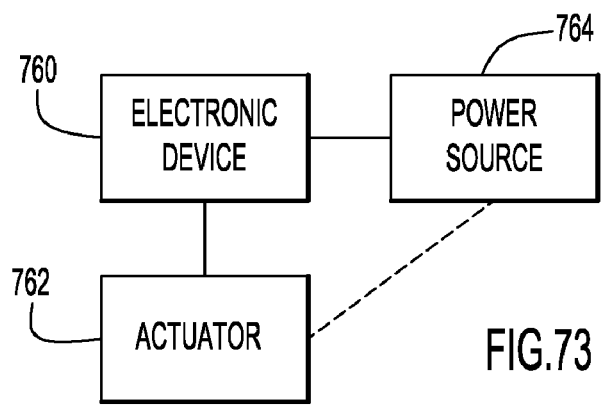

Referring to FIG. 73, an alternative embodiment of an electronic device is illustrated. In this embodiment, the electronic device 760 includes an actuator 762 coupled to a body or housing of the electronic device 760. The actuator 762 can be manipulated by a user to generate a charge for the circuitry of the power source 764 of the device 760. In one implementation, the actuator 762 can be a handle that is rotatably mounted to the housing of the device 760.

Figure 74:
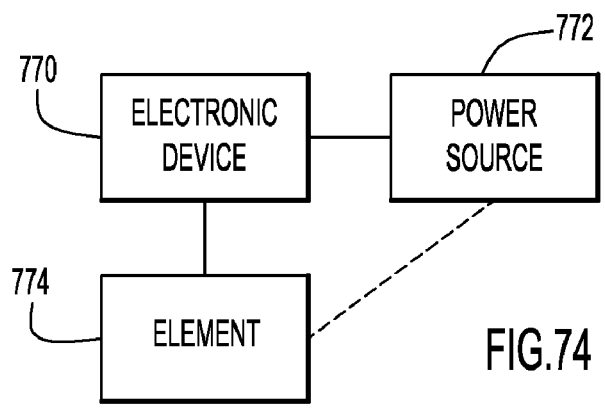

Referring to FIG. 74, an alternative embodiment of an electronic device is illustrated. The electronic device 770 includes a power source or component 772 and an element 774 that can be used to charge the rechargeable power source 772. In one embodiment, the rechargeable power source 772 can be a rechargeable lithium cell that is charged by the use of or movement of the electronic device 770.

In one implementation, the element 774 can be a solar cell that is chargeable by the light from the environment or an external source, such as the screen of another electronic device. In another implementation, the element 774 can be a piezoelectric element that can be used to build up a charge based on the vibrations detected by the piezoelectric element. The built up charge can be used to recharge the power source 772.

In one embodiment, the vibrations to the device 770 can be caused by the movement of the device 770. In another embodiment, the vibrations can be caused by the engagement or contact of another device with the device 770 and a signal generated in response thereto by a piezoelectric element. In another embodiment, audio sounds generated by another device are picked up by the element 774, which could include a microphone to pick up the sounds. The external microphone jack may have a bias on it, such as two volts at 1.5 mA, and the power generated by the microphone based on the bias could be used to power a capacitor or slowly add a charge to a rechargeable battery. Thus, the jack can be used to provide part of the current demand for the electronic device 770.

In one embodiment, the recording of information by the device may be sufficient to recharge the rechargeable power cell.

There are several ways in which data or information can be input to the operating system of an electronic device according to the invention. The inputting of such information can be referred to alternatively as communicating with the operating system.

In one implementation, an electronic device may include software that is capable of speech recognition. The electronic device can be performed via the handset or microphone. Speech recognition software can be performed via local or network processing and can detect and then recognize the tones or speech of a toy, such as a doll, that generates an audio output. The audio output of the toy could include an embedded signal that identifies the particular toy. The embedded signal can be unique to the toy so that any electronic device that detects the audio output can identify the toy from which the audio output was generated. For example, the electronic device, such as a phone, can listen for a particular toy by detecting audio outputs generated by one or more toys and determining whether the embedded identification signal is the signal for which it is looking.

Similarly, electronic devices can generate outputs that include an embedded signal and a toy can "listen" for a particular electronic device by detecting and processing embedded information or data signals and then causing the toy to perform some action when the signal for which the toy is looking is identified. In these examples, either or both of an electronic device and a toy can emit watermarking signals that can be used to identify the particular item. In one implementation, a child can pretend to call a character, such as Barbie, on a phone with another character, such as Ken. When the phone and the toy figures, Barbie and Ken, have emitted encoded watermarking signals, the phone and the toys have confirmed that proper electronic devices (including the toy figures) have been identified, the child and the toy figures can pretend to have a three way conference call. In a different embodiment, speech recognition can be used to identify particular toy figures that are "speaking."

Similarly, in another embodiment, the software of a game can listen for a particular electronic device, such as a phone, and the phone can listen for a particular game. In another embodiment, the electronic device, such as an iPhone mobile digital device, could be running an application that continually searches for a particular toy or device. When the signal for which the electronic device is searching is identified, then the electronic device can join the new device as an additional player in a game or as an additional "caller" to an exiting "conference call."

In another embodiment of the invention, an electronic device can be configured to perform gesture recognition. In this implementation, the electronic device may include an accelerometer which can be used to detect one or more gestures performed by a user or inanimate object. The detection of a particular gesture may result in the launching of an application on the electronic device. Alternatively or in addition, the detection of a particular gesture may result in the input of data into the electronic device. For example, an electronic device can be placed into a socket formed in a device, such as a toy sword. When a person moves the toy sword, the electronic device can track the movement of the toy sword for a period of time. The electronic device may be running an application that prompts the person to move the toy sword in a particular manner or pattern of movements. The application can track the movements of the toy sword and compare them to the target or specified movements. One or more outputs, including audio and visual outputs, can be generated in response to the comparison of the targeted movements and the specified movements. Alternatively, the application can cause various audible and/or visual outputs as the toy sword is moved. In addition, the movement of the toy sword can be used to power up the electronic device by recharging a power source, in a manner similar to that described above.

In another embodiment, an electronic device can be used for visual or vision recognition. In one use, the electronic device can include a camera component and image recognition software. The camera and the associated software can be used to recognize changes in an environment. For example, the electronic device can be used to take a picture or snapshot of an area. A user can change the area in someway in which the area appears to be different than it was previously. The electronic device can then be used to take another image capture. The image files can be compared by the software and any differences identified. In one implementation, a picture can be mounted on a wall in a room. The electronic device is used to take image capture of the picture on the wall. The picture can then be removed from the wall and the electronic device can be used to take another image capture of the wall. The second image will be different than the first image. Alternatively, the original picture can be replaced with a different picture and a second image capture is taken by the electronic device. Alternatively, the first image is of an object in a first configuration and the second image is of the object in a second configuration different than the first configuration. Any differences in images can be used to convey information to the electronic device, such as to program the electronic device.

Figure 75:
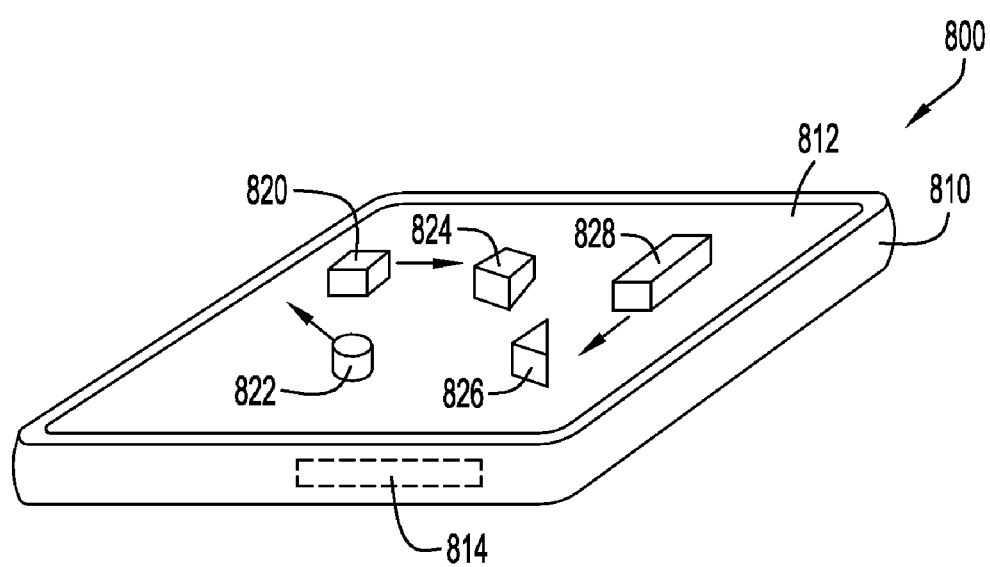
FIG. 75 illustrates a perspective view of an electronic device according to an embodiment of the invention.

Referring to FIG. 75, another embodiment of a system according to the invention is illustrated. In this embodiment, the system 800 includes an electronic device 810, such as an iPad, with a touch screen surface 812. The electronic device 810 includes a sensor 814 that can detect the location of one or more objects, such as objects 820, 822, 824, 826, and 828. The movement or relocation of the objects relative to the screen 812 can be detected by the sensor 814. Thus, the system 814 of the electronic device 810 can determine the location of the objects at any one time. One application running on the electronic device 810 can generate images of tread marks on the screen 812 when an object simulating a toy vehicle is moved along part of the screen 812. The movement of the objects relative to the surface 812 can be tracked by the system 814 and when the movements cease and play is complete, images representing the movements can be replayed on the screen 812, and thus, a recreation is generated.

Figure 76:
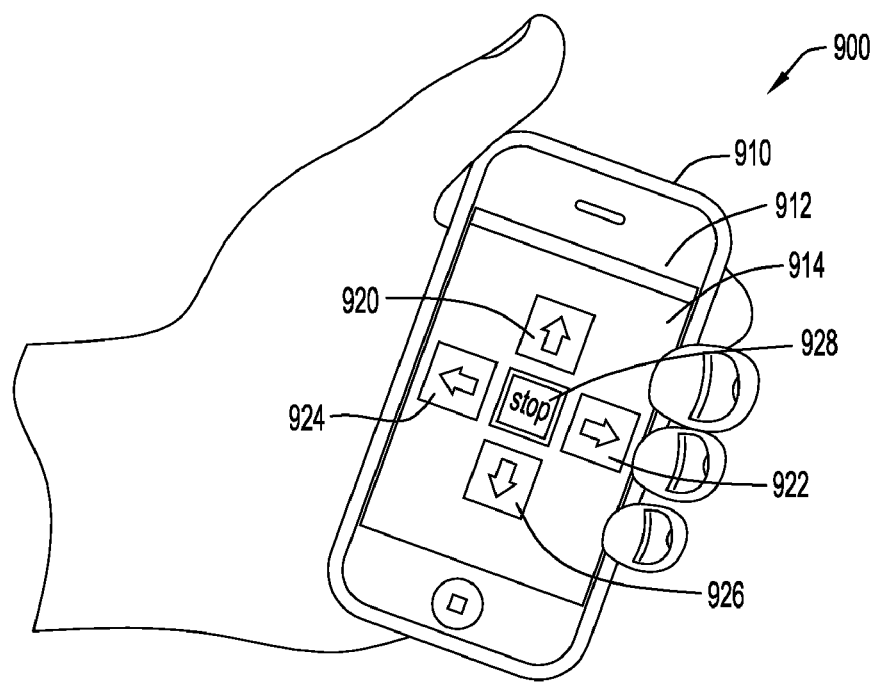
FIG. 76 illustrates a perspective view of an embodiment of an audio remote according to the present invention.
Figure 77:
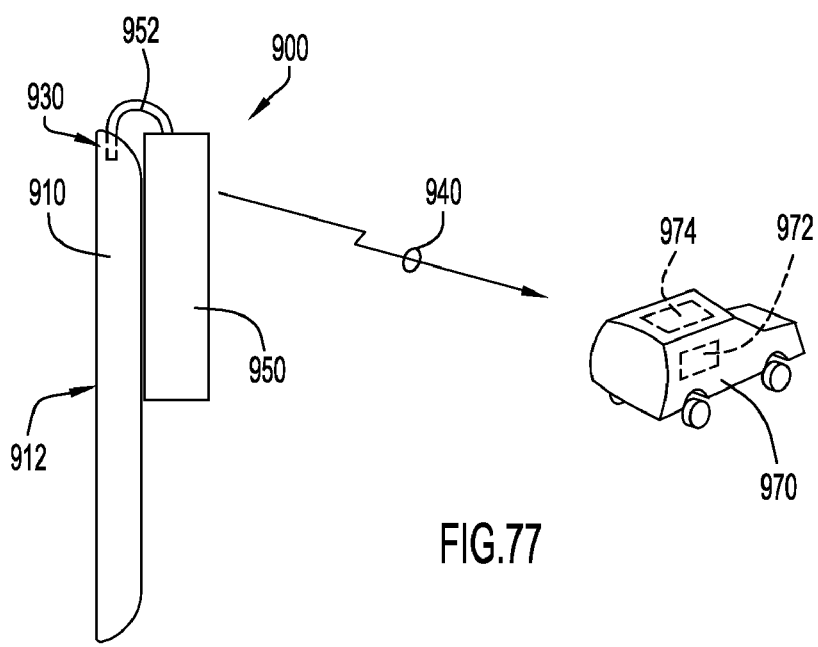
FIG. 77 illustrates a perspective view of the audio remote illustrated in FIG. 76 and a remote object.

Referring to FIGS. 76-77, an exemplary embodiment of an audio remote 900 that can be used as a remote control with an electronic device 910 is illustrated. In this embodiment, the electronic is a mobile device, such as an iPhone, iPod, or other audio player. The audio remote 900 includes an electronic component 950 that is coupled to the electronic device 910. The electronic component 950 is connected to an audio jack 930 of the device 910 via a wire 952. As described in detail below, the electronic component 950 is configured to transmit a signal 950 to a remote object 970. In this embodiment, the remote object 970 is a toy vehicle with a drive mechanism 972 and an IR receiver 974, such as a photodiode, that can receive an IR signal 940 from the audio remote 900. In other embodiments, the remote object 970 can be a character, a figure, a play set, or other device that can receive instructions to cause at least one movement of a portion of the remote object 970. Audio remote 900 may transmit the signal 940 via any of a wide variety of known wireless remote control techniques, including without limitation infra-red (IR) light, visible light, ultraviolet light, analog or digital radiofrequency signals, or RF signals according to various standards, such as 802.11 or Bluetooth. Remote object 970 would therefore include a corresponding receiver adapted to receive signal 940.

Referring to FIG. 76, the electronic device may include a touch screen or display 912 that present a user interface 914 that can be manipulated by a user to send control instructions from the audio remote 900 to the toy vehicle 970. The user interface 914 includes several graphic objects displayed on the screen 912. Graphic object 920 is a virtual button that is associated with movement of the remote object 970 in a forward direction. In addition, graphic object 920 may include indicia, such as an arrow pointing away from the user of the electronic device 910 and the word "Forward." Similarly, graphic objects 922, 924, and 926 are virtual buttons associated with movement of the toy vehicle 970 to the right, to the left, and reverse, respectively. Each of the graphic objects 922, 924, and 926 can include an arrow pointed in the proper direction as well as the associated word "Right," "Left," or "Reverse." The user interface 914 also includes a virtual button 928 that is associated with stopping the vehicle. This button 928 may have a different color, such as red, a stop sign configuration, and/or the word "Stop" thereon.

Each one of the Forward, Reverse, Right, Left, and Stop functions generates an audio tone, which is output from the audio jack 930 of the device 910 to the circuit of electronic component 950. The electronic component 950 converts the received audio signal into an IR control signal that can be transmitted to the toy vehicle 970 to control the movement thereof.

Referring to FIGS. 78-81, some of the components of the audio remote 900 and their usage are illustrated. As mentioned above, in the described embodiment the audio remote 900 is intended to be used as an infrared (IR) remote adapter/converter for an electronic device 910. The control commands are recorded as audio files in any format that is playable by the player or device, such as .wav, .mp3, .m4a files or other audio file formats, or the control commands may consist of bursts of tones at particular frequencies and may therefore be generated on-the-fly by an application running on electronic device 910. As described below, the audio remote 900 modulates the incoming audio signal by an IR carrier frequency and sends the signal to one or more IR LEDs.

Figure 78:
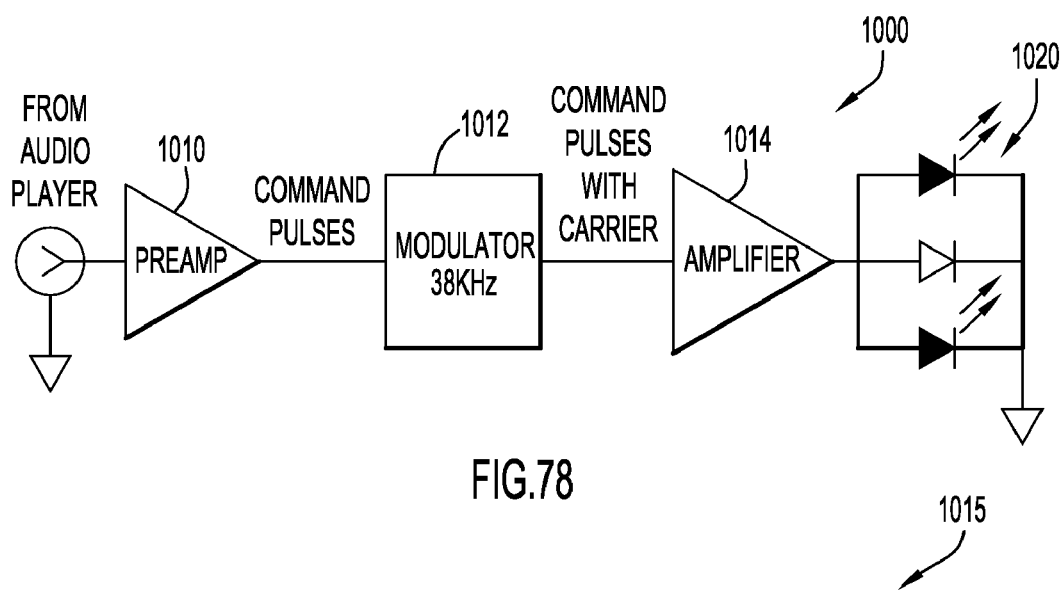
FIG. 78 illustrates a schematic block diagram of the structure of an audio remote according to an embodiment of the invention.
Figure 79:
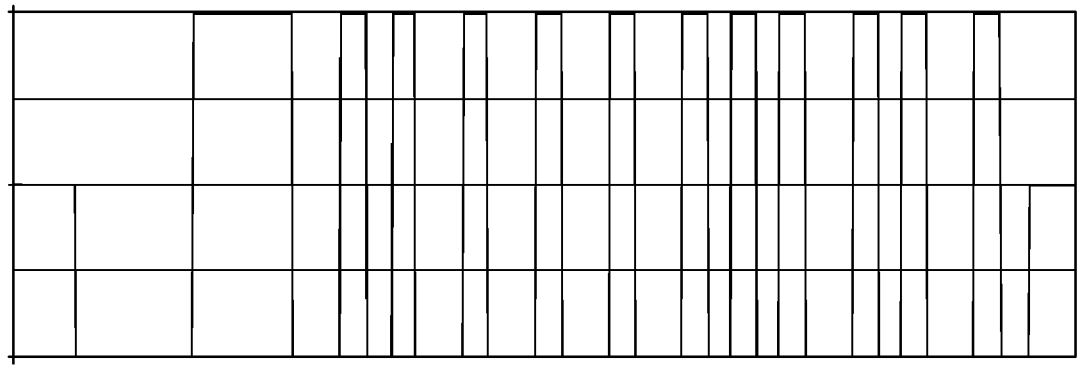
FIG. 79 illustrates an exemplary prerecorded audio command according to an embodiment of the invention.
Figure 80:
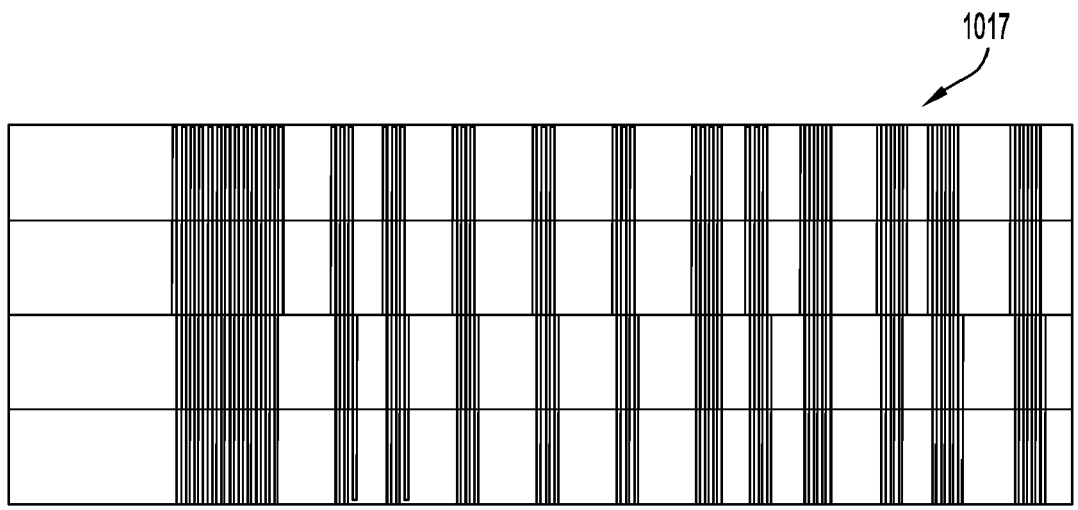
FIG. 80 illustrates the command illustrated in FIG. 79 after it has passed through the modulator of the audio remote illustrated in FIG. 78.

Referring to FIG. 78, some of the components of the circuit 1000 of audio remote 900 are illustrated. The audio remote 900 takes an audio signal such as audio tones from an audio player and passes it through a preamplifier 1010 which amplifies the signal to command pulses as shown in FIG. 79. The command pulses pass through a modulator 1012 which combines the command signal with a 38 kHz carrier signal, resulting in a command signal as illustrated in FIG. 80.

Figure 81:
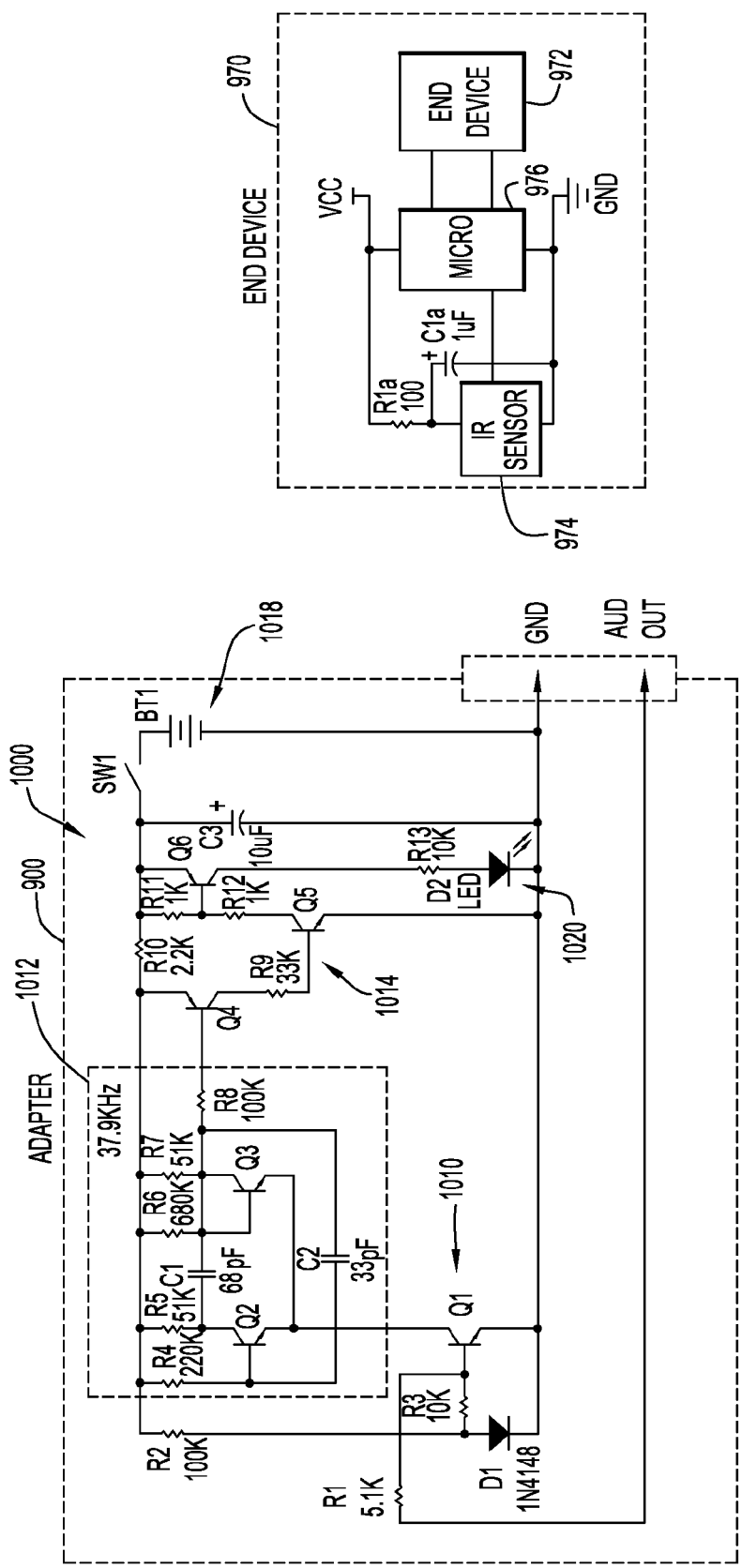
FIG. 81 illustrates a schematic diagram for an adapter and an end device according to an embodiment of the invention.

An exemplary electrical schematic diagram of the audio remote 900 is illustrated in FIG. 81. As mentioned above, and as shown in FIG. 81, the adapter 900 includes a preamplifier circuit 1010 for the audio signal, a modulator circuit 1012 that combines the audio command signal with a 38 kHz carrier signal, and an amplifier 1014 to amplify the combined signal for output by IR LED 1020. The modulated signal next passes through amplifier circuit 1014 to at least one output LED 1020, though multiple LEDs may be provided to enhance signal transmission and reception. The LED 1020 transmits the IR command signal from the audio remote 900 to the remote object 970. The circuit 1000 also includes its own power supply, illustratively shown as battery BT1, 1018.

The output command signals of the IR LED 1020 are detectable by the IR receiver 974 of the remote object or end device 970. The remote object 970 includes a microprocessor 976 that provides the resulting instructions from the received commands to one or more end devices 972, which can include one or more drive mechanisms in the remote object 970. For example, the remote object 970, such as a toy vehicle, may have two drive mechanisms in a "tank steering" configuration. In one implementation, the instructions can be to activate a motor or drive mechanism to cause one or more wheels or to be driven to move the toy vehicle forward or backward or to turn the toy vehicle in a different direction by operating wheels on different sides of the vehicle at different rates or in opposing directions.

In different embodiments, the user interface may include graphic objects and functionalities in addition to the driving functions described above. For example, a toy vehicle may have one or more movable parts, such as a turret, a crane, an arm, or other movable structure that can be moved by a drive mechanism on the toy vehicle. The parts can be moved in any number of directions relative to the body of the toy vehicle.

Figure 82:
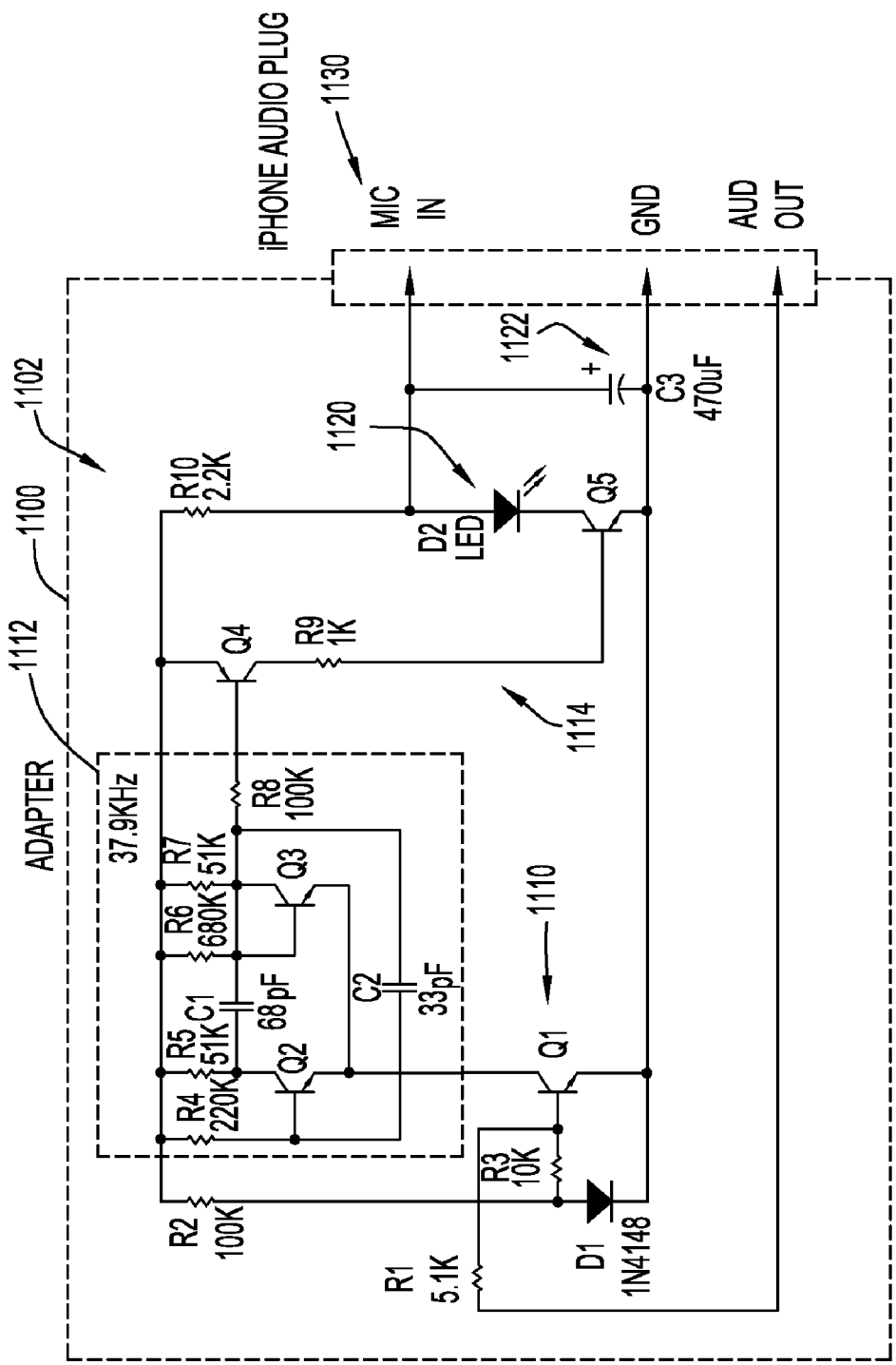
FIG. 82 illustrates a schematic diagram for an adapter according to an embodiment of the invention.
Figure 83:
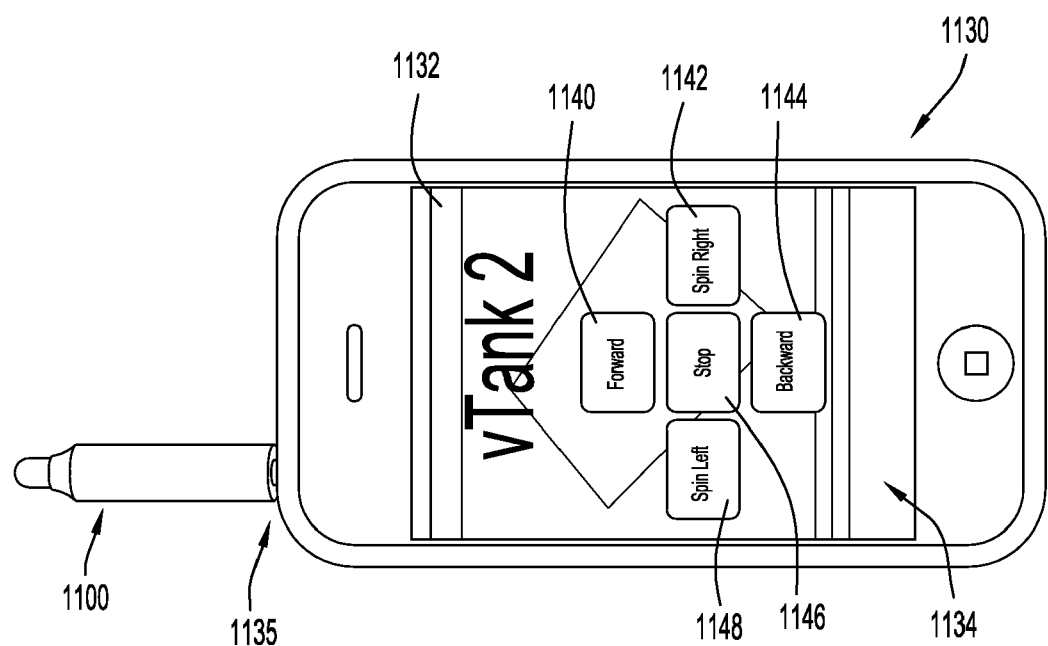
FIG. 83 illustrates a plan view of an audio remote according to an embodiment of the invention.

Referring to FIGS. 82 and 83, another embodiment of an audio remote is illustrated. In this embodiment, the audio remote 1100 is an adapter with many components similar to those discussed above for audio remote 900. Some audio players provide the possibility to use the internal power supply of the audio player to power external devices. For example, some audio players provide audio and microphone connectors (or a combined audio/microphone jack), including three leads (audio out, microphone, and ground/common). In such players, the microphone lead provides a bias voltage that can be used as a source of power for an external device, though the voltage and/or current levels from such a power source are often quite limited. Audio remote 1100 can be used with such an audio player, particularly, because the audio remote 1100 does not have its own power supply.

As shown in FIG. 82, the circuit 1102 of the audio remote 1100 includes a preamplifier circuit 1110, a 38 kHz modulator circuit 1112, and an amplifier circuit 1114 for the output LED 1120. The microphone bias input provided by the microphone jack 1135 of the electronic device 1130 (see FIG. 82) is used to power the audio remote 1100, which is coupled as a dongle to the device 1130. Because microphone bias current is quite limited, capacitor 1122 is provided to store charge from the microphone bias during the time between command pulses discharged through the LED during the transmission of IR command pulses from the audio remote 1100.

Referring to FIG. 83, the electronic device 1130 may include a touch screen or display 1132 on which a user interface 1134 can be provided. Similar to the user interface 914 illustrated in FIG. 76, user interface 1134 includes several graphic objects configured to resemble buttons. Graphic objects or virtual buttons 1140, 1142, 1144, and 1148 are associated with forward, spinning to the right, reverse, and spinning to the left movements, respectively, of a remote toy vehicle, such as a tank. The user interface 1134 also includes a stop object or button 1146 that can be actuated to stop movement of the toy vehicle. When the touch screen 1132 of the electronic device 1130 senses a touch of a user in the area of one of the graphic objects 1140, 1142, 1144, 1146, and 1148, the application determines the selection of the particular function associated with the selected graphic object. Each function generates an audio tone, which is then output by the audio jack 1135 of the device 1130 to audio remote 1100. The audio remote 1100 converts the received audio tone signal into an IR control signal that can be received by the toy vehicle 970 to control the movement thereof.

Referring to FIG. 84, a schematic diagram of another embodiment of an audio remote is illustrated. In this embodiment, any type of information, such as commands, can be transmitted on the baseband signal without a carrier signal. In this implementation, the IR receiver decodes the unmodulated IR signal at baseband frequencies. The transmission of the signal can provide a data rate of up to 9600 baud or higher, based upon the audio output components included in the electronic device 1130.

In this embodiment, the audio remote 1200 includes a circuit 1205 that receives an audio signal 1220 and generates an output of an IR transmission signal via an output LED 1210. The IR signal is not merged with a carrier signal. A remote object 1250 has its own circuit 1255 with a photodiode 1260 configured to receive the transmitted IR signal from the LED 1210 at baseband frequencies. The remote object 1250 can be controlled by the audio remote 1200 in this arrangement as well.

In an alternative embodiment, in a stereo system, one channel could be used for command transmission and the other channel could be used for an audible signal, such as music and/or speech. That arrangement can be used for controlling an animated toy object with the possibility to change or pre-record different animation sequences and sounds.

The communications between electronic devices described above can be accomplished between different types of electronic devices. In other words, one type of electronic device can communicate with a different type of electronic device.

In different embodiments, the types of devices that can be used to receive signals from an electronic device can include, but are not limited to, vehicles such as tanks, cars, flying craft, or water craft, and other toys such as toy figures, game boards or sets, and action figures. The movement of the toys can be controlled by the sign from the electronic device. In one example, an electronic device, such as a phone, can be used as a controller and send a signal to a toy figure or doll. The electronic device and the toy figure can have simulated conversations with the electronic device functioning as a phone. Alternatively, the toy figure may have one or more mechanical movements that are activated by signals from the electronic device.

As an alternative to external devices that can be controlled, the signals can be used to control accessories that are attached to an electronic device, such as a hybrid phone and device system. In addition, the signals can be used to control game states on a network.

In different embodiments, the external device or object may include any one of the following indicators that can include, but are not limited, an LED-illuminated device that changes color or intensity, a bobble-head doll that vibrates, a motorized element that moves to a different position, a push-puppet that sags or straightens up, a screen (such as an LCD, e-paper, etc.) that changes an image or text, an audio enunciator device that announces, an analog meter that changes position.

In some embodiments, a signal coming in from the headphone jack can be converted to an IR signal. In other embodiments, a signal coming in from the headphone jack can be converted to an RF signal. In other embodiments, a signal coming in from a dongle or wireless adapter, can be sent to an electronic device.

As set forth above, there are several ways to provide input to an operating system of an electronic device. One method of input is to simulate touch events to transfer data into the operating system. A series of touch events can be mechanically or electrically generated at a single point. Alternatively, a pattern of touch events (either multiple simultaneous) can be mechanically or electrically generated at different locations on a touch screen.

Another method of input is to simulate user proximity to transfer data into the operating system via an ambient light sensor. A yet another method of input is to provide a signal through a headset jack microphone input. Alternatively, a method may involve sending data signals through a handset microphone using tone recognition. Another method of input may involve audio containing watermarking. Another method of input may involve tipping the electronic device and measuring or determining the acceleration and/or direction of movement of the device. Another method of input may involve shaking the device using an acceleration based gesture recognition.

As set forth above, the different types of output from an electronic device can vary. In one embodiment, an audio output may contain watermarking to communicate to other devices, such as toys, and to children simultaneously. In another embodiment, an audio output may contain data tones to communicate directly to toys. In another embodiment, a customized accessory or module can be used with an audio jack output for remote control of a separate device and/or for control of a device which is part of the system including the originating electronic device and another device. In another embodiment, the output may be a WiFi signal to another device or to a router or hub. In another embodiment, the output may be a Bluetooth signal to another device or a custom accessory. In another embodiment, the output may be via a cellular network which relays data from toys to the Internet. In another embodiment, the output may be a screen blinking data pattern, such as in one portion of the screen, that is used to communicate with a toy. In another embodiment, the output can be vibration which can be a direct feedback to a user and/or a communication to an external device.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, terms such as "first," "second," "third," etc., merely identify one of a number of portions, components and/or points of reference as disclosed herein, and do not limit the present invention to any particular configuration or orientation.

Therefore, although the disclosed inventions are illustrated and described herein as embodied in one or more specific examples, it is nevertheless not intended to be limited to the details shown, since various modifications and structural changes may be made therein without departing from the scope of the inventions. Further, various features from one of the embodiments may be incorporated into another of the embodiments. Accordingly, it is appropriate that the invention be construed broadly and in a manner consistent with the scope of the disclosure.

What is claimed is:

1. A system for identifying an object, comprising:
an electronic device including a touch screen; and
an object including a conductive portion and having a first contact member engageable with the touch screen and, a second contact member engageable with the touch screen, and a third contact member engageable with the touch screen, the conductive portion being connected to the first contact member, to the second contact member, and to the third contact member, the third contact member being movably mounted on the object and movable relative to the first contact member and to the second contact member, the first contact member spaced from the second contact member by a first distance, and the third contact member being spaced from a line connecting the first and second contact members by a second distance, wherein a user can grasp the object and manipulate it relative to the touch screen so that the object is moved by the user into contact with the touch screen, and the electronic device identifies the object, the first distance being used by the electronic device to determine a category of the object and the second distance being used by the electronic device to determine the identity of the object within the category, and the electronic device generates a visual output on the touch screen based on the location and the movement of the contact points.

2. The system of claim 1, wherein the object is a first object, and the system further comprises:
a second object including a conductive portion and having a fourth contact member engageable with the touch screen and a fifth contact member engageable with the touch screen, the fourth contact member spaced from the fifth contact member by a third distance, the third distance differing from the first and second distances, wherein the electronic device identifies the second object when the fourth and fifth contact members engage the touch screen to form fourth and fifth contact points.

3. The system of claim 2, wherein the electronic device identifies the first object based on the first and second distances and identifies the second object based on the third distance between the fourth and fifth contact points.

4. The system of claim 1, wherein the object is one of a toy figure or a toy vehicle.

5. The system of claim 1, wherein the third contact member is movably mounted on the object, the object being manipulatable so that the third contact member can be moved into and out of engagement with the touch screen.

6. The system of claim 5, wherein the object includes an actuator coupled to the third contact member, the actuator being movable relative to the object so that movement of the actuator results in movement of the third contact member.

7. The toy of claim 1, wherein the electronic device generates a first output when a pattern of contact points is sensed by the touch screen, the conductive object is a toy weapon with a coupling mechanism for receiving and coupling the electronic device to the conductive object, the first contact member engaging the touch screen when the weapon is coupled to the electronic device, the second contact member being selectively engageable with the touch screen, and a second output different from the first output is generated when the second contact member engages the touch screen.

8. A toy for use with an electronic device including a touch screen, the electronic device being configured to generate an output when a pattern of contact points is sensed by the touch screen, the toy comprising:
a conductive object including:
a conductive portion;
a first contact member connected to the conductive portion;
a second contact member spaced from the first contact member, the second contact member being connected to the conductive portion;
a third contact member movably mounted on the object and spaced from a line connecting the first and second contact members by a second distance, the object being manipulatable so that a user can grasp and move the object relative to the touch screen and the third contact member can be moved into and out of engagement with the touch screen, the first, second, and third contact members defining the pattern of contact points when the contact members engage the touch screen, the output being generated by the electronic device when the object is identified, the first distance being used by the electronic device to determine a category of the object and the second distance being used by the electronic device to determine the identity of the object within the category.

9. The toy of claim 8, wherein the object includes an actuator coupled to the third contact member, the actuator being movable relative to the object so that movement of the actuator results in movement of the third contact member.

10. The toy of claim 8, wherein the conductive object is one of a toy vehicle or a toy figure.

11. The toy of claim 8, wherein the conductive object is an action figure, the action figure including a first appendage including the first contact member and a second appendage including the second contact member.

12. A method of identifying a conductive object using a touch screen of an electronic device, the conductive object including a conductive portion, a first contact member connected to the conductive portion, a second contact member connected to the conductive portion, and a third contact member connected to the conductive portion, the third conductive portion being movable relative to the conductive portion, the method comprising the steps of:
determining a pattern of engagement points on the touch screen when the conductive object is proximate to the touch screen, the engagement points being formed by the first contact member, the second contact member, and the third contact member when the conductive object is grasped and positioned by a user proximate to the touch screen and the third contact member is moved proximate to the touch screen, the first contact member being spaced from the second contact member by a first distance, the third contact member being spaced from a line connecting the first and second contact members by a second distance;
determining information about the conductive object based on the engagement points, the first distance being used by the electronic device to determine a category of the conductive object and the second distance being used by the electronic device to determine the identity of the conductive object within the category; and
generating an output based on the information determined about the conductive object.

13. The method of claim 12, wherein the pattern of engagement points is a first pattern of engagement points and the conductive object is a first conductive object, the method comprising the steps of:
determining a second pattern of engagement points on the touch screen when a second conductive object is proximate to the touch screen, the second pattern of engagement points being different than the first pattern of engagement points;
determining information about the second conductive object based on the second pattern of engagement points; and
generating a second output based on the information determined about the second conductive object.

14. The method of claim 12, wherein the electronic device uses the first point, the second point, and the third point to determine the orientation of the conductive object on the touch screen.

15. The method of claim 12, wherein the step of generating an output includes generating feedback on the touch screen based on movement of the engagement points.

16. The method of claim 15, wherein the feedback on the touch screen includes at least one of an image associated with the conductive object or additional content in an application running on the device.

* * * * *